US012034400B2

(12) United States Patent
Biffert et al.

(10) Patent No.: US 12,034,400 B2
(45) Date of Patent: Jul. 9, 2024

(54) LIVESTOCK MANAGEMENT SYSTEM

(71) Applicant: 701x Inc., Fargo, ND (US)

(72) Inventors: Kevin N. Biffert, Horace, ND (US);
Maximillion K. Cossette, Fargo, ND (US); Steven J. Berlinger, Dilworth, MN (US); Peter S. Crowley, Fargo, ND (US); Cole L Mehring, Fargo, ND (US); Keith D. Alsleben, Fargo, ND (US); Braydon W. Love, Fergus Falls, MN (US); Brian M. Morlock, Fargo, ND (US); Chad A. Brinkman, Fargo, ND (US)

(73) Assignee: 701x Inc., Fargo, ND (US)

( * ) Notice: Subject to any disclaimer, the term of this patent is extended or adjusted under 35 U.S.C. 154(b) by 345 days.

(21) Appl. No.: 17/557,447

(22) Filed: Dec. 21, 2021

(65) Prior Publication Data
US 2022/0192150 A1    Jun. 23, 2022

Related U.S. Application Data

(60) Provisional application No. 63/128,948, filed on Dec. 22, 2020.

(51) Int. Cl.
*H02S 20/30*     (2014.01)
*A01K 11/00*    (2006.01)
(Continued)

(52) U.S. Cl.
CPC ............ *H02S 20/30* (2014.12); *A01K 11/004* (2013.01); *A01K 11/006* (2013.01);
(Continued)

(58) Field of Classification Search
None
See application file for complete search history.

(56) References Cited

U.S. PATENT DOCUMENTS

| 4,461,241 A | 7/1984 | Ostler |
| 4,503,808 A | 3/1985 | McAlister |

(Continued)

FOREIGN PATENT DOCUMENTS

| AU | 2017239570 A1 | 4/2018 |
| CN | 101221231 A | 7/2008 |

(Continued)

OTHER PUBLICATIONS

Non-Final Office Action Document Received for U.S. Appl. No. 17/557,375; Received Jan. 20, 2023.
(Continued)

*Primary Examiner* — Raul J Rios Russo
*Assistant Examiner* — Carl F. R. Tchatchouang
(74) *Attorney, Agent, or Firm* — Neustel Law Offices

(57) ABSTRACT

A livestock management system for detecting, tracking, and responding to livestock location and physical parameters, and for determining livestock behavior and physical conditions correlated thereto. The system generally includes a plurality of tags and sensors attached to and implanted in a plurality of livestock, one or more local sensors, a management platform, and a remote computer system. Each tag receives, processes and maintains data regarding the location, activity and physical parameters of a livestock to which it is attached and locally determines the behavior and physical conditions of the livestock. The tags communicate with other nearby tags and sensors locally via dynamic mesh networks and with the management platform and remote computer system via longer range wireless networks. The management platform processes the tag data and produces herd-related data. The remote computer uses the tag data to generate and update livestock behavior and condition models for download to the tags.

21 Claims, 19 Drawing Sheets

(51) Int. Cl.
    *A01K 29/00*     (2006.01)
    *G01C 5/06*     (2006.01)
    *G01P 15/00*     (2006.01)
    *G01S 19/14*     (2010.01)
    *G01S 19/34*     (2010.01)
    *G06K 19/07*     (2006.01)
    *G06K 19/077*     (2006.01)
    *G06Q 50/02*     (2012.01)
    *H04L 67/10*     (2022.01)
    *H04W 4/029*     (2018.01)
    *H04W 4/38*     (2018.01)
    *H04W 84/18*     (2009.01)

(52) U.S. Cl.
    CPC .......... *A01K 11/008* (2013.01); *A01K 29/005* (2013.01); *G01C 5/06* (2013.01); *G01P 15/00* (2013.01); *G01S 19/14* (2013.01); *G01S 19/34* (2013.01); *G06K 19/0723* (2013.01); *G06K 19/07762* (2013.01); *G06Q 50/02* (2013.01); *H04W 4/029* (2018.02); *H04W 4/38* (2018.02); *H04L 67/10* (2013.01); *H04W 84/18* (2013.01)

(56) References Cited

U.S. PATENT DOCUMENTS

| | | | |
|---|---|---|---|
| 4,512,096 A | 4/1985 | Heidecker | |
| 5,711,246 A | 1/1998 | Yano | |
| 5,791,294 A | 8/1998 | Manning | |
| 5,857,433 A | 1/1999 | Files | |
| 6,067,018 A | 5/2000 | Skelton | |
| 6,111,508 A | 8/2000 | Ensor | |
| 6,243,039 B1 | 6/2001 | Elliot | |
| 6,375,612 B1 | 4/2002 | Guichon | |
| 6,507,771 B2 | 1/2003 | Payton | |
| 6,510,380 B1 | 1/2003 | Curatolo | |
| 6,512,478 B1 | 1/2003 | Chien | |
| 6,674,368 B2 | 1/2004 | Hawkins | |
| 6,720,879 B2 | 4/2004 | Edwards | |
| 6,788,199 B2 | 9/2004 | Crabtree | |
| 6,868,804 B1 | 3/2005 | Huisma | |
| 6,997,140 B2 | 2/2006 | Finlayson | |
| 6,998,980 B2 | 2/2006 | Ingley, III | |
| 6,998,985 B2 | 2/2006 | Reisman | |
| 7,059,275 B2 | 6/2006 | Laitinen | |
| 7,164,986 B2 | 1/2007 | Humphries | |
| 7,234,421 B2 | 1/2007 | Natividade | |
| 7,218,229 B2 | 5/2007 | Boyd | |
| 7,248,167 B2 | 7/2007 | Wassingbo | |
| 7,335,168 B2 | 2/2008 | Rugg | |
| 7,411,492 B2 | 8/2008 | Greenberg | |
| 7,467,603 B2 | 12/2008 | Davies | |
| 7,525,425 B2 | 4/2009 | Diem | |
| 7,616,124 B2 | 11/2009 | Paessel | |
| 7,728,724 B1 | 6/2010 | Scalisi | |
| 7,830,257 B2 | 11/2010 | Hassell | |
| 7,904,244 B2 | 3/2011 | Sugla | |
| 7,918,185 B2 | 4/2011 | Araki | |
| 8,018,329 B2 | 9/2011 | Morgan | |
| 8,125,332 B2 | 2/2012 | Curran | |
| 8,149,125 B2 | 4/2012 | Geissler | |
| 8,285,245 B2 | 10/2012 | Ashley, Jr. | |
| 8,312,845 B2 | 11/2012 | Guinta | |
| 8,340,022 B2 | 12/2012 | Lee | |
| 8,849,926 B2 | 9/2014 | Marzencki | |
| 8,890,677 B2 | 11/2014 | Raphaeli | |
| 8,983,426 B2 | 3/2015 | Cermak | |
| 9,038,293 B2 | 5/2015 | Decaluwe | |
| 9,044,297 B2 | 6/2015 | Rajkondawar | |
| 9,370,170 B2 | 6/2016 | Downing | |
| 9,448,072 B2 | 9/2016 | Bandyopadhyay | |
| 9,449,202 B2 | 9/2016 | Clare | |
| 9,489,813 B1 | 11/2016 | Beigel | |
| 9,504,387 B2 | 11/2016 | Lanza | |
| 9,848,577 B1 | 12/2017 | Brandao | |
| 9,936,676 B1 | 4/2018 | Ulmer | |
| 9,980,467 B2 | 5/2018 | Auer | |
| 10,075,813 B1 | 9/2018 | Struhsaker | |
| 10,242,547 B1 | 3/2019 | Struhsaker | |
| 10,292,370 B2 | 5/2019 | Mobley | |
| 10,660,546 B2 | 5/2020 | Saigh | |
| 10,697,947 B1 | 6/2020 | Armitage | |
| 11,503,802 B2 | 11/2022 | Jones | |
| 2002/0046713 A1 | 4/2002 | Otto | |
| 2004/0074448 A1 | 4/2004 | Bunt | |
| 2004/0078390 A1 | 4/2004 | Saunders | |
| 2005/0162279 A1 | 7/2005 | Marshall | |
| 2006/0097882 A1 | 5/2006 | Brinkerhoff | |
| 2006/0161443 A1 | 7/2006 | Rollins | |
| 2006/0201432 A1 | 9/2006 | Pratt | |
| 2006/0267731 A1 | 11/2006 | Chen | |
| 2007/0012260 A1 | 1/2007 | Boyd | |
| 2007/0171048 A1 | 7/2007 | Shapiro | |
| 2007/0209594 A1 | 9/2007 | Kaever | |
| 2007/0229350 A1 | 10/2007 | Scalisi | |
| 2008/0147458 A1 | 6/2008 | Yamazaki | |
| 2010/0030036 A1 | 2/2010 | Mottram | |
| 2010/0127853 A1 | 5/2010 | Hanson | |
| 2010/0156606 A1 | 6/2010 | Gold | |
| 2011/0102154 A1 | 5/2011 | Hindhede | |
| 2011/0125065 A1 | 5/2011 | Voronin | |
| 2011/0148639 A1 | 6/2011 | Geissler | |
| 2012/0050046 A1 | 3/2012 | Satorius | |
| 2012/0065483 A1 | 3/2012 | Chung | |
| 2013/0175347 A1 | 7/2013 | Decaluwe | |
| 2013/0340305 A1 | 12/2013 | Mobley | |
| 2015/0097668 A1 | 4/2015 | Toth | |
| 2015/0282457 A1 | 10/2015 | Yarden | |
| 2015/0373951 A1 | 12/2015 | Kelly | |
| 2016/0143719 A1* | 5/2016 | Folkers | A61D 17/002 600/33 |
| 2017/0156288 A1 | 6/2017 | Singh | |
| 2018/0054399 A1 | 2/2018 | Shinoda | |
| 2018/0146645 A1 | 5/2018 | Arbel | |
| 2018/0160649 A1 | 6/2018 | Hicks | |
| 2018/0279582 A1 | 10/2018 | Yajima | |
| 2018/0295809 A1 | 10/2018 | Yajima | |
| 2018/0374165 A1 | 12/2018 | Ferro Dos Santos | |
| 2019/0008124 A1 | 1/2019 | Komatsu | |
| 2019/0141959 A1 | 5/2019 | Ingham | |
| 2019/0223408 A1 | 7/2019 | Brayer | |
| 2019/0254601 A1 | 8/2019 | Blackmore | |
| 2019/0380311 A1 | 12/2019 | Crouthamel | |
| 2020/0022338 A1 | 1/2020 | Rovnyi | |
| 2020/0029534 A1 | 1/2020 | Austin | |
| 2020/0107522 A1 | 4/2020 | Kersey | |
| 2020/0125849 A1 | 4/2020 | Labrecque | |
| 2020/0159720 A1 | 5/2020 | Leong | |
| 2020/0160009 A1 | 5/2020 | Vatn | |
| 2020/0323170 A1 | 10/2020 | Garigan | |
| 2020/0367471 A1 | 11/2020 | Deliou | |
| 2021/0148881 A1 | 5/2021 | Deng | |
| 2022/0104929 A1 | 4/2022 | Cummins | |
| 2022/0192151 A1 | 6/2022 | Biffert | |
| 2022/0192152 A1 | 6/2022 | Biffert | |
| 2022/0200519 A1 | 6/2022 | Biffert | |

FOREIGN PATENT DOCUMENTS

| | | |
|---|---|---|
| EP | 3188648 B1 | 1/2020 |
| FR | 2801491 A1 | 6/2001 |
| GB | 2387465 A | 10/2003 |
| WO | 2000011939 A2 | 3/2000 |
| WO | 2005034617 A1 | 4/2005 |
| WO | 2020120516 A1 | 6/2020 |
| WO | 2022005288 A1 | 1/2022 |

OTHER PUBLICATIONS http://www.sensehubbeef.com/; Allflex Livestock Intelligence "SenseHub Beef" Webpage; Received Sep. 3, 2020.

(56) References Cited

OTHER PUBLICATIONS http://www.sensehubbeef.com/documents/pdf/SenseHubBeef.pdf, Allflex Livestock Intelligence "SenseHub Beef" Cow Monitoring Brochure; Copyright 2018.
https://www.cerestag.com/; Ceres Tag Website; Received Sep. 3, 2020.
https://web.archive.org/web/20200806065228/https://www.cerestag.com/benefits/; Internet Archive Wayback Machine Archive.org "Ceres Tag Benefits" Webpage; Aug. 6, 2020.
https://www.moovement.com.au/gps-ear-tags; mOOvement "GPS Ear Tag" Website; Received Sep. 3, 2020.
https://ieeexplore.ieee.org/document/1280774; IEEE Xplore Webpage Article "Wearable Sensor System for Wireless State-of-Health Determination in Cattle"; L. Nagl; Sep. 17, 2003.
https://www.mdpi.com/1424-8220/9/5/3586/htm; MDPI Webpage Article "Monitoring Animal Behaviour and Environmental Interactions Using Wireless Sensor Networks, GPS Collars and Satellite Remote Sensing"; Rebecca N. Handcock; Published May 13, 2009.
https://www.mdpi.com/1424-8220/9/5/3942/pdf; MDPI.com Webpage Article "A Heterogeneous Wireless Identification Network for the Localization of Animals based on Stochastic Movements"; Alvaro Gutierrez; May 25, 2009.
http://www.diva-portal.org/smash/get/diva2:21508/FULLTEXT01.pdf; Diva Article "Sensor Systems for Positioning and Identification in Ubiquitous Computing"; Suri Jayabharath Kumar; Feb. 13, 2006.
https:/www.beefcentral.com/ag-tech/gps-enabled-livestock-monitoring-tags-reach-the-commercial-market/; GPS-enabled livestock monitoring tags reach the commercial market; Beef Central; Mar. 17, 2020.
https://journalajarr.com/index.php/AJARR/article/view/13035/23855; "Design and Implementation of a Cattle Grazing Tracking and Anti-theft Alert GPS/GSM Collar, Leveraging on Improvement in Telecom and ICT Infrastructure", Asian Journal of Advanced Research and Reports, May 25, 2018.
Non-Final Office Action Document Received for U.S. Appl. No. 17/557,559; Received Dec. 22, 2023.
Atmel 8-Bit AVR Microcontroller with 2/4/8K Byes In-System Programmable Flash Datasheet; 2013. (Year: 2013).
Notice of Allowance Document Received for U.S. Appl. No. 18/162,885; Received May 8, 2024.
PCT International Search Report and Written Opinion for PCT/US2023/086378; Apr. 11, 2024.
PCT International Search Report and Written Opinion for PCT/US2023/086390; Apr. 19, 2024.

* cited by examiner

| 122 | 120 | | | | | | | | | |
|---|---|---|---|---|---|---|---|---|---|---|
| | TAG ID | TAG ENCRYPTION KEY(S) | ASSET NUMBER | | | | | | | |
| TAG DATA 124 | | | | | | | | | | |
| | DATE/TIME | TAG ORIENTATION | TAG ELEVATION | ACCEL | GPS POS. | BODY TEMP | VIDEO LINK | AUDIO LINK | BATTERY LEVEL | SIGNAL STRENGTH |
| | ... | ... | ... | ... | ... | ... | ... | ... | ... | ... |
| | ... | ... | ... | ... | ... | ... | ... | ... | ... | ... |
| VIDEO 126 | | | | | | | | | | |
| | DATE/TIME | CLIP 1 | | | | | | | | |
| | ... | CLIP 2 | | | | | | | | |
| | ... | ... | | | | | | | | |
| AUDIO 128 | | | | | | | | | | |
| | DATE/TIME | CLIP 1 | | | | | | | | |
| | ... | CLIP 2 | | | | | | | | |
| | ... | ... | | | | | | | | |
| DETECTED TAGS/SENSORS 132 | | | | | | | | | | |
| | DATE/TIME | TAG/SENSOR ID | DISTANCE | ANGLE | TAG/SENSOR DATA | | | | | |
| | ... | ... | ... | ... | ... | | | | | |
| | ... | ... | ... | ... | ... | | | | | |

MONITOR/MANAGE CONSUMABLES INVENTORY

- MONITOR SENSORS
- MONITOR INDIVIDUAL/HERD CONSUMPTION
- ESTABLISH/MONITOR LIMITS
- REPLENISH

→ GENERATE REPORT(S)

→ GENERATE ALERT(S)/ALARM(S)

182

TRACK/MAINTAIN FINANCIAL DATA

- INDIVIDUAL/HERD MARKET VALUE
- MARKET PRICES
- COSTS
  - FEED, SUPPLIES ETC.
  - MEDICAL
  - EQUIPMENT
- DEBT/LOAN DATA
- OTHER

→ GENERATE REPORTS

→ GENERATE ALERT(S)/ALARM(S)

184

MONITOR WEATHER CONDITIONS

- TAG DATA
- EXTERNAL DATA

→ GENERATE ALERTS/ALARMS

→ INTERVENE
- MOVE HERD
- ID ANIMALS (LED)
- GENERATE TONES
- STIMULATE

FIG. 11D

| TAG ID | VACCINATION/ MEDICINE/ INJURY/ ILLNESS/ OTHER COND. INDICATOR | DATE/TIME OCCURRENCE | ID/ DESCRIPTION | DOSE | DURATION | DATE START | DATE STOP | ADD'L INFO |
|---|---|---|---|---|---|---|---|---|
| ... | ... | ... | ... | ... | ... | ... | ... | ... |
| TAG ID | ... | ... | ... | ... | ... | ... | ... | ... |

200

| EVENT TYPE/ DESCRIPTION (E.G., PREDATOR, GUNSHOT, VEHICLE, THEFT) | DATE/ TIME | LOCATION | TAG ID'S | ADD'L INFO |
|---|---|---|---|---|
| ... | ... | ... | ... | ... |

| FEED/SUPPLY ID/DESCRIPTOR | LOCATION | CAPACITY | DATE/TIME | SENSOR READ/EST REMAINING CAPACITY | LIMIT (REPLENISH) | EST CONSUMPTION RATE | EST TIME TO LOW LIMIT |
|---|---|---|---|---|---|---|---|
| | | | ... | ... | | ... | ... |
| | LOCATION | CAPACITY | DATE/TIME | SENSOR READ/EST REMAINING CAPACITY | LIMIT | EST CONSUMPTION RATE | EST TIME TO LOW LIMIT |
| | | | ... | ... | | ... | ... |

206

| TAG ID | DATE | CURRENT OWNER | TRANSFER DATE | PREVIOUS OWNER | CURRENT LOCATION | PREVIOUS LOCATION |
|---|---|---|---|---|---|---|
| ... | ... | ... | ... | ... | ... | ... |

208

| TAG ID | DATE/TIME | LOCATION | BATTERY LEVEL | SIGNAL LEVEL | TEMP | HUMIDITY |
|---|---|---|---|---|---|---|
| ... | ... | ... | ... | ... | ... | ... |

FIG. 14C

LIVESTOCK MANAGEMENT SYSTEM

CROSS REFERENCE TO RELATED APPLICATIONS

I hereby claim benefit under Title 35, United States Code, Section 119(e) of U.S. provisional patent application Ser. No. 63/128,948 filed Dec. 22, 2020. The 63/128,948 application is hereby incorporated by reference into this application.

STATEMENT REGARDING FEDERALLY SPONSORED RESEARCH OR DEVELOPMENT

Not applicable to this application.

BACKGROUND

The described example embodiments in general relate to a livestock management system for detecting, tracking, and responding to livestock location and activity, and for determining livestock behavior and physical conditions correlated thereto.

Tags fitted with sensors and electronics have been attached externally to various body parts of cattle and other livestock as components of livestock management systems to record and communicate data regarding the location, certain physical parameters, and the health and welfare of the livestock. For example, such tags have been attached to the ears, dewlap, and brisket regions of cattle. Any discussion of the related art throughout the specification should in no way be considered as an admission that such related art is widely known or forms part of common general knowledge in the field.

SUMMARY

Some of the various embodiments of the present disclosure relate to a livestock management system that can manage various types of livestock. Some of the various embodiments of the present disclosure manage a herd of livestock within an area under management. Some of the various embodiments of the present disclosure generally include a plurality of tags each attached to a livestock of a herd under management, one or more local sensors/transceivers located in the area under management, a management system platform, and a remote computer system. In some other embodiments, one or more sensors may be implanted in and/or attached to each livestock.

Each tag locally and autonomously receives and/or acquires data regarding the location, orientation, movement of the livestock and other data about the livestock from embedded receivers and sensors, e.g., an embedded global positioning receiver, gyroscope, and accelerometer. Each tag locally and autonomously receives and/or acquires physical parameters of the livestock from one or more sensors, e.g., an internal body temperature sensor. The sensors may be implanted in and/or attached to the livestock separate from the tag and/or incorporated in the tag. Each tag locally and autonomously processes the data and physical parameters and determines certain activities and behaviors of the livestock, e.g., eating, ruminating, ambulating, and determines certain physical conditions of the livestock correlated thereto, e.g., illness, injury, estrus, breeding, and calving. The tag can make predictions and determinations about livestock activity and physical condition by applying one or more AI models and/or other detection algorithms to the received and acquired data. Each tag also locally and autonomously receives or acquires data about events and conditions external to the livestock, processes the data, and determines whether a potential risk to the livestock is present, e.g., a nearby predator or vehicle.

Each tag can locally and autonomously decide to generate an alarm or alert in response to a detected or determined location, activity and/or physical condition of the livestock and/or in response to a detected or determined event or condition external to the livestock. For example, a tag can generate an alarm or alert when it detects the livestock has left the area under management or a designated area within the area under management, when it determines that the livestock is ill, injured, in estrus, or calving, when it determines that a livestock has likely been stolen, and/or when it determines that the livestock is threatened by an external event or condition, e.g., predator, bad weather, etc.

Each tag is capable of communicating its data, determinations, and alarms with the management system platform and/or the remote computer system, e.g., with the cloud, via one or more long range wireless networks which can include cellular, satellite, and/or IP-based networks, and/or LPWAN's such as LORA or Sigfox. However, in an embodiment where it is not necessary or not desired for every tag to communicate separately with the management system platform and/or remote computer system, e.g., for power conservation reasons, each tag can be configured to locally and autonomously communicate its data and determinations with other nearby tags and with local sensors/transceivers in an area under management via one or more self-forming dynamic local mesh networks, or each tag may communicate or attempt to communicate data to other nearby tags, without formation of a mesh network. Depending on the location of surrounding or nearby tags, one tag or multiple tags may receive data from a sending tag. Thus, a sending tag may not have data "awareness" of whether a single other tag or multiple tags have received the sent data. This type of transmission may be used for emergency alerts or general data sharing, for example.

In either case, every tag in a local mesh network or in sufficient proximity to other tags can have all or a subset of the data and determinations of every other tag in the network or area. The data can include, e.g., signal strength, battery power, and external conditions and based on such data, each tag in the network can autonomously determine the tag that is in the best condition to communicate with the management system platform and/or the remote computer network. That tag can then communicate the aggregated data of some or all of the tags in the local mesh network or group of tags in an area to the management system platform and/or the remote computer network, e.g., to the cloud, via a long range wireless network.

The management system platform receives, processes, and stores the data from the tags and aggregates the individual livestock data to produce herd-level data. The management system platform also can respond to alarms from the tags and can generate its own alarms. The management system platform monitors and manages designated grazing areas and inventories of consumables, e.g., feed, hay, water, etc. The management system platform maintains and manages genetics and lineage data, health and physical condition histories, owner and location histories, and financial information, among other things. The management system platform maintains and manages access to the system, data, and functionality by external users and can be configured to operate as a remote service provider, e.g., to provide on-line auction and/or veterinary services. The management system platform manages and monitors the tags, including adding and deleting tags from the system, populating tags with data and updates, provisioning tags for operation, and monitoring battery level and operating conditions.

The remote computer system can be separate from or incorporated in whole or in part with the management system platform. The remote computer system can provide mass storage for very large volumes of tag data and determinations. The remote computer system can also provide computing power and tools to generate, train, and update AI models and/or other detection-based algorithms for determining livestock activity, behavior and conditions using the masses of tag data and determinations. The remote computer system can download such AI models and/or other detection-based algorithms and updates to the tags directly and/or through the management system platform.

There has thus been outlined, rather broadly, some of the embodiments of the livestock management system in order that the detailed description thereof may be better understood, and in order that the present contribution to the art may be better appreciated. There are additional embodiments of the livestock management system that will be described hereinafter and that will form the subject matter of the claims appended hereto. In this respect, before explaining at least one embodiment of the livestock management system in detail, it is to be understood that the livestock management system is not limited in its application to the details of construction or to the arrangements of the components set forth in the following description or illustrated in the drawings. The livestock management system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 9 is a block diagram illustrating one potential logical data structure for potential data received, processed, and maintained in a tag component of a livestock management system in accordance with an example embodiment.

FIG. 11D is a block diagram illustrating some potential functions performed, one possible logical flow, and associated data received, processed, and maintained in a management system platform of a livestock management system in accordance with an example embodiment.

FIG. 14B is a block diagram illustrating one potential logical data structure for potential data received, processed, and maintained in a management system platform of a livestock management system in accordance with an example embodiment.

FIG. 14C is a block diagram illustrating one potential logical data structure for potential data received, processed, and maintained in a management system platform of a livestock management system in accordance with an example embodiment.

DETAILED DESCRIPTION

A. Overview

Figure 1A:
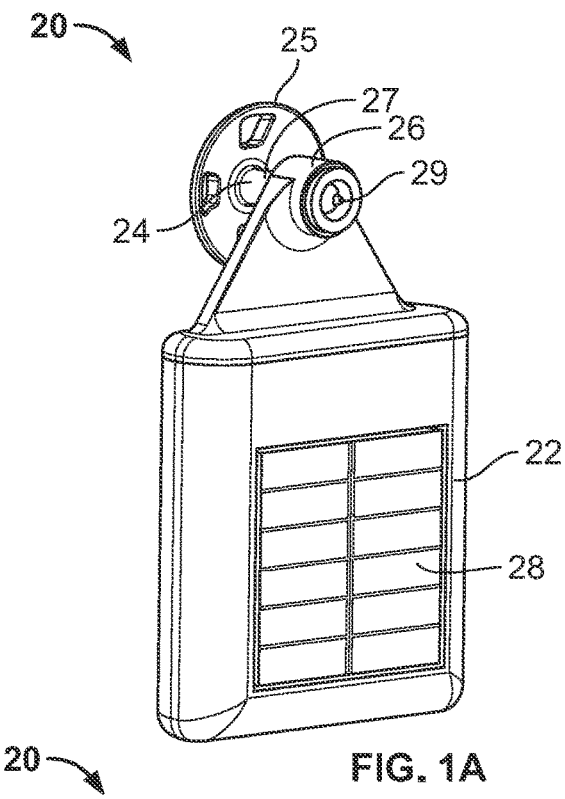
FIG. 1A is a perspective view of a tag component of a livestock management system in accordance with an example embodiment.

Some of the various embodiments of the present disclosure relate to a livestock management system that can manage various types of livestock. Some of the various embodiments of the present disclosure of the livestock management system 10 generally include a plurality of tags 20 attached to a corresponding plurality of livestock 12 under management, a plurality of local sensors and transceivers 34 located in an area under management, a management system platform 140, and a remote computer system 220. In some other example embodiments, one or more sensors 32 are implanted in and/or attached to each livestock 12.

Each tag 20 is adapted and configured to be attached to a corresponding livestock 12 externally, preferably in an outer part of the livestock's ear. Each tag 20 is self-powered and operates autonomously and automatically for the most part.

Each tag 20 includes the elements and components necessary to acquire or receive, to process, maintain, and communicate data and information regarding the individual livestock 12 to which it is attached. Such data can include, but is not limited to, livestock location, movement, orientation, position and angle relative to other nearby livestock 12, physical parameters such as internal body temperature, etc. Each tag 20 is adapted and configured to autonomously and automatically locally process received and acquired data regarding location, orientation, movement, etc. and physical parameters of the livestock 12 and to make determinations about activities and behaviors of the livestock 12 by applying one or more models and/or algorithms. Such activities and behaviors can include, for example, but are not limited to, eating, drinking, ruminating, resting, ambulation, breeding, etc. Each tag 20 is also adapted and configured to autonomously and automatically determine from the data and the determined activities and behaviors certain correlated livestock health and other significant physical conditions by applying one or more models. Such conditions can include, but are not limited to, illness, injury, estrus, ovulation, breeding, pregnancy, and calving.

Each tag 20 is also adapted and configured to generate and communicate alarms and/or alerts in response to certain detected activities and/or conditions, and to receive and respond to alarms and/or alerts. Alarms or alerts can be communicated, for example, to one or more mobile devices of a rancher, herd manager, etc. Detected conditions that can trigger an alarm or alert include, but are not limited to, estrus and calving. Detected activities that can trigger an alarm or alert can include, but are not limited to, lack of movement, a sudden physical shock and/or loud noise, and maintaining a particular orientation for an extended period of time. Each tag 20 can respond to an alarm or alert by taking an action including, but not limited to activating an LED, tone generator, and/or stimulator. Each tag 20 is also adapted and configured to communicate its data and determinations directly or indirectly with the management system platform 140 and with the remote computer system 220 via one or more long range wireless networks. Such networks can include, but are not limited to, cellular, satellite, and or IP-based WAN/LAN networks, and/or LPWAN's such as LORA or Sigfox.

Each tag 20 can also be adapted and configured to communicate with and to receive data from one or more sensors 32 that may be implanted in and/or attached to the livestock 12 to which the tag 20 is attached over a wireless connection. The wireless connection can be, but is not limited to, a low power Bluetooth (BLE) connection and an antenna-based RFID connection or other RF link. Each tag 20 can further be adapted and configured to process, maintain, and communicate the data from the sensor(s) 32. The one or more sensors 32 can be adapted and configured to sense various physical parameters, conditions, and/or activities of the livestock 12 including, but not limited to, body temperature. In an example embodiment, a temperature sensor can be implanted in or attached to the livestock 12 at a location that is spaced apart from the ear location where the tag 20 is attached. For food safety reasons, the spaced apart location can include another location on the ear for example. The sensor 32 can provide relative body temperature readings of the livestock 12 that can be closely correlated with the health-related and other physical conditions of the livestock 12 that the tag 20 is to determine.

In addition to each tag 20 being adapted and configured to communicate directly with the management system platform 140 and/or the remote computer system 220, e.g., in the cloud, in some embodiments each tag 20 can also be adapted and configured to communicate directly with every other nearby tag 20 that is within a certain signal range in a dynamic local mesh network. A plurality of dynamic local mesh networks can be in existence at any given time in a herd under management. The dynamic local mesh networks are self-organizing such that as an individual livestock 12 leaves the signal range of one such network and enters the signal range of another, each network automatically updates its tag membership and communicates the new membership information to the other tags 20 in the network. The tags 20 in each dynamic local mesh network communicate with each other over a wireless point-to-point connection. The wireless point-to-point connections can comprise, but are not limited to, low power Bluetooth (BLE) and/or LPWAN connections.

Each tag 20 in a dynamic local mesh network at any given time can be adapted and configured to receive all or a subset of the data of each other tag 20 in the network and to transmit all or a subset of its own data to every other tag 20 in the network. Each tag 20 in the network can also be adapted and configured to determine the tag 20 that is in the optimum condition to communicate the aggregated data of all of the tags in the network to the management system platform 140 and/or the remote computer system 220, i.e., the cloud. That determination can be made based on a plurality of factors including, but not limited to, relative power levels, relative signal strengths, and other relative transmission conditions. Each tag 20 can further be adapted and configured to determine if and when to communicate the aggregated data of the tags 20 in the local network to the management system platform 140 and/or to the remote computer system 220. That determination can be made based on a plurality of factors including, but not limited to, the time and date, atmospheric conditions, signal conditions, and power level and/or other conditions of the tag 20 or conditions of the livestock. For example, conditions of the livestock that may trigger a communication of the aggregated data include the livestock 12's health or a change in health status or condition, including but not limited to estrus, calving, or a change in the livestock 12's position, such as when it is detected that the livestock 12 has left a designated area or entered an unauthorized area, e.g., has crossed beyond a geo-fence.

The one or more local sensors and transceivers 34 can be in fixed locations of an area under management or can be mobile within the area under management, and are preferably in one or more areas where livestock 12 also happen to be present from time to time. Each local sensor and/or transceiver 34 is adapted and configured to communicate with each tag 20 that is within a certain signal range and can be a member of a dynamic local mesh network with those tags 20. Each tag 20 is adapted and configured to communicate with every local sensor and/or transceiver 34 that is within signal range, and to receive, maintain, process, and communicate any data received therefrom. Local sensors can include for example, but are not limited to, a weight sensor connected to a scale, a photo-sensor and/or camera mounted on or near a scale, a photo-sensor and/or camera mounted on or near a feed or water source, a feed or water level sensor, etc. Local transceivers can also be used to communicate data between the tags 20 that are in signal range, the management system platform 140, and/or the remote computer system 220, for example when other forms of communication, e.g., cellular or LPWAN are not available for some reason.

The management system platform 140 can be hosted in a fixed location, such as on a desktop PC or on a cloud platform, or in a mobile device such as a laptop PC, tablet computer, mobile phone, etc. Instances of all or a portion of the management system platform 140 can be distributed between one or more host devices at a fixed location and one or more mobile host devices.

The management system platform 140 is adapted and configured to receive, process, and maintain the data and determinations by the tags 20 attached to the livestock 12 under management. The management system platform 140 is adapted and configured to communicate directly with the tags 20 and with the remote computer system 220 via one or more wireless and/or wired networks. The networks can include, but are not limited to, cellular, satellite, and/or IP-based WAN/LAN networks, and/or LPWAN's such as LORA or Sigfox. To the extent the management system platform 140 is embodied in a mobile host device, it can also be adapted and configured to communicate with tags 20 via a shorter range wireless connection, including but not limited to a Bluetooth connection. The management system platform 140 also can be adapted and configured to communicate with tags 20 that are within signal range via a local RF transceiver in proximity to the tags 20 in the event other communication connections are unavailable for any reason.

The management system platform 140 is adapted and configured to process the livestock tag data in substantially the same way as the individual tags 20. The management system platform 140 can track the locations and movements of individual livestock 12 and the herd under management in general, and can use models and/or other algorithms to determine certain activities and behaviors, the existence of certain events, and the existence of certain physical conditions such as estrus and calving in individual livestock 12, among other things. The management system platform 140 is also adapted and configured to respond to the detection of such events and the determination of such physical conditions by taking actions that can include, but are not limited to, communicating an alarm or alert to one or more mobile devices of a rancher, herd manager, etc., and causing the tag 20 associated with the event or physical condition to take an action such as activating a tone generator, stimulator, and/or LED.

The management system platform 140 is also adapted and configured to manage the tags 20 and to monitor the operational condition of each tag 20. The management system platform 140 can be adapted and configured to add new tags 20 to the system, delete tags 20 from the system, populate tags 20 with data and updates, and provision tags 20 for operation in the system. The management system platform 140 can monitor operational conditions of the tags 20 that can include, but are not limited to, battery level, signal strength level, temperature, humidity, etc. The management system platform 140 can take actions including generating and communicating an alarm or alert when a monitored condition indicates a need for service, repair or other intervention.

The management system platform 140 is also adapted and configured to process the data and determinations from the tags 20 and to produce additional data and information that is beneficial to managing a herd of livestock 12. Such data and information can include both individual and herd level data and information. At an individual level, such data and information can include for example, but is not limited to, genetic and family lineage, history of physical characteristics such as weight, health and medical history, individual market value, anticipated costs etc. At a herd level, such data and information can include for example, but is not limited to, herd demographics and statistics, herd market value, actual and anticipated costs, herd location relative to pasturage, and the status of use and remaining inventories of pasturage, feed, medical supplies, and/or other consumables.

The management system platform 140 also is adapted and configured to receive, process, maintain and communicate external information related to management of individual and herds of livestock 12. Such information can include, but is not limited to, ownership information and history, location information and history, health related and other physical condition information and history such as records of veterinary visits and treatments, vaccination, injury, and illness, market prices for livestock, market prices for feed and other consumables, financial information such as interest rates, debt service, etc., and weather information. The management system platform 140 can be adapted and configured to include certain triggers to automatically generate alarms or alerts to a user of the system when certain predetermined threshold values are detected. Such triggers and alerts can include, but are not limited to, an alert to buy or sell when a certain market price is detected, an alert to move all or a portion of the herd when a certain usage value of pasturage or a certain weather condition is detected, and an alert to have vaccinations updated when an amount of time has elapsed or a certain date and/or illness has been detected.

The management system platform 140 can also be adapted and configured to provide one or more external access interfaces. The external access interfaces can include login/password access security. The management system platform 140 can be configured to limit access to only designated portions of the management system platform functions, data and information, either based on password control or otherwise. For example, one or more external access interfaces can be set up to provide access to certain information by one or more banks or other financial institutions, insurance providers, and/or government agencies. The management system platform 140 can also be configured to operate as a remote service provider for certain on-line services, such as veterinary services, auction house services, or other livestock management related services. In that case, external access interfaces can also be set up to provide access to such services by registered users.

It is expected that once a tag 20 is activated and placed in service, it will generate masses of data and determinations over time. The management system platform 140 and/or the remote computer system 220 can be adapted and configured to aggregate and maintain the data and determinations, both current and historical, by all tags 20 of a herd under management. Such data and determinations can be used to create, develop, train, and subsequently update one or more machine learning or artificial intelligence (AI) models and/ or one or more other detection algorithms for determining livestock activity, behavior, and conditions. Such models can then be embedded in the tags 20 and applied to data, e.g., location, orientation, movement, physical parameter values, received and acquired by the tags 20 in real time, and to determinations made therefrom by the tags 20 in real time to accurately determine the occurrence or existence of various significant physical conditions of the livestock 12 including, but not limited to, estrus, breeding, and calving.

After a model or algorithm or model or algorithm update is generated, the management system platform 140 or the remote computer system 220 can download it to the individual tags 20. Each individual tag 20 is adapted to receive the models and/or algorithms and updates, store them, and apply them with respect to the real time data and determinations of the tag 20. As one example, a tag 20 can apply a model or algorithm to determine that a livestock 12 is in estrus using as parameters the orientation of the tag 20 (indicating a first behavior of the livestock 12), elevation of the tag 20, the movement of the tag 20 (indicating a second behavior of the livestock 12), and the relative body temperature of the livestock 12 from a sensor 32 (indicating a physical parameter of the livestock 12).

The remote computer system 220 can be separate from or can be a part of the management system platform 140. The remote computer system 220 can communicate directly with the tags 20 and with the management system platform 140 via one or more long range wired and/or wireless networks including, but not limited to, cellular, satellite, and/or IP-based WAN/LAN networks, and/or LPWAN's such as LORA or Sigfox.

The remote computer system 220 preferably includes mass storage, e.g., one or more high capacity, high performance remote/cloud storage servers, with sufficient capacity to maintain the masses of data and determinations generated by all of the tags 20 of a herd under management over time. The remote computer system 220 also preferably includes sufficient processing capacity and power, e.g., one or more high performance central processing units, and the necessary tools and facilities to perform machine learning on the masses of data and determinations and to create, train, and update desired models and/or other detection algorithms to be downloaded to and embodied in the tags 20.

While it is contemplated that the example livestock management system 10 as described herein will be particularly useful for managing livestock 12, in particular cattle, it is contemplated and will be appreciated that it can also be used more generally to manage other domesticated animals and even wild animals. Accordingly, the descriptions of the example livestock management system 10 herein are not intended and should not be interpreted as necessarily being limited to use with livestock 12.

B. Tags

The example livestock management system 10 includes a plurality of tags 20. Each individual tag 20 is adapted to be attached to an individual livestock 12. The individual livestock 12 can be managed individually and can be part of a plurality or herd of livestock 12 being managed.

Figure 2:
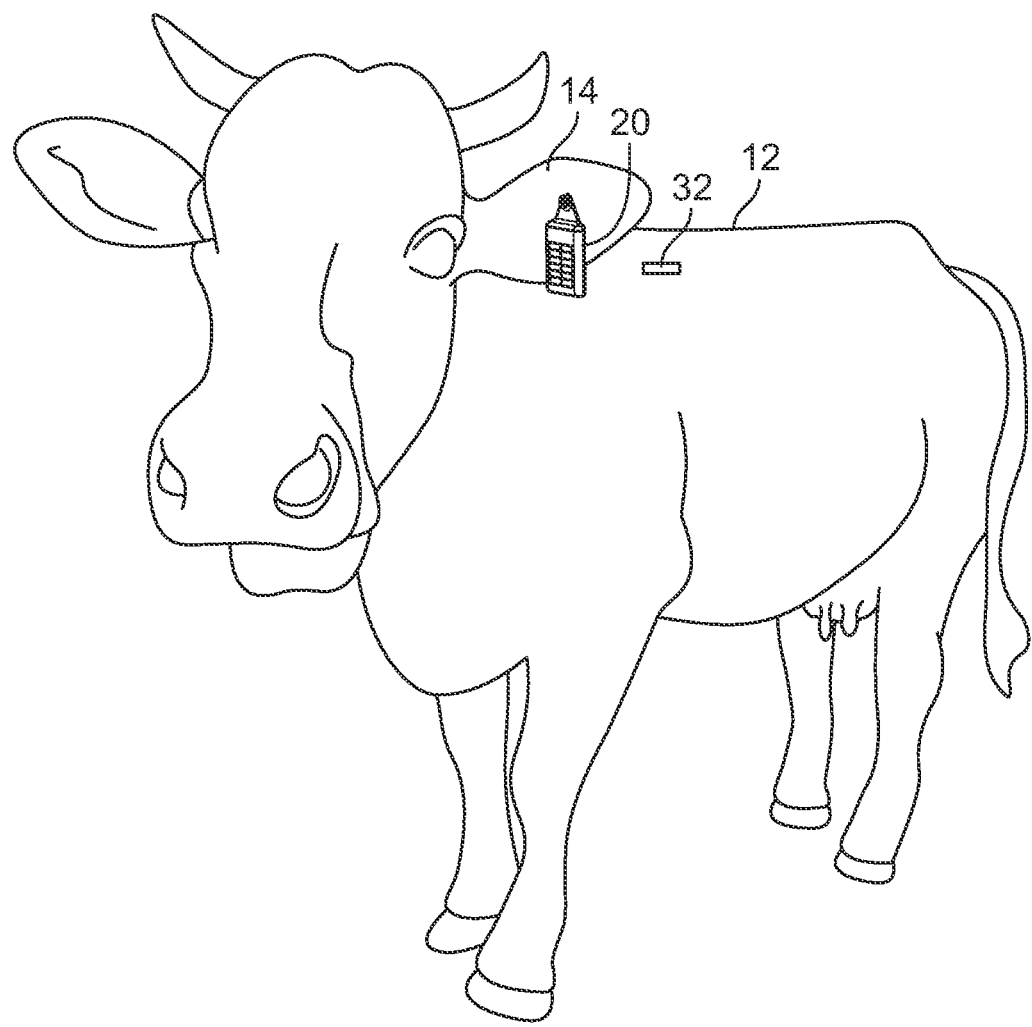
FIG. 2 is a perspective view of a graphical representation of a livestock fitted with a tag component of a livestock management system in accordance with an example embodiment.

Each tag 20 is preferably adapted to be physically attached to an external body part of an individual livestock 12 in a location where the tag 20 will be both readily visible and readily physically accessible. For example, as illustrated in FIG. 2 the tag 20 may be attached to the outer ear or auricle 14 of a livestock 12 in a location and manner familiar to those skilled in the art.

Each tag 20 is self-powered and mobile with the animal to which it is attached. The tags 20 are preferably relatively small, light-weight, and shaped to avoid causing irritation, deformity, or injury to the animal, particularly at the point of attachment, e.g., the ear. For example, in one embodiment, the tags 20 will have an inside the ear component with dimensions of about 60 mm×30 mm×15 mm, an outside the ear component with dimensions of about 50 mm×25 mm×5 mm, and will weigh about 20-40 grams.

Each tag 20 has indicia or markings allowing it to be readily and uniquely identified visually even when attached to a livestock 12. For example, each tag 20 has an external outward-facing surface with printed, inscribed, etched or otherwise applied indicia that uniquely identifies the tag 20 and distinguishes it from other tags 20 attached to other livestock 12 under management. The indicia may include, but are not limited to, alphanumeric and/or symbolic representations. Different tags 20 also may have various different colors which may identify different models, types, classes, time periods placed in service, etc.

As described in detail below, each tag 20 is self-powered and includes the data collection, processing, storage, communications, control and other elements components, including code, to receive, process, retain, and communicate data regarding the individual livestock 12 to which it is attached as well as aggregated livestock data. Such data may include, but is not limited to, livestock location, movement, orientation, position relative to other livestock, physical parameters, etc.

Also as described in detail below, each tag 20 is adapted and configured to locally process received and acquired data regarding physical parameters and activity of the livestock 12 to which it is attached using one or more models to determine the occurrence of various behaviors and correlated physical conditions. Physical parameters may include, but are not limited to, relative internal body temperature. Behaviors and conditions that may be determined may include, but are not limited to, ambulation, eating, and rumination. Correlated physical conditions that may be determined may include, but are not limited to, estrus and calving.

1. Enclosure.

As best illustrated in FIGS. 1A-1D, each tag 20 comprises an enclosure 22 with a male attachment element 24, a female attachment element 26, and a solar energy cell 28. The enclosure 22 encloses a sealed interior space in which the data collection, processing, storage, communications, control and other elements and components of the tag 20 are located so as to be protected against exposure to the external environment, potential contaminants, and potential damage. As described below, certain elements and components may have at least a portion thereof exposed externally of the enclosure 22.

The enclosure 22 is preferably constructed of a material that is inexpensive, light-weight, relatively rigid, resistant to damage and to wear due to exposure to the external environment, and that will not cause chemical, biological, or physical irritation to the livestock 12 to which the tag 20 is attached. A number of commercially available plastic materials are suitable for these purposes.

Figure 1B:
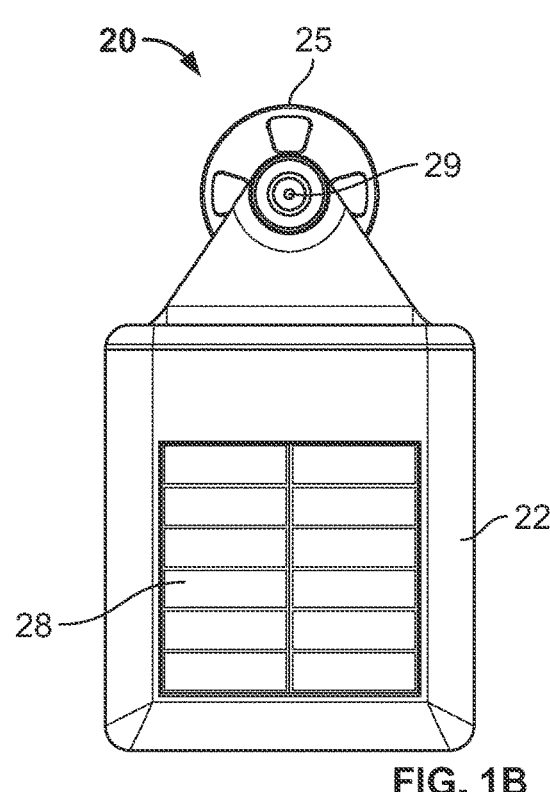
FIG. 1B is a front view of a tag component of a livestock management system in accordance with an example embodiment.
Figure 1C:
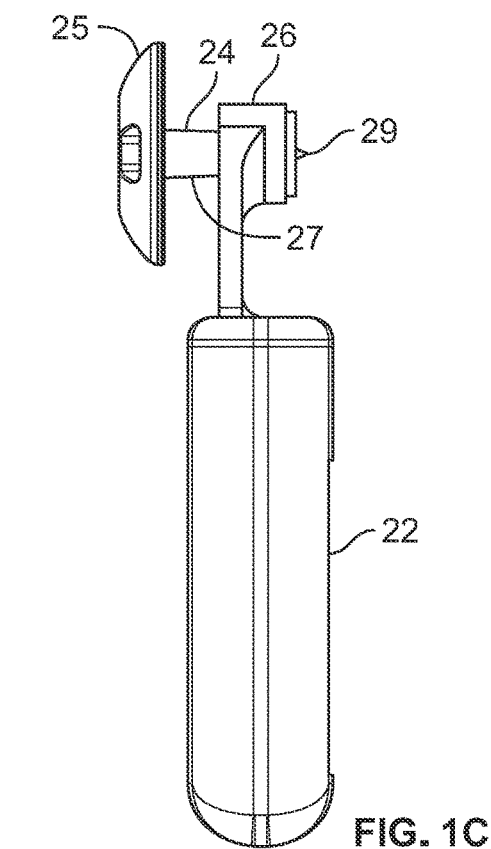
FIG. 1C is a side view of a tag component of a livestock management system in accordance with an example embodiment.
Figure 1D:
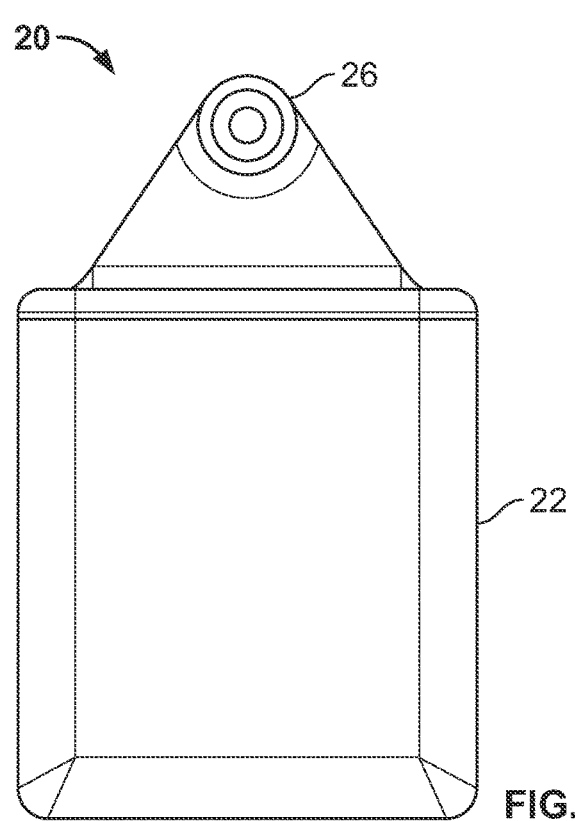
FIG. 1D is a back view of a tag component of a livestock management system in accordance with an example embodiment.

The enclosure 22 may have any shape consistent with the foregoing purposes. In one example embodiment described herein, the enclosure 22 may have a substantially square or rectangular peripheral shape and a relatively thin depth dimension (FIG. 1C) between the front exterior surface (FIG. 1B) and the rear exterior surface (FIG. 1D). Preferably, all of the peripheral edges of the enclosure 22 are beveled or rounded to minimize any physical irritation to the livestock 12 to which the tag 20 is attached.

The male attachment element 24 comprises a backing element 25, an elongated shaft 27 and a tip 29. The male attachment element 24 is selectively attachable and detachable from the enclosure 22 as described further below. The elongated shaft 27 has a first end portion and a second end portion opposite of the first end portion. The backing element 25 is connected, attached, or formed integrally with the first end portion and the tip 29 is connected, attached, or formed integrally with the second end portion. The tip 29 is adapted and configured to pierce and extend through the tissue of the outer ear or auricle of a livestock 12 to which the tag 20 is to be attached from the outside back of the ear to the inside front of the ear. Accordingly, the tip 29 is preferably tapered and has a relatively sharp point. The backing element 25 is adapted and configured to retain the male attachment element 24 on and against the ear. It is contemplated that with the tag 20 attached to the outer ear of the livestock 12 the backing element 25 will be in contact with the outside back of the ear. Accordingly, the backing element 25 is preferably shaped to securely retain the tag 20 on the ear and also to minimize the potential for injury to the ear, for example tearing of the tissue, and any discomfort to the livestock 12. In one example embodiment described herein, the backing element 25 is substantially cup-shaped. This spreads the force on the ear due to the weight of the tag 20 over a wider surface area and thus minimizes the potential for injury and discomfort, and also helps prevent foreign debris from snagging and resulting in damage to the tag 20 or animal.

The female attachment element 26 is connected, attached, or formed integrally with the enclosure 22. The female attachment element 26 comprises an extension or projection that extends or projects outwardly from a peripheral edge of the enclosure 22. The extension has a first end portion at and near the peripheral edge and a second end portion opposite of the first end portion that is spaced apart from the peripheral edge. The second end portion of the male attachment element 24 is adapted and configured to be selectively attachable and detachable to the female attachment element 26. The second end portion has a socket with an opening and passage that are adapted to selectively receive and retain the second end portion of the male attachment element 24 such that the male attachment element 24 is selectively attachable and detachable from the female attachment element 26 and hence the enclosure 22. Preferably, the second end portion of the male attachment element 24 and the opening and passage of the female attachment element 26 are configured and adapted so that the enclosure 22 is pivotable about the shaft 27 of the male attachment element 24 with the tag 20 attached to the ear of a livestock 12. This enables the enclosure 22 to pivot under the force of gravity and the tag 20 to continue to hang downwardly as the livestock 12 moves and/or changes orientation and regardless of the orientation of the shaft 27. The lateral forces on the ear tissue that could otherwise result from the weight of the tag 20 and that could result in injury are reduced. In addition, the uniform downward orientations of the tags 20 render them easier to visually locate, identify, and read or otherwise access. Various corresponding pivotable quick-connect and disconnect structures can be included on the shaft 27 of the male attachment element 24 and in the opening and passage of the female attachment element 26 for the foregoing purposes.

With the male attachment element 24 and the female attachment element 26 being selectively attachable and detachable, the tag 20 is selectively attachable and detachable from the livestock 12. This feature beneficially allows the tag 20 to be selectively detached, for example if necessary to replace a battery of the tag 20, which is self-powered, or if the livestock 12 to which the tag 20 is attached dies or otherwise ceases to be under management, and then to be re-attached to the same or a different livestock 12. However, it is contemplated and will be appreciated that alternatively the male attachment element 24 and female attachment element 26 may be configured and adapted for permanent and one-time only attachment of the tag 20 to a livestock 12. In that case, upon detachment either the male attachment member 24, the female attachment member 26, or both, may be rendered physically incapable of being re-attached to the other and thus the tag 20 cannot be re-attached and a new tag 20 must be attached. Both alternatives are intended to be included within the scope of the example embodiments described herein.

As noted above, certain elements and components of the tag 20 may have at least a portion thereof exposed externally of the enclosure 22. For example, the power system 40 of the tag 20, which is described in detail below, may include one or more external energy collectors such as one or more solar energy cells 28. As illustrated in FIGS. 1A-1B, and 2, the sunlight collecting surfaces of the one or more solar energy cells 28 are exposed to the external environment in one or more external surfaces of the enclosure 22. Similarly, other elements and components of the tag 20 that are intended to interact with the environment external to the tag 20 may have portions exposed externally of the enclosure 22. These may include, but are not limited to, one or more LED's 64, a microphone 66, a speaker for a tone generator 68, and a lens for a camera 72. Each of these elements is described in detail in the sections below.

2. Elements and Architecture.

Figure 3:
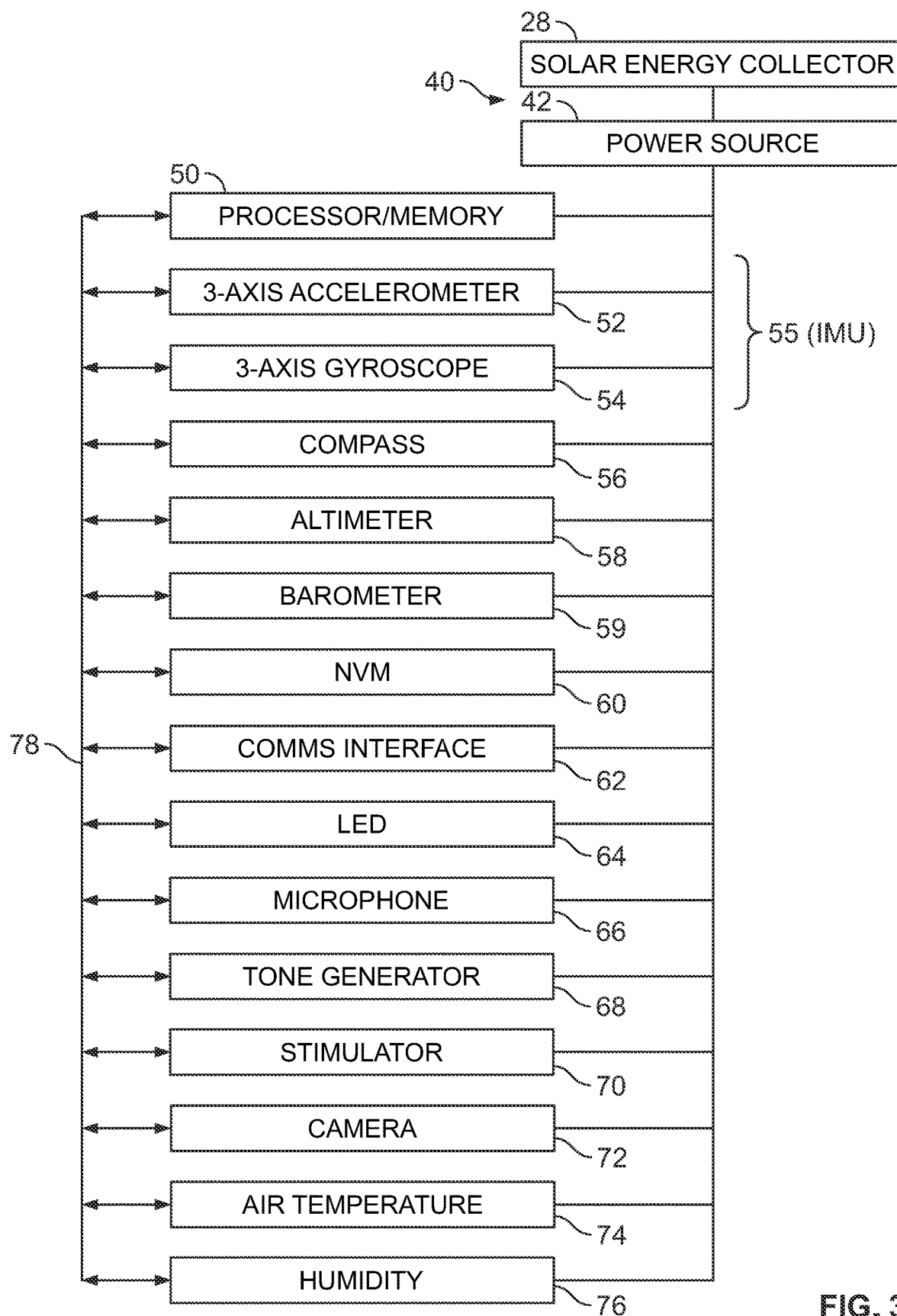
FIG. 3 is a block diagram illustrating the elements and architecture of tag component of a livestock management system in accordance with an example embodiment.
Figure 4:
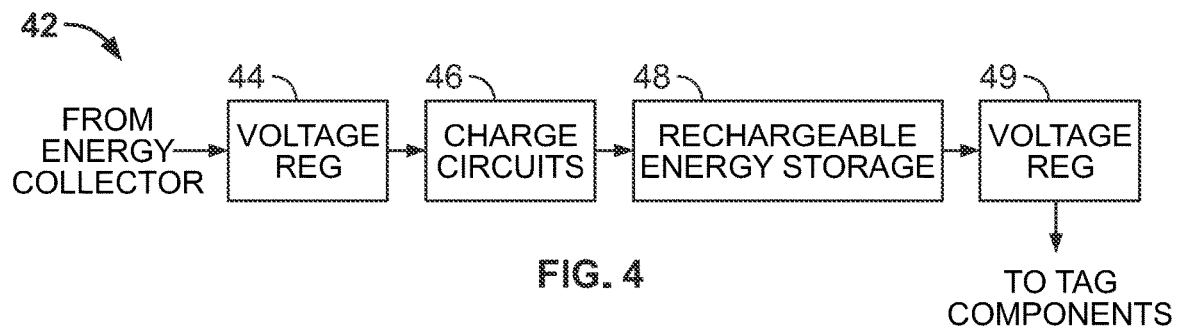
FIG. 4 is a block diagram illustrating the elements and architecture of a power source of a tag component of a livestock management system in accordance with an example embodiment.

Each tag 20 is self-powered and includes a self-contained power system 40 within the enclosure 22. As illustrated in FIGS. 3-4, the power system 40 includes an external energy collector, e.g., solar cells 28, and a power source 42.

The external energy collector is intended to generate electrical energy from a source external to the power source 42. In one example embodiment described herein, the external energy collector may comprise one or more solar energy cells 28 that are adapted and configured to convert sunlight to electrical energy. However, the external energy collector also may comprise other types of external energy producing elements, such as piezoelectric elements that are adapted and configured to convert motion of the tag 20 as the livestock 12 moves to electrical energy. The external energy collector may include still other types of external energy producing elements as well. The external energy collector also may include one or a plurality of such elements in combination.

The power source 42 has an input and an output. The input is electrically coupled to the external energy collector, e.g., solar cells 28, and receives an electrical current produced by it. The output is electrically coupled to the electrical inputs of the various elements and components of the tag 20 that require electrical power to operate and provides the electrical operating power required such elements and components.

The power source 42 may include a voltage regulator 44, a charging circuitry 46, and rechargeable energy storage 48. The voltage regulator 44 has an input and an output. The input comprises the input of the power source 42 and receives electrical current (DC) from the external energy collector. Alternatively, the input of the power source 42 may be directly connected to charging circuitry 46 (without using voltage regulator 44). The magnitude of the current produced by the external energy collector may vary over a relatively wide range depending on environmental and other conditions. The voltage regulator 44 is operative to produce at its output an electrical voltage (DC) that has a magnitude within the operating range of the charging circuitry 46 and the rechargeable energy storage 48 and that is fixed within a fairly narrow range. The output of the rechargeable energy storage 48 may also be regulated by voltage regulator 49, the output of which is then the output of the power source 42. The voltage regulator 49 can provide a constant or nearly constant output voltage of power source 42 to the various electronic elements and components of the tag 20 regardless of voltage fluctuations of the rechargeable energy storage 48.

The charging circuitry 46 has an input and an output. The input is electrically coupled to the output of the voltage regulator 44. The charging circuitry 46 is operative to produce at its output an electrical charging current (DC) having magnitude that is related to the magnitude of the regulated voltage (DC) on its input. The magnitude of the electrical charging current is within the charging current limits of the rechargeable energy storage 48. The charging circuitry 46 also may include circuitry that detects and monitors the voltage level and/or current draw of the rechargeable energy storage 48 and that is responsive to automatically control the on/off state and/or the level of the electrical charging current to recharge the rechargeable storage 48 when the charge level falls to a predetermined low level and to discontinue charging when the charge level reaches a predetermined max level to prevent over-charging.

The rechargeable energy storage 48 may comprise one or more suitable batteries, although any other suitable form of rechargeable electrical energy storage could also be used.

The rechargeable energy storage 48 has an input and an output. The input is electrically coupled to the output of the charging circuitry 46 and receives the electrical charging current to initially charge and subsequently re-charge the rechargeable energy storage 48 as necessary. The output comprises the output of the power source 42 and provides the electrical operating power (DC current and voltage) to the various electronic elements and components of the tag 20 at required levels. Preferably the electronic elements and components will consume as little power as possible in operation, preferably less than a few milliwatts (mWs) on average.

As illustrated in FIG. 3, the data collection, processing, storage, communications, and control components and elements of each tag 20 may include a processor and memory element 50, a three-axis accelerometer 52, a three-axis gyroscope 54, a compass 56, an altimeter 58, a barometer 59, non-volatile memory (NVM) 60, a communications (COMMS) interface 62, one or more LED's 64, a microphone (MIC) 66, a tone generator 68 and speaker, a stimulator 70, a camera 72, an air temperature sensor 74, and a humidity sensor 76. The three-axis accelerometer 52 and the three-axis gyroscope 54, collectively, may comprise or be referred to as an Inertial Measurement Unit 55. When the accelerometer 52 is being used, the gyroscope 54 may also be used in unison to detect motion of the livestock 12.

The processor 50 may comprise one of the types of processors described herein below. For example, the processor 50 may be a commercially available microprocessor and/or microcontroller. Preferably the processor 50 is a type that consumes a very small amount of power while carrying out the intended functions and operation of the tags 20 as described herein. The processor 50 executes programs, applications, models, etc. stored in the tag 20 in order to perform the functions and operations of the tag 20 as described herein.

The processor 50 is configured and programmed to communicate with, to control, and to manage the operation of the various other components and elements of the tag 20 identified above and illustrated in FIGS. 3 and 4. The processor 50 is connected to and communicates with each of the elements and components via a bus 78. The bus 78 may comprise one or more physical and/or logical buses adapted to carry data, instructions, commands, requests, control words, etc. between the processor 50 and each of the other elements and components to carry out the functions and operations of the tag 20 as described herein.

The memory element of the processor 50 comprises a memory controller and volatile memory. The memory controller may be entirely or partially on the same chip as the processor 50 or may be entirely or partially on one or more separate chips. Similarly the volatile memory may be entirely or partially on the same chip as either the processor 50 or the memory controller, or may entirely or partially on one or more separate chips. The memory controller manages various aspects of the volatile memory and provides an interface for reading and writing data from the volatile memory. The volatile memory provides temporary storage for an operating system, for run-time computations by the processor 50, for data received and recorded by various data collecting components of the tag 20 described below, and perhaps for programs, applications, models, etc. being executed by the processor 50. The volatile memory preferably comprises a fast, low power type of random access memory. For example, the volatile memory can be comprised of low power SRAM or DDR. The volatile memory can also be supplemented or replaced with various non-volatile types of memory that provide a power consumption advantage. For example, a phase change type of memory (PCM) can be used.

The accelerometer 52 provides data indicative of the movement of the tag 20 corresponding to movement of the livestock 12 to which the tag 20 is attached in three axes which may be referred to as longitudinal, lateral, and vertical or pitch roll, and yaw axes. The data provided by the accelerometer 52 is used to determine when the livestock 12 is moving and stationary, as well as the linear direction and perhaps the rate of movement. This information can in turn be used to determine certain activities, behaviors, and physical conditions of the livestock 12. The accelerometer 52 may be a commercially available MEMs, piezoelectric, or other type of accelerometer that is suitable for carrying out and is consistent with the objectives and functionality described herein. The accelerometer 52 may be combined with one or more of the other data collection devices described herein on the same chip or in the same package, or may be a separate device on a separate chip or in a separate package. The accelerometer data may be generated, communicated to, and/or received by the processor 50 continuously or periodically. The accelerometer data also may be generated and communicated to the processor 50 automatically or on demand.

The gyroscope 54 provides data indicative of the orientation of the tag 20 corresponding to the orientation of the livestock 12 to which the tag 20 is attached in relation to three axes, which may be the same three axes to which the accelerometer 52 is referenced. The data provided by the gyroscope 54 is used to determine angular movement and orientation of the livestock 12, which in turn can be used to determine certain activities, behaviors, and physical conditions of the livestock 12. The gyroscope may be a commercially available MEMs, piezoelectric, or other type of gyroscope that is suitable for carrying out and is consistent with the objectives and functionality described herein. The gyroscope 54 may be combined with one or more of the other data collection devices described herein on the same chip or in the same package, or may be a separate device on a separate chip or in a separate package. The gyroscope data may be generated, communicated to, and/or received by the processor 50 continuously or periodically. The gyroscope data also may be generated and communicated to the processor 50 automatically or on demand.

The compass 56 provides data indicative of the direction the tag 20 and hence the livestock 12 to which it is attached are facing relative to the cardinal directions of the earth, e.g., north, south, east, and west. The data provided by the compass 56 is used to determine the geographic heading of the livestock 12. This in turn can be used to help track the location of the livestock 12, predict where it is headed, and determine certain activities, behaviors, and physical conditions of the livestock 12. The compass may be a commercially available solid state MEMs or other type of magnetometer that is suitable for carrying out and is consistent with the objectives and functionality described herein. The compass 56 may be combined with one or more of the other data collection devices described herein on the same chip or in the same package, or may be a separate device on a separate chip or in a separate package. The compass data may be generated, communicated to, and/or received by the processor 50 continuously or periodically. The compass data also may be generated and communicated to the processor 50 automatically or on demand.

The altimeter 58 and/or barometer 59 provides data indicative of the altitude or elevation of the tag 20 and hence the livestock 12 to which it is attached. The altimeter 58 and/or barometer 59 can provide data indicative of altitude or elevation relative to sea level or another reference elevation or data indicative of a relative change in altitude or elevation over time. For example, the barometer 59 (or the altimeter 58) might not always be able to determine a change in altitude reflecting an animal behavior, if limited to absolute barometric pressure, especially in an enclosed tag. But by using relative changes in barometric pressure, the barometer 59 can detect small changes in pressure occurring over very short time intervals to determine if, for example, an animal has changed position so as to affect the relative altitude (e.g., change in height) of the tag. The data provided by the altimeter 58 and/or the barometer 59 can be used to help track the location of the livestock 12. Variation or lack of variation in elevation also can be used to determine certain activities, behaviors, and health-related or physical conditions of the livestock 12. The altimeter 58 may be a commercially available solid state MEMs, piezoelectric, or other type of altimeter that is suitable for carrying out and is consistent with the objectives and functionality described herein. The altimeter 58 may be combined with one or more of the other data collection devices described herein on the same chip or in the same package, or may be a separate device on a separate chip or in a separate package. The altimeter data may be generated, communicated to, and/or received by the processor 50 continuously or periodically. The altimeter data also may be generated and communicated to the processor 50 automatically or on demand.

The barometer 59, the air temperature sensor 74, and the humidity sensor 76 provide data indicative of environmental and weather-related conditions in which the tag 20 is operating. The data provided by these sensors can be used to determine if conditions are suitable or unsuitable for a tag 20 to communicate data. The data can also be used to determine if meteorological conditions exist that may pose a risk to the livestock 12 and that may warrant generating an alert and/or taking actions to safeguard the livestock 12, such as moving them to shelter or to another location. The barometer 59, air temperature sensor 74, and humidity sensor 76 may be commercially available solid state diode, ceramic dielectric capacitive, MEMs, piezoelectric, bi-metal or other sensors or a combination thereof that are suitable for carrying out and are consistent with the objectives and functionality described herein. Each or all of the barometer 59, air temperature sensor 74, and humidity sensor 76 may be combined with each other and with one or more of the other data collection devices described herein on the same chip or in the same package, or may be separate devices on separate chips in separate packages. The barometer 59, air temperature sensor 74, and humidity sensor 76 data may be generated, communicated to, and/or received by the processor 50 continuously or periodically. The data also may be generated and communicated to the processor 50 automatically or on demand.

The non-volatile memory (NVM) 60 provides long term storage for an operating system, for certain unchanging or infrequently changing parameters, settings, and data related to the tag 20 and its functions and operations, e.g., a BIOS, and for programs, applications, models, and related parameters and data, etc. that are desired to reside permanently or semi-permanently in the tag 20. Some or all of these items may be copied or transferred to the volatile memory component for execution by the processor 50. The NVM 60 preferably comprises a memory type that can be overwritten so that the stored data, programs, models etc. can be changed from time to time, for example to incorporate changes or updates. Suitable types of memory for such purposes include a complementary metal oxide semiconductor (CMOS) type of Flash or other electrically erasable programmable read only memory (EEPROM), or an erasable programmable read only memory (EPROM).

The communications (COMMS) interface 62 provides interfaces to a number of different communication channels over which the tag 20 can communicate. These include channels for communicating with one or more sensors 32 implanted in and/or attached to the livestock 12 to which the tag 20 is attached, with other nearby tags 20, with nearby local sensors and transceivers 34, with the management system platform 140, with the remote computer system 220, and with global positioning satellites 83. The COMMS interface 62 also provides data regarding, among other things, the status and availability of connections over the communications channels, and data regarding the signal levels of the available connections. The COMMS interface 62 is described in additional detail below with reference to FIG. 5.

The LED 64, microphone (MIC) 66, tone generator 68 with speaker, stimulator 70, and camera 72 components are adapted and configured to collect various forms of data from the external environment and to communicate and interact with the livestock 12 to which the tag 20 is attached. Similar to the solar cells 28 that comprise the external energy collector, at least a portion of each of these components may be exposed externally of the enclosure 22 of the tag 20 for those purposes.

The LED 64 is controlled by the processor 50 in response to either a determination made locally by the processor 50 or commands or instructions received from the management system platform 140. The processor 50 may control the LED 64 to selectively cause it to be activated and de-activated. For example, the processor 50 may cause the LED 64 to repeatedly blink on and off to visually bring attention to the tag 20. This can be used to help identify, distinguish, and bring attention to an individual tag 20 attached to an individual livestock 12 from among a plurality of tags 20 attached to a plurality of livestock 12 of a herd under management when either the individual tag 20 or the individual livestock 12 to which it is attached requires individual attention.

The microphone 66 and the camera 72 provide information about sounds and still and/or moving video in the environment around and external to the tag 20 and in some cases the livestock 12 to which the tag 20 is attached. The microphone 66 and camera 72 each may be accessed by the processor 50 in response to either a determination made locally by the processor 50 or a command or instruction received from the management system platform 140. The processor 50 may access each of the microphone 66 and the camera 72 on a periodic schedule or on an on-demand basis. In addition, each or either of the microphone 66 and the camera 72 may include separate control circuitry that enables the microphone 66 and/or the camera 72 to automatically respond to a sound and/or video stimulus independent of the processor 50 and to communicate data regarding the sound and/or video stimulus to the processor 50. Alternatively, the microphone 66 and the camera 72 may share common control circuitry for that purpose. For example, the microphone 66 may be controlled to automatically respond to a sound having loudness above a threshold level or to a sound of a particular type, such as a particular type of sound occurring in the external environment or made by the livestock 12 to which the tag 20 is attached. Similarly, the camera 72 may be controlled to automatically respond to certain detected shapes or movements in the external environment.

The audio and video data provided by the microphone 66 and/or the camera 72 are helpful in determining the occurrence of certain events external to the livestock 12 such as a nearby gunshot, or the approach of a predator or vehicle. They are also helpful in determining certain activities, behaviors and health-related and other physical conditions of the livestock 12. For example, detection of repeated or continuous bawling or mooing sounds by the microphone 66 may indicate the livestock 12 is ill or injured, has become separated from a calf, or that a predator is nearby. The microphone can also be used to detect coughing or other sounds, to aid in determining if a livestock 12 is ill. Similarly, detection of certain video may indicate the livestock 12 is down, ill or injured, trapped, etc. or that the livestock 12 is involved in certain behavior such as mating.

The tone generator 68 and the stimulator 70 are controlled by the processor 50 in response to either a determination made locally by the processor 50 or commands or instructions received from the management system platform 140. The processor 50 selectively causes the tone generator 68 to produce a tone or sound that can be heard by the livestock 12. The tone or sound may be one of a plurality of selectable tones or sounds. The processor 50 selectively causes the stimulator 70 to generate a physical stimulus that can be felt by the livestock 12. The stimulus may be one or more of a plurality of selectable physical stimuli. The stimulus may comprise various haptics such as a vibration, buzzing, rumbling, or other felt stimuli. The processor 50 may cause the tone generator 68 to generate a tone or sound and the stimulator 70 to generate a stimulus in response to a detected or determined occurrence or event external to the tag 20 and/or the livestock 12, a detected or determined activity or behavior of the livestock 12, or a determined health-related or other physical condition of the livestock 12, etc. For example, the tone generator 68 may be caused to generate a tone or sound and/or the stimulator 70 may be caused to generate a stimulus when it is detected that the livestock 12 has left a designated area or entered an unauthorized area, e.g., has crossed beyond a geo-fence, to alert the livestock 12 to return. The tone generator 68 also may be caused to generate a tone or sound in an attempt to scare off a predator that is detected nearby. The tone generator 68 also may be caused to generate a tone or sound possibly in connection with the LED 64 being activated, to identify, distinguish, and bring attention to an individual tag 20 attached to an individual livestock 12 of a herd under management when either the individual tag 20 or the individual livestock 12 to which it is attached requires individual attention.

In addition to the above, the processor 50 also communicates with and controls the power source 42 and the communications interface 62. The processor 50 can receive or determine the charge or power level and/or charging state of the rechargeable energy storage 48 from the power source 42. For example, the processor 50 can detect a voltage level of the rechargeable energy storage 48, such as a battery or a supercapacitor, and/or detect the charging current being supplied by the charging circuitry 46 via an analog to digital converter (ADC). Depending on the nature of the power source 42, other methods can also be used such as a gas gauge or a battery model implemented in the processor 50. The processor 50 receives or determines the status, availability and signal levels of connections over the various communications channels the tag 20 can use to communicate data from the communications interface 62. This data from the power source 42 and/or the communications interface 62 can be used alone or in conjunction with data provided by the other elements and components described above to determine if the tag 20 has sufficient power to communicate its data to other nearby tags 20 in a dynamic local mesh network and/or directly to the management system platform 140 or remote computer system 220. It is also used to determine which tag 20 in a dynamic local mesh network is the optimum tag, i.e., in the best condition, to communicate aggregated livestock data of the tags 20 in the local network and if it has sufficient power and signal strength to do so. The data may also be used as a trigger for the tag 20 to generate and communicate to the management system platform 140 an alert or alarm indicating a low-power or low-signal condition, malfunction, and/or service request.

Figure 5:
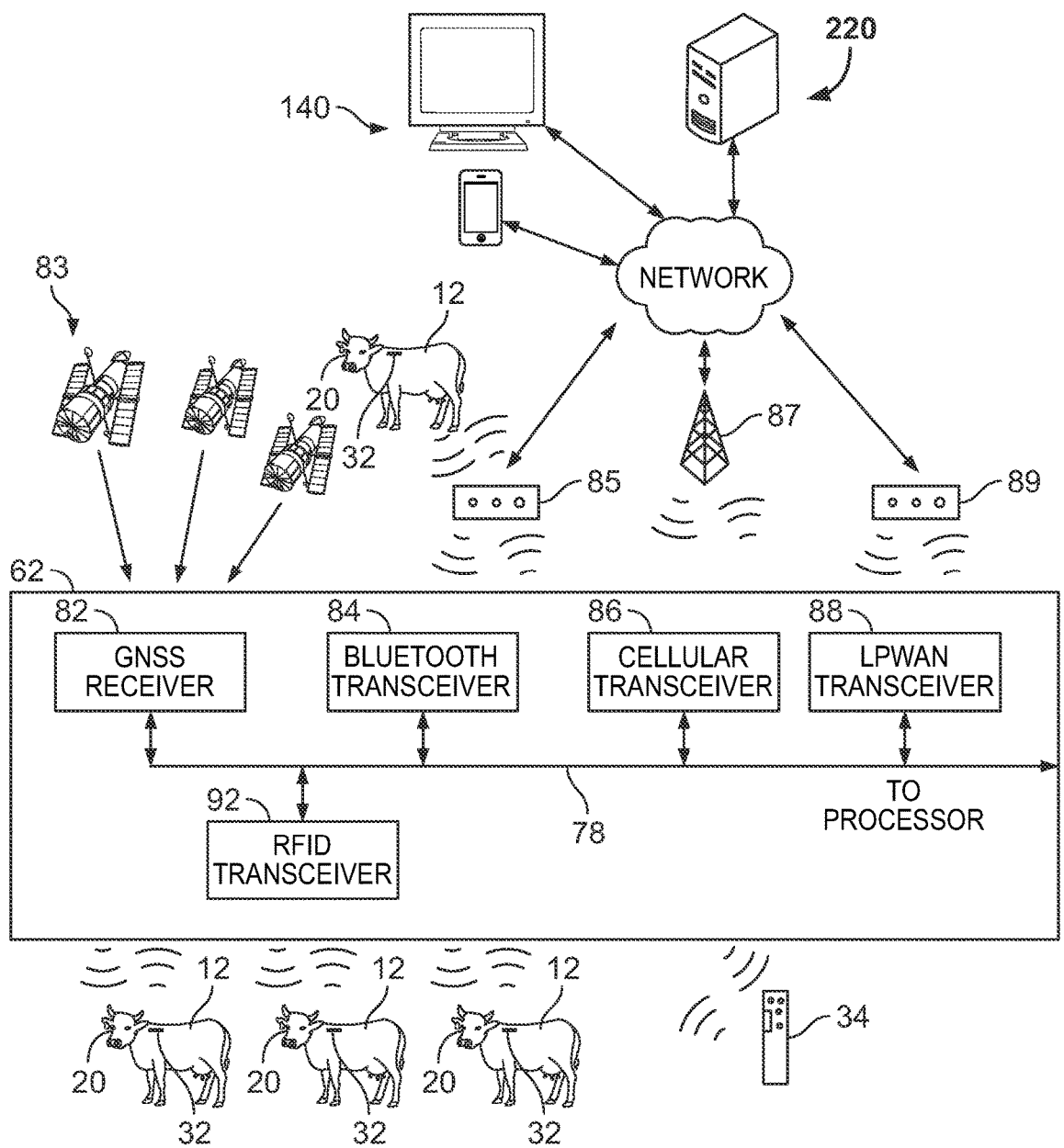
FIG. 5 is a combination block diagram illustrating the elements and architecture of a communications interface of a tag component of a livestock management system and graphical representation illustrating communication relationships between the communications interface and other elements of the system in accordance with an example embodiment.

Referring to FIG. 5, each tag 20 is adapted and configured to communicate via its communications interface 62 with one or more sensors 32 implanted in and/or attached to the livestock 12 to which the tag 20 is attached, with the management system platform 140, with the remote computer system 220, with any other nearby tags 20, and with any nearby local sensors and transceivers 34. The communications interface 62 of each tag 20 can include a global navigation satellite system (GNSS) receiver 82, and one or more of a Bluetooth transceiver 84, a cellular network transceiver 86, a satellite data network transceiver, one or more LPWAN transceivers 88, and an RFID transceiver 92. Although not identified separately, each receiver and transceiver has a suitable corresponding antenna or antennas. Each of the receivers and transceivers of the communications interface 62 communicates with the processor 50 over the bus 78. The receivers and transceivers may each be separate or one or more of them may be integrated in one or more chips and/or packages with each other and/or with other components, or may be included within the processor 50. For example, in one embodiment the Bluetooth and LPWAN transceivers 84, 88 could be integrated with the processor 50 and one or more of the GNSS receiver 82, satellite data transceiver, and cellular transceiver 86 could be integrated with each other or another component.

The GNSS receiver 82 receives global satellite positioning signals from satellites 83 and determines from the signals the position of the tag 20 and hence the livestock 12 to which it is attached in terms of latitude and longitude. The GNSS receiver 82 may comprise a commercially available receiver that is adapted and configured to receive global positioning satellite signals from one or more national and/or regional global positioning satellite constellations. Suitable constellations and systems include, but are not limited to GPS (Navstar), GLONASS, Galileo, and Beidou. Preferably, the GNSS receiver 82 used is one designed for use in battery-powered applications and has very low power consumption. For example, some commercially available GNSS receivers designed for low power applications operate intermittently to receive satellite signals and determine position, then sleep in between position determinations to reduce power consumption. Some receivers also receive satellite position data (ephemeris) over terrestrial low power network connections rather than via satellite communication to reduce power consumption.

The Bluetooth transceiver 84 is operative to transmit and receive data wirelessly with other nearby Bluetooth transceivers that are within Bluetooth signal range. The Bluetooth transceiver 84 may comprise a commercially available Bluetooth transceiver, and preferably a Bluetooth Low Energy (BLE) transceiver having lower power consumption than traditional Bluetooth transceivers. In addition to each of the tags 20, Bluetooth transceivers 84 may also be embedded in sensor(s) 32 implanted in and/or attached to the livestock 12 to which the tags 20 are attached and in local sensors and transceivers 34 that are located in various areas or locations of a property under management where livestock 12 may be present. Such sensor(s) 32 and local sensors and transceivers 34 are described in detail in the sections below. Each tag 20 is thus adapted and configured to communicate wirelessly and directly with the sensor(s) 32 of the livestock 12 to which the tag 20, and with every other nearby tag 20 and every local sensor and transceiver 34 within Bluetooth signal range via their respective Bluetooth transceivers 84.

It will be appreciated that the Bluetooth transceiver 84 is one particular type of RF transceiver that can form a type of wireless local area network (LAN) and that is suitable for relatively short range wireless communications at relatively low data rates. It is contemplated and will be appreciated that other types of wireless communications transceivers or interfaces such as a Wi-Fi transceiver, e.g., IEEE 802.11a, b, g, n, may be used in addition to or in lieu of the Bluetooth transceiver 84. Wi-Fi transceivers are generally able to transmit data at considerably higher data rates and over greater distances than Bluetooth transceivers. However they also consume more power than Bluetooth transceivers.

Bluetooth transceivers also may be embedded in one or more commercially available Bluetooth gateways or hubs 85 that may be located in one or more areas or locations of a property under management where livestock 12 may be present. The Bluetooth gateways/hubs 85 in turn may have one or more wireless and/or wired connections to one or more other data networks to which the management system platform 140 and/or the remote computer system 220 are connected. Such other networks may include, for example, a TCP/IP-based LAN or an HTTP-based WAN such as the Internet. The Bluetooth gateways/hubs 85 thus provide nearby tags 20 that are within Bluetooth signal range with at least one longer range communication channel for the tags 20 to wirelessly and directly communicate with the management system platform 140 and/or the remote computer system 220. One or more Bluetooth gateways or hubs 85 also may be adapted and configured to function as Bluetooth repeaters. In that case, tags 20 that are not in Bluetooth signal range of each other can still communicate with each other wirelessly via Bluetooth.

The cellular network transceiver 86 is operative to wirelessly transmit and receive data to and from the tag 20 over relatively long distances (longer than Bluetooth or Wi-Fi) via one or more cellular networks. Such a longer range communication channel enables the tag 20 to send and receive data even when the livestock 12 to which it is attached is not in proximity to a shorter range transceiver such as Bluetooth, for example when the livestock 12 is on an open range. The cellular network transceiver 86 may be a commercial available transceiver that is adapted and configured to communicate data over one or more cellular networks, including but not limited to, CDMA, WCDMA, GSM, GPRS, LTE, EDGE, UMTS, and iDEN-based cellular networks. The cellular network transceiver 86 communicates data with one or more cell towers 87 within cellular signal range. Commercially available cellular network transceivers are generally capable of transmitting data signals to cell towers 87 up to about forty-five miles away depending on conditions. The cell towers 87 may communicate data in both directions between individual tags 20 and the management system platform 140 and/or the remote computer system 220 directly over the cellular network or over the cellular network and an intermediate LAN or WAN network, including but not limited to the Internet. The data communicated may be data of an individual tag 20 or data aggregated from a plurality of tags 20 in a dynamic local mesh network as described further below. One or more cellular boosters, repeaters, and/or gateways may also form part of the cellular communications channel between the tag 20 and the management system platform 140 and/or remote computer system 220.

If included, the satellite data network transceiver is in addition to the GNSS receiver 82. The satellite data network transceiver is operative to wirelessly transmit and receive data to and from the tag 20 over relatively long distances (longer than Bluetooth or Wi-Fi) similar to the cellular network transceiver 86, except via one or more satellite data networks such as OrbComm, Iridium, or Globalstar for example.

The LPWAN transceiver 88 is operative to wirelessly transmit and receive data to and from the tag 20 over relatively long distances (longer than Bluetooth or Wi-Fi) with very low power consumption. The LPWAN transceiver 88 can be a commercially available LPWAN transceiver such as a LORA or Sigfox transceiver. The LPWAN transceiver can comprise one or more different LPWAN transceivers. LPWAN transceivers 88 are specifically designed for use in applications requiring very low power consumption, e.g., battery-powered IoT sensor applications, and currently are capable of communicating data over distances up to about thirty miles depending on conditions. Like the cellular and satellite network communication channels, the LPWAN communication channel enables the tag 20 to send and receive data even when the livestock 12 to which it is attached is not in proximity to a shorter range transceiver such as Bluetooth, for example when the livestock 12 is on an open range. Commercially available LPWAN transceivers are generally smaller and consume less power than comparable commercially available cellular and satellite transceivers, but generally have lower bandwidth and data rates. The LPWAN transceiver 88 can communicate data with one or more LPWAN gateways 89 within signal range. The LPWAN gateways 89 may communicate data in both directions between individual tags 20, and between tags 20 and the management system platform 140 and/or the remote computer system 220 via one or more intermediate LAN, WAN, cellular and/or satellite networks. The data communicated may be data of an individual tag 20 or data aggregated from a plurality of tags 20 in a dynamic local mesh network as described further in the sections below. One or more signal boosters and/or repeaters may also form part of the LPWAN communications channel between the tag 20 and other tags, and/or between the tag 20 and the management system platform 140 and/or remote computer system 220.

If included, the RFID transceiver 92 is operative to transmit and receive data wirelessly with other nearby RFID transceivers that are within signal range. The RFID transceiver 92 may comprise a commercially available RFID transceiver. In addition to each of the tags 20, RFID transceivers 92 may also be embedded in sensor(s) 32 implanted in and/or attached to the livestock 12 to which the tags 20 are attached and in local sensors and transceivers 34 that are located in various areas or locations of a property under management where livestock 12 may be present. Such sensor(s) 32 and local sensors and transceivers 34 are described further below. Each tag 20 is thus adapted and configured to communicate wirelessly and directly with the sensor(s) 32 implanted in and/or attached to the livestock 12 to which the tag 20 is attached, and with every other nearby tag 20 and every local sensor and transceiver 34 within RFID signal range via their respective RFID transceivers 92.

It will be appreciated that some or all of the communication functions performed by the RFID transceiver 92 embedded in the tag 20 may also be performed by the Bluetooth transceiver 84 and/or the LPWAN transceiver 88. Accordingly, an RFID transceiver 92 may not be necessary and may not be included in all embodiments.

If an RFID transceiver 92 is included, in lieu of embedding it in the tag 20, it may be embedded in a chip that is implantable in an ear or other body part of the livestock 12 separate from the tag 20. In that case, the chip and the RFID transceiver 92 may be powered externally by sunlight, a laser light, or by energy from an external RFID reader or scanner. Upon being powered up, the chip and RFID transceiver 92 would be adapted and configured to communicate directly with the tag 20 and to transfer its information directly to the tag 20. The chip can also be read by a scanner/reader, for example to identify an animal with which a tag 20 is associated when the tag 20 has become detached and fallen off the animal. Such data could include, but is not limited to, information identifying the livestock 12 and associated tag 20, e.g., unique identification number and tag ID. The chip and RFID transceiver 92 could thus operate as a redundant backup of the tag data should the tag 20 become detached, damaged, or otherwise unavailable or unusable.

As noted above and as illustrated in FIGS. 6-7, the tags 20 can be adapted and configured so that when they are attached to livestock 12 they can communicate with other nearby tags 20 and nearby local sensors and transceivers 34 and autonomously and automatically organize into one or more dynamic local mesh networks. Depending on the relative locations of the individual livestock 12 of a herd under management at any given time, one or more dynamic local mesh networks may be formed and exist. In addition, as the livestock 12 move and change location relative to each other, the nodes or members, e.g., tags 20 and livestock 12, of various dynamic local mesh networks may dynamically and automatically change as well as the locations of the networks themselves. It is contemplated that in practice with relatively large herds under management, dynamic local mesh networks in excess of 20,000 tags 20 may be formed when livestock 12 are aggregated in a relatively small area of several acres, for example for transportation, sale, slaughter, or at a feedlot. This could lead to situations where tags 20 attached to livestock 12 belonging to different owners or users of the livestock management system 10 could share data between them and communicate aggregated data of different owners or users to the management system platform 140. The management system platform 140 can be configured to limit access to the data appropriate for each user in the manner described in detail below.

Figure 6:
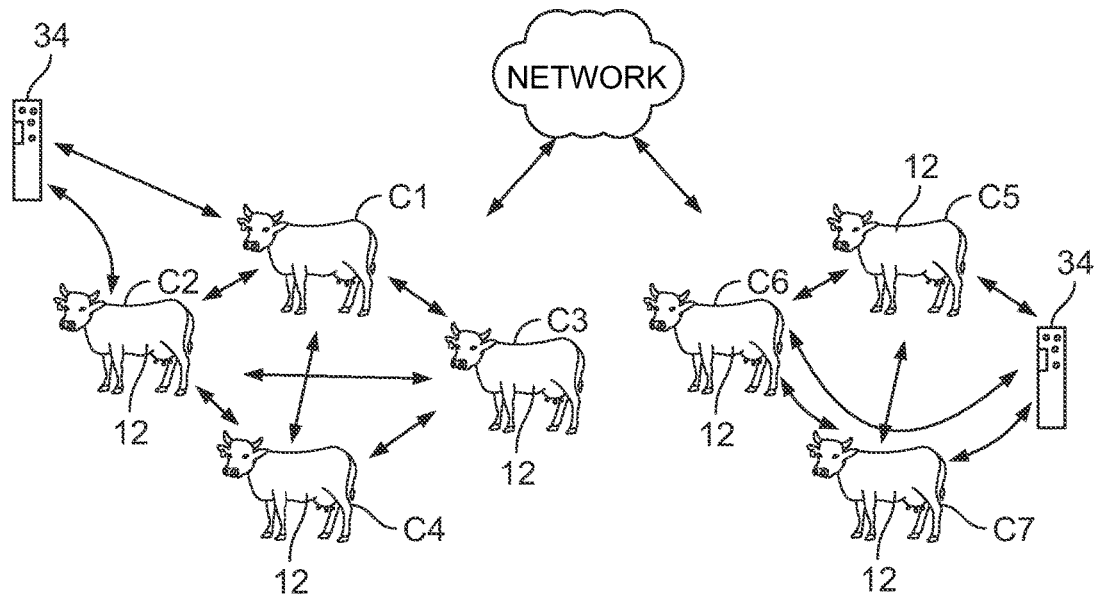
FIG. 6 is a graphical representation of livestock in multiple dynamic local mesh networks within a livestock management system in accordance with an example embodiment.

For example, as illustrated in FIG. 6, at one moment in time individual livestock C1, C2, C3, and C4 are within Bluetooth or LPWAN signal range of each other and a first local sensor 34. At the same time, the tags 20 attached to individual livestock C5, C6, and C7 are within Bluetooth or LPWAN signal range of each other and a second local sensor 34. However, none of the tags 20 attached to C1, C2, C3, and C4 are within Bluetooth or LPWAN signal range of any of the tags 20 attached to C5, C6, or C7. It will be appreciated that as used in this description, "Bluetooth or LPWAN signal range" refers to the range within which the Bluetooth or LPWAN signal strength is sufficient to establish and maintain reliable communication. Using mesh network discovery and communication techniques, the tags 20 attached to C1, C2, C3, and C4 automatically discover and communicate directly with each other and with the first sensor 34 and automatically form a first dynamic local mesh network. Similarly, the tags 20 attached to C5, C6, and C7 automatically discover and communicate directly with each other and with the second sensor 34 and automatically form a second dynamic local mesh network.

Figure 7:
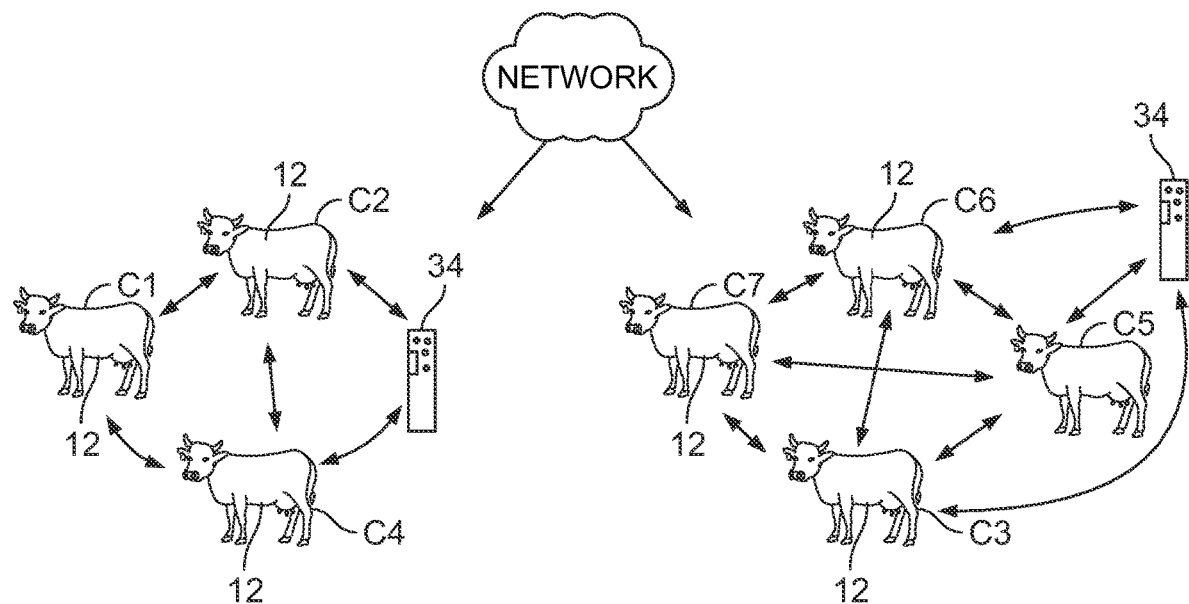
FIG. 7 is a graphical representation of livestock in multiple different dynamic local mesh networks within a livestock management system in accordance with an example embodiment.

As illustrated in FIG. 7, at another moment in time, livestock C3 moves and changes location and the tag 20 attached to it passes out of Bluetooth or LPWAN signal range with the tags 20 attached to livestock C1, C2, and C4 and the first local sensor 34 and into Bluetooth or LPWAN signal range with at least one of the tags 20 attached to livestock C5, C6, C7, and the second local sensor 34. Again using mesh network discovery and communication techniques, the tags 20 attached to C1, C2, and C4, automatically discover that the tag 20 attached to C3 has left the first dynamic local mesh network, automatically re-organize the first dynamic local mesh network, and continue to communicate directly with each other and with the first sensor 34. Similarly, at least one of the tags 20 attached to C5, C6, and C7 automatically discovers that the tag 20 attached to C3 has entered Bluetooth or LPWAN signal range. The tags 20 attached to C3, C5, C6, and C7 automatically re-organize the second dynamic local mesh network to include the tag attached to C3, begin to communicate with that tag 20, and continue to communicate with each other and the second sensor 34.

It will be appreciated that while in the example situations described above both dynamic local mesh networks include a local sensor and transceiver 34, it is also possible and in many instances probable that only tags 20 attached to livestock 12 will be in range to form a dynamic local mesh network. In such instances, the tags 20 can share data between them and one or more tags 20 can communicate aggregated data to the management system platform 140 and/or the remote computer system 220 as described in detail below directly and without the involvement of a local sensor and transceiver 34. In another instance, for example, one or more tags 20 of a local mesh network that includes a local sensor and transceiver 34 may not be within signal range of the local sensor and transceiver 34 but are within signal range of each other. If at least one other tag 20 of the dynamic local mesh network is within signal range of the local sensor and transceiver 34 and within signal range of at least one of the tags 20 that are not within signal range of the local sensor and transceiver 34, then the tags 20 that are not within range of the local sensor and transceiver 34 can communicate their data to the one or more other tags 20 that are within range of the local sensor and transceiver 34 and those other tags 20 can then communicate aggregated data to the management system platform 140 and/or the remote computer system 220 through the local sensor and transceiver 34 if desired. In this way, the geographic range of a dynamic local mesh network can be expanded to cover several miles or more.

The above description regarding detection of nearby tags 20 and organization into one or more dynamic local mesh networks based on location and signal range is merely one example. As one additional example, it is contemplated and will be appreciated that tags 20 may detect more tags 20 that are nearby and are within signal range than are feasible to form a local mesh network and share data with. The tags 20 can thus be adapted and configured to only form a dynamic mesh network with nearby tags 20 meeting predetermined criteria, for example those within a predetermined distance and/or with signal levels above a predetermined value. The tags 20 also can be adapted and configured to limit the number of tags 20 with which they form a local mesh network to a maximum number, for example a predetermined number of tags with the highest signal levels or the closest proximity.

Each tag 20 can be adapted and configured to receive all or a subset of the livestock-related and/or other data, e.g., operational data, of each other tag 20 in a dynamic local mesh network and to transmit all or a subset of its own livestock-related and/or other data to every other tag 20 in the network. Operational data can include for example, but is not limited to, signal strength, stored power level (e.g., battery level or voltage level), and operating condition data. Alternatively, the tag 20 can be adapted and configured to receive and transmit data with only a subset of the other tags 20 in the local mesh network. The subset of tags 20 can be determined based on predetermined criteria similar to the criteria used to determine the tags 20 comprising the local mesh network, for example proximity, signal strength, predetermined number, etc. Accordingly, tags 20 in a dynamic local mesh network can have a copy of all or a subset of the livestock-related and other data of every other tag 20 in the network or of a subset of the tags 20 in the network. Alternatively, the tags 20 in a dynamic local mesh network can be adapted and configured to communicate all or a subset of their data to a single tag 20 in the network, for example the tag 20 determined to have optimal conditions to communicate with the management system platform 140 and/or the remote computer system 220.

Each tag 20 can be configured to determine from its own data and/or from the aggregated data of the tags 20 in a dynamic local mesh network which tag 20 is in the optimum condition to communicate the aggregated data of the tags 20 to the management system platform 140 and/or the remote computer system 220 via one of the communications channels described above, e.g., cellular, satellite, Bluetooth, and/or LPWAN. That determination may be made based on a plurality of factors including, but not limited to, relative power levels, relative signal strengths, and relative conditions for transmission, e.g., atmospheric or meteorological conditions.

Each tag 20 can further be adapted and configured to determine if and when to communicate the aggregated data to the management system platform 140 and/or to the remote computer system 220. That determination may be made internally based on a plurality of factors including, but not limited to, the time and date, conditions for transmission, e.g., atmospheric or meteorological conditions, signal conditions, and power level and/or other operating conditions of the tag 20 itself. The tag 20 can also be triggered to communicate the data in response to an external input received from a user, from the management system platform 140, or from the remote computer system 220.

3. Functions, Data, and Logical Flow.

Figure 8:
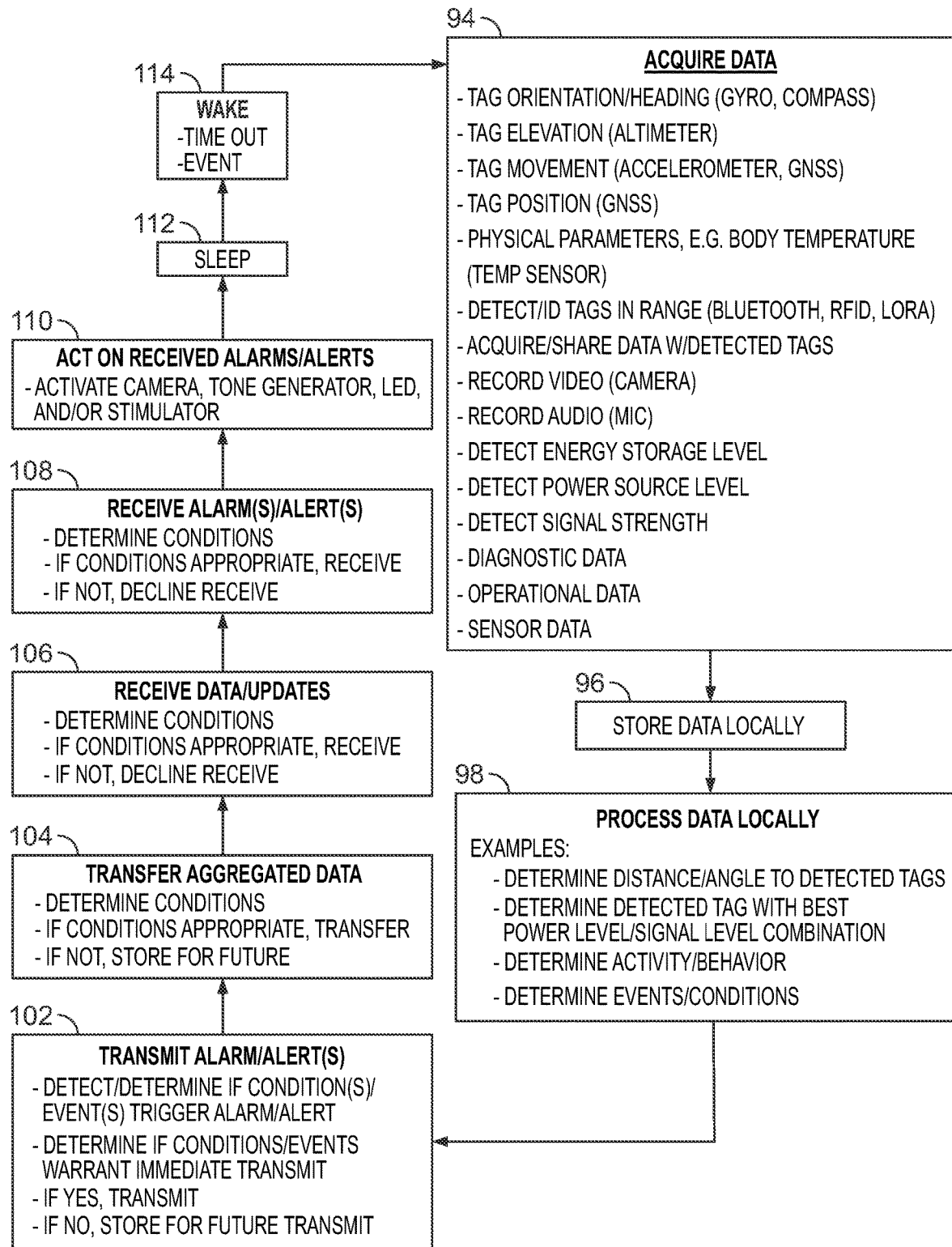
FIG. 8 is a block diagram illustrating some potential functions performed, one possible logical flow, and associated data received, processed, and maintained in a tag component of a livestock management system in accordance with an example embodiment.

Each tag 20 is adapted and configured to operate autonomously for the most part. Accordingly, each tag 20 is adapted and configured to autonomously and automatically acquire or collect, receive, and locally maintain data and information, including data and information about the individual livestock 12 to which it is attached. Each tag 20 is configured to autonomously and automatically process the data and information locally and to autonomously and automatically perform various livestock management functions and operations locally. As illustrated graphically in FIG. 8, each tag 20 generally follows a logical flow for acquiring and processing data and information, and for performing the livestock management functions and operations. However, it will be appreciated that the flow illustrated in FIG. 8 is merely an example of one possible flow and one example of the data, information, and functions that may be included in the flow. In addition, it should be appreciated that the flow illustrated in FIG. 8 is intended to be logical in nature and is not intended to be interpreted as necessarily requiring a linear and sequential flow of all of the steps or activities illustrated. Rather, multiple logical steps and activities illustrated in FIG. 8 may be carried out in various orders and simultaneously or sequentially.

As shown in block 94, the tag 20 acquires or receives various data and information. The data and information can include, but is not necessarily limited to, data and information about the individual livestock 12 to which the tag 20 is connected. For example, the tag 20 can acquire or receive data about the orientation of the livestock 12 from the gyroscope 54, the heading of the livestock 12 from the compass 56, and the elevation of the livestock 12 from the altimeter 58. The tag 20 can also acquire or receive data about movement of the livestock 12, e.g., heading and rate of speed, from the accelerometer 52, and about the absolute position or location from the GNSS receiver 82. The tag 20 can also receive data about the relative distance and angle between the livestock 12 and other nearby livestock 12 from the Bluetooth transceiver 84. The tag 20 can also acquire or receive data about one or more physical parameters, conditions, and/or activities of the livestock 12, including but not limited to its internal body temperature, from the one or more sensor(s) 32 as described in detail below. The tag 20 also can acquire or receive audio information from the microphone 66 and video information from the camera 72 as described above. The tag 20 is preferably adapted and configured to acquire, receive, or sample some or all of the data necessary to enable it to perform the livestock management functions described herein repeatedly and periodically at the same or different intervals of time.

The tag 20 can also acquire data and information about and from other tags 20. As described above, the tag 20 can detect and discover other nearby tags 20 and can automatically organize into a dynamic local mesh network with other tags 20 based on predetermined criteria, e.g., proximity, signal strength, and number. The tag 20 can receive data and information from some or all of the other tags 20 in the local mesh network and can communicate its own data and information to some or all of the other tags 20 in the network also based on predetermined criteria. The data received from the other tags 20 may include, but is not limited to, livestock-related and operational data, absolute position or location, and relative position and angle with respect to the receiving tag 20 and to other tags 20 in the dynamic local mesh network.

The tag 20 also acquires or detects data and information about itself. Such data and information may include, but is not limited to, diagnostic data, e.g., detected faults, errors, or other conditions in the components or elements of the tag 20, and operational data, e.g., power level, signal strength levels from the various interfaces of the communications interface 62, etc.

The tag 20 also can acquire or receive data and information from local sensors and transceivers 34 that are within signal range. For example, such data and information can include, but is not limited to, the weight of the livestock 12 from a scale, the presence of a livestock 12 at a feed or water station from a proximity or presence sensor, etc.

The tag 20 also can acquire or receive data and information from the management system platform 140 and/or the remote computer system 220. For example, the tag 20 can receive data and information comprising or related to health, medical, ownership, ranch location and/or other matters regarding the livestock 12 that are desired to remain permanently or semi-permanently in the tag 20.

In block 96, the tag 20 stores some or all of the acquired, received, or sampled data locally in its volatile and/or non-volatile memories for subsequent use in performing the various livestock management functions and operations described herein, and for subsequent communication with other tags 20 and with the management system platform 140 and/or the remote computer system 220. The tag 20 is preferably adapted and configured to store each instance or sample of an item of data and information that is acquired or received repeatedly over time, e.g., absolute location, relative distance and angle, orientation, heading, internal temperature, etc., in its local memory with the corresponding date and time each such instance or sample was acquired or received. An example logical structure for the data and information acquired and stored by the tag 20 is shown in FIG. 9 and is described below.

In block 98, the tag 20 autonomously and automatically processes some or all of the acquired and stored data locally and autonomously and automatically performs various livestock management functions and operations locally. Broadly, the tag 20 is adapted and configured to perform functions and operations that include and are based on detecting, monitoring and tracking the absolute location of the livestock 12, and the position and orientation of the livestock 12 relative to other nearby livestock 12. The tag 20 also is adapted and configured to perform functions and operations that include detecting, determining, and monitoring certain physical parameters, activities, and behaviors of the livestock 12, and determining health-related and other physical conditions of the livestock 12 that are correlated thereto. The tag 20 is also adapted and configured to perform functions and operations that include detecting the presence of external conditions that may indicate a threat or risk to the well-being of the livestock 12. The tag 20 is preferably adapted and configured to store any determinations made and any data or information generated in connection with performing such functions and operations in its local memory for future use and/or communication.

More specifically, the tag 20 can detect, monitor, and track the absolute location of the livestock 12 and determine whether the livestock 12 is within a designated pasture area and identifying the pasture area. This data can be used to manage the livestock 12 usage of available pasture areas. Among other data and parameters stored in the tag 20, the coordinates that define one or more virtual perimeter boundaries or geo-fences in connection with an area under management, e.g., a ranch, can be stored, for example in the non-volatile memory 60. Such virtual perimeter boundaries or geo-fences may, for example, be defined to extend around one or more designated pasture areas within the area under management. The tag 20 is adapted and configured to determine if the livestock 12 is within one of the designated pasture areas and to identify the designated area by plotting or comparing the absolute location of the livestock 12 relative to the coordinates of each pasture area bounded by a virtual boundary or geo-fence. If the location of the livestock 12 is within the range of coordinates corresponding to a pasture area bounded by the virtual boundary, the livestock 12 is determined to be within the pastured area. Otherwise, it is not.

The tag 20 also can detect, monitor, and track the absolute location of the livestock 12, and can determine the amount of time the livestock 12 has been present in a particular designated pasture area. Together with data regarding certain livestock activity, e.g., eating, this data can be used to manage livestock 12 usage of available pasture areas as well as to monitor livestock 12 intake. The tag 20 is adapted and configured to acquire the location of the livestock 12 from the GNSS receiver 82 repeatedly at periodic time intervals and to store each instance of the acquired location in its local memory with the corresponding date and time the location was acquired. The tag 20 is adapted and configured to determine the elapsed time the livestock 12 was present in a designated pasture area from the difference between the dates and times when the livestock 12 location was determined to be within the range of coordinates corresponding to the designated pasture area and when it was determined to not be within the range.

The tag 20 also can detect, monitor, and track the absolute location of the livestock 12 and monitor and track where and when the livestock 12 has eaten, and perhaps how long it ate. This data can be used not only to monitor livestock 12 intake, but also to help protect the health of the livestock 12. For example, if the livestock 12 becomes ill, the livestock's past location and eating history can be traced backward to determine if the illness may have been caused by something the livestock 12 ingested, and when and where the livestock 12 came in contact with the source of the illness. The livestock 12 can then be treated appropriately and the condition of the illness can be identified, located, and eradicated. As described further below, the tag 20 is adapted and configured to determine from data acquired from the gyroscope 54 and perhaps the accelerometer 52 and/or altimeter 58 when the livestock 12 is engaged in an eating activity. The tag 20 is further adapted and configured to correlate the determined eating activity with the absolute location of the livestock 12 at the time to determine where and when the livestock 12 ate. The tag 20 can determine for how long a livestock 12 ate at a particular location in a manner similar to how the tag 20 determines how long the livestock 12 was present in a designated pasture area as described above.

The tag 20 can also detect, monitor, and track the absolute location of the livestock 12 and determine the number of times the livestock 12 goes to a point of interest in an area under management. Points of interest can include for example feed and/or water stations or sources, bogs, barns, cliffs, gates, chutes, alleys, roads, shelters, minerals, houses, etc. The tag 20 can also determine the identity of the point of interest, when the livestock 12 was there, and how long the livestock 12 spent there. This data can be used to monitor livestock 12 intake and to manage livestock 12 use of consumable resources, inventory of such resources, etc. The data can also be used to detect potentially dangerous conditions and to monitor the health of the livestock 12. For example, repeated visits to a road could pose a risk to the livestock 12 and could indicate a need for action to be taken. A reduction in the number of trips to drink water could indicate the presence of a respiratory illness in the livestock 12 that could require treatment. The location and identity of one or more points of interest in an area under management can be among the data and parameters stored in the tag 20, for example in the non-volatile memory 60. The tag 20 is adapted and configured to correlate the livestock 12 location data with the stored locations of the points of interest to determine when the livestock 12 is in proximity thereto. The tag 20 can determine for how long a livestock 12 was present at a particular point of interest in a manner similar to how the tag 20 determines how long the livestock 12 was present in a designated pasture area as described above.

The tag 20 can also be configured and adapted to detect the presence of the livestock 12 at a particular feed or water station or other point of interest by communication with a local sensor and transceiver 34 located at or near the point of interest. For example, an RFID reader or scanner, a photocell, or another sensor may detect the presence of the tag 20 and/or the livestock 12 at or near a particular feed or water station, a bog, barn, etc. and communicate that data and the identity of the point of interest to the tag 20.

The tag 20 also can detect, monitor, and track the absolute location of the livestock 12 and determine whether the livestock 12 has crossed over a perimeter boundary or geo-fence of a pasture area or of the area under management. A livestock 12 may cross such a boundary for a number of reasons. It may simply wander across the boundary, or it may be taken or transported across the boundary. Accordingly, this data can be used not only to prevent loss/theft of the livestock 12, but also to prevent the livestock 12 from becoming mixed with neighboring herds and/or destroying neighboring property, and to prevent the livestock 12 from being hit by a car or otherwise injured, etc.

The tag 20 can be configured and adapted to determine whether a livestock 12 has crossed over a perimeter boundary in a manner similar to that used to determine whether the livestock 12 is within a designated pasture area as described above. As described above, the tag 20 is adapted and configured to acquire the livestock 12 location data from the GNSS receiver 82 repeatedly at periodic intervals of time and to store each instance of the acquired location in its local memory with the corresponding date and time that the location was acquired. The tag 20 is adapted and configured to plot or compare each acquired location of the livestock 12 relative to the coordinates of the pasture area(s) and/or the area under management bounded by one or more virtual perimeter boundaries or geo-fences. A determination that the acquired location is outside the range of coordinates corresponding to an area within the virtual boundary when a location acquired at an earlier time was within the range indicates the livestock 12 has crossed the virtual boundary.

The tag 20 can also detect, monitor and track the absolute location of the livestock 12 and determine approximately when, where, and how the livestock 12 crossed a boundary. The tag 20 can be adapted and configured to determine approximately when the livestock 12 crossed the boundary using any number of approaches. For example, the tag 20 can assume the livestock 12 followed a straight line at a fixed normal predetermined pace between the last acquired location that was within boundary and the first acquired location outside the boundary and extrapolate to approximate the time the livestock 12 crossed the boundary. The approximate time the livestock 12 crossed the boundary can be easily extrapolated by calculating the distance between the last acquired location within the boundary and the boundary, calculating the length of time for the livestock 12 to cover that distance at the assumed heading and pace, and adding the calculated time to the time corresponding to the last acquired location within the boundary. It will be appreciated that the extrapolation could also be performed using livestock 12 heading and rate of motion data acquired from the accelerometer 52 and compass 56 rather than the assumed values and the use of such data could produce a more accurate result.

The tag 20 can similarly determine approximately where the livestock 12 crossed the boundary by assuming the livestock 12 followed a straight line between the last acquired location that was within boundary and the first acquired location outside the boundary and calculating the point of intersection of the straight line and the boundary. It will be appreciated that instead of or in combination with assuming the livestock 12 followed a straight line, actual livestock 12 heading data acquired from the accelerometer 52 and compass 56 could be used to calculate the point of intersection and the use of such data could produce a more accurate result.

It is contemplated and will be appreciated that the tag 20 can also be adapted and configured to determine that a livestock 12 has crossed or is about to cross a perimeter boundary of an area under management via communication between the tag 20 and one or more local sensors and transceivers 34. For example, a plurality of local sensors and transceivers 34 may be placed at spaced apart locations corresponding to the virtual perimeter boundary of the area under management. The livestock 12 may come into physical proximity with and within signal range of one or more of the local sensors and transceivers 34 as the livestock 12 approaches and crosses the perimeter boundary. The tag 20 and the local sensors and transceivers 34 can then establish communication and communicate with each other and/or the management system platform 140 to indicate not only that the livestock 12 has approached or crossed the perimeter boundary but also where. Such communications may be used either alone or in combination with any or all of the other approaches described herein to detect a livestock 12 crossing the perimeter boundary.

The tag 20 can determine how the livestock 12 crossed the boundary based on rate of motion data acquired from the accelerometer 52. For example, rate of motion data from about the time the livestock 12 crossed the boundary indicating the livestock 12 was moving at a normal relatively slow rate of speed indicates that the livestock 12 likely merely wandered across the boundary on its own. However, data from the accelerometer 52 indicating that the livestock 12 was moving at an abnormally high rate of speed indicates that the livestock 12 was likely transported across the boundary by a vehicle and may have been stolen.

The tag 20 can also detect, monitor, and track the absolute location of the livestock 12 and detect and determine the existence of a potential theft situation regardless of whether the tag 20 detects that the livestock 12 has crossed a perimeter boundary of the area under management. For example, the tag 20 can determine from the location data acquired from the GNSS receiver 82, together with the rate of movement data and heading data acquired from the accelerometer 52 that the livestock 12 is at a location and is moving in a direction and at a rate that indicates potential theft. For example, a location on or near a roadway, a heading consistent with the direction of the roadway, and an abnormally high rate of motion, e.g., 20 mph, together may indicate that the livestock 12 has been stolen and is being transported away from the area under management.

In addition to detecting, monitoring, and tracking the absolute location of the livestock 12, the tag 20 also can detect, monitor, and track the relative position and orientation of the livestock 12 relative to other nearby livestock 12 and can use such data to determine the health of the livestock 12 and the health of a livestock's young, such as a calf. The tag 20 also can determine from such data when the livestock 12 is in estrus and that breeding and/or insemination has likely occurred. The tag 20 can also generate data used to track the genetics and family lineage of the livestock 12.

The tag 20 is adapted and configured to determine the relative position and orientation of the livestock 12 relative to other livestock 12 from data acquired at least from the Bluetooth transceiver 84, the gyroscope 54, and perhaps the altimeter 58 and barometer 59. The Bluetooth transceiver 84 may derive and provide data about the distance and angular direction between the tag 20 and other nearby tags 20, and hence the distance and angular direction between the livestock 12 to which the tags 20 are attached, from the wireless signals communicated between the respective Bluetooth transceivers 84 of the tags 20. As described above, the gyroscope 54 in each tag 20 provides data about the orientation of the tag 20 and hence the livestock 12 to which it is attached. By comparing the orientation data from nearby tags 20, the tag 20 can determine the orientation of the livestock 12 to which it is attached relative to other nearby livestock 12. Similarly, the altimeter 58 in each tag 20 provides data about the elevation of the tag 20 and hence the livestock 12 to which it is attached. By comparing the elevation data from nearby tags 20, the tag 20 can determine the elevation of the livestock 12 to which it is attached relative to the elevation of other nearby livestock 12. The tag 20 can determine certain activities of the livestock 12 from the relative position, orientation, and elevation data, for example mounting activity for breeding.

The tag 20 can also detect, monitor, and track the relative position and orientation of the livestock 12 relative to other nearby livestock 12 of a group or herd and determine that the livestock 12 may have a health-related issue. For example, if the tag 20 determines that the livestock 12 has remained relatively more distant from the group or herd than other livestock 12 for a period of time, that may indicate the livestock 12 is ill, injured, or has another health-related issue. Similarly, if the tag 20 determines that the livestock 12 fails to remain in proximity to other livestock 12 when the other livestock 12 move together as a group or herd, that also may indicate the livestock 12 is ill, injured, or has another health-related issue. Also similarly, if the tag 20 determines that the livestock 12 has maintained an orientation and perhaps elevation different from the other livestock 12 of a group or herd, such as an orientation and elevation indicating the livestock 12 has a lower than average hanging head compared to an established baseline for the animal or is lying on the ground when the other livestock 12 of the group or herd are standing and/or moving, that also may indicate the livestock 12 is ill, injured, or has another health-related issue.

Similarly, the tag 20 can determine if the young of a livestock 12 may have a health-related issue from the relative positions and orientations of the livestock 12 and its young over time and/or from the relative positions and orientations of the livestock 12 and/or its young to other nearby livestock 12 of a group or herd over time. For example, if the tag 20 determines that the livestock's young has failed to stay in relatively close proximity to the livestock 12 for a period of time that may indicate that the young livestock has become separated or lost, or may have an illness, injury, or other health-related issue. Similarly, if the tag 20 determines that the livestock 12 and or its young remain relatively more distant from the group herd than other livestock 12 of the group or herd or fail to remain in relative proximity to other livestock 12 when the other livestock 12 move together as a group or herd, that also may indicate the young livestock is ill, injured, or has another health-related issue. Also similarly, if the tag 20 determines that the livestock 12 and its young have maintained relatively different orientation and perhaps elevations for a period of time, such as orientations and elevations that indicate the livestock 12 is standing while its young is lying on the ground, that also may indicate the young livestock may have an illness, injury, or other health-related issue.

The tag 20 can also detect, monitor, and track the relative position, angle, and orientation of the livestock 12 relative to other nearby livestock 12 and determine or confirm when a livestock 12, e.g., a cow, is in estrus. The automatic and autonomous determination by the tag 20 that a livestock 12 is in estrus reduces the burden on a rancher and/or herd manager to physically monitor the herd and make that determination with respect to potentially hundreds or thousands of heads of livestock 12. It thus also decreases the chance that the estrus condition in an individual livestock 12 will be missed and, if that livestock 12 is to be artificially inseminated, increases the probability that the insemination will be performed at the optimal time to successfully achieve pregnancy. Automated and autonomous estrus determination by each tag 20 can thus improve the conception rates when doing artificial insemination, decrease the labor for those involved in the artificial insemination, and increase the pregnancy rate and calving production of the entire herd.

The tag 20 can determine or confirm that a cow is in estrus at least in part by detecting, monitoring, and tracking the relative distance between the cow and other livestock 12 of a group or herd. For example, prior to standing estrus a cow may appear nervous and restless. A typical behavior for a cow at that time is to segregate and distance itself from the other livestock 12 of a group or herd, for example to walk along a fence line in search of a bull. Thus, by determining that the cow has segregated and distanced itself from the other livestock 12 of a group or herd and has remained segregated and distanced for a period of time the tag 20 can determine that a cow is in or about to be in estrus.

The tag 20 also can determine or confirm that a cow is in estrus at least in part by determining that the cow is in close proximity to another livestock 12 and that the angle or direction between the cow and the other livestock 12 is consistent with the other livestock 12 mounting the cow or the cow mounting the other livestock 12. As described above the distance and angle between the cow and the other livestock 12 can be acquired from signals communicated wirelessly between the Bluetooth transceivers 84 or LPWAN transceivers 88 in their respective tags 20. It will be appreciated that each tag 20 will have the data whether the livestock 12 to which it is attached is a cow or a bull, for example, because that data will preferably be stored locally in the memory of the tag 20. However, the sex of the other livestock 12 is only a factor and not the only determinant of estrus. A cow in estrus may mount another cow or be mounted by another cow as well as by a bull. Thus, proximity and directionality data indicating any mounting activity involving a cow can be a determinant of estrus in the cow regardless of the sex of the other livestock 12 involved.

The tag 20 also can determine or confirm that a cow is in estrus at least in part based on the orientation of the cow when it is in close proximity to another livestock 12. If the tag 20 determines that the orientation of the cow indicates it is in a standing position consistent with preparing to be mounted by the other livestock 12, that provides yet another indication the cow is in estrus. Again, the tags 20 have the data regarding the sex of the livestock 12 to which they are attached, however, the sex of the other livestock 12 is only one factor in determining that the cow is in estrus because a cow in estrus will stand to get mounted by other livestock 12 regardless of their sex, even other cows/heifers/steers. A cow standing to be mounted is likely in estrus (or at least approaching estrus) and the mounting cow is likely to be approaching estrus.

It is contemplated and will be appreciated that the tag 20 can be adapted and configured to use any or all of the foregoing approaches alone or in any combination to determine or confirm estrus in the livestock 12. The inertial measurements (e.g., from accelerometer 52, GNSS receiver 82, and gyroscope 54), as well as other parameters from the barometer 59, internal temperature from implanted body temperature sensor 32, can all be used to determine if an animal is in estrus. Regardless of which approach(es) are used, the tag 20 preferably also includes the natural estrus cycle of the livestock 12 in the determination. Each tag 20 can have stored in its memory a value or range of values for the natural estrus cycle of the livestock 12 to which the tag 20 is attached. For example, a natural estrus cycle for a cow is typically about 17-24 days. The value or range of values stored in memory can be based on the typical normal estrus cycle of like livestock or can be based on empirical observations of the particular livestock 12 over time. When the tag 20 determines that the livestock 12 is in estrus, it can save that determination along with the data in its local memory. The tag 20 can then start a counter or store an expected next estrus date or range of dates. The next time the tag 20 determines that the livestock 12 is in estrus, it can confirm that determination against the stored data regarding the natural estrus cycle of the livestock 12 to either confirm the determination or provide an indication that the determination may not be accurate. Over time, the tag 20 can learn the actual estrus cycle of the livestock 12 to which it is attached, e.g., by averaging the time between accurate estrus determinations, and adjust the stored natural estrus cycle value(s) based thereon.

The tag 20 also can detect, monitor, and track the relative position, orientation, and perhaps elevation of a livestock 12 relative to other nearby livestock 12 and determine or confirm that breeding and insemination of the livestock 12 have likely occurred. More specifically, the tag 20 can determine that a cow has likely been bred and naturally inseminated by a bull. As described above, each tag 20 has in memory the data whether the livestock 12 to which it is attached is a cow or a bull. Regardless of whether a tag 20 is attached to a cow or a bull, the tag 20 can determine that breeding and natural insemination have likely occurred by determining that a cow and a bull are in very close proximity and that the relative orientations and perhaps elevations of the two livestock 12 are consistent with the bull having mounted the cow. The tag 20 can determine a cow and a bull are in very close proximity based on the signals communicated wirelessly between the Bluetooth transceivers 84 or LPWAN transceivers 88, or based on GNSS data alone, in their respective tags 20 for example. The tags 20 also can determine the relative orientations and elevations between the cow and the bull from the gyroscopes 54 and altimeters 58 in their respective tags 20. As those skilled in the art are aware, when a bull mounts a cow, the orientation of at least the front end of the bull is pivoted or tilted upward relative to the cow. In addition, assuming the tag 20 attached to the bull is attached somewhere near the front end of the bull, e.g., the ear, the tag 20 will have a higher elevation than the tag 20 attached to the cow. Thus, by determining that a male and a female livestock 12 are in very close proximity, that the male has an orientation that is tilted or pivoted upward relative to the orientation of the female, and that the male is at a greater elevation than the female, each tag 20 can determine or confirm that breeding and natural insemination of the female livestock 12 have likely occurred. The tag 20 can also obtain and use the data from the accelerometer 52 of the tag 20 attached to the bull to determine its increased activity level and thus verify the mounting and breeding activity for even more accurate results.

The following process could be used to determine if an animal is mounting another animal, which can further be used to make a determination of estrus and breeding activity. Data from the IMU 55 (e.g. accelerometer and gyroscope data) can be processed by the tag 20 or other parts of the system to look for a high rate of acceleration in the forward and upward direction, indicating that the tag has risen in elevation quickly, which would occur when an animal is mounting another animal. The system will also compare the IMU data to data from the barometer 59, which should also show a quick rise in relative height if mounting has occurred. Similarly, the data from the IMU 55 and the barometer 59 can be processed for dismounting behavior, which will be indicated by reverse motion, downward acceleration, a hard acceleration after the downward acceleration, and a reduction in the relative height from the barometer 59, all of which would indicate that the animal may be dismounting.

The mounting behavior can be used in conjunction with data from nearby tags (e.g., as determined by Bluetooth or GPS proximity measurements), and also including compass and position data, which can allow users to determine which animal was mounted. Determinations can be made based on the sex of the mounting and mounted animal (i.e., cows mounting cows determining standing estrus, and bulls mounting cows determining breeding/insemination has occurred). The timing (e.g., duration) of the detected motion and relative altitude change can also be used to determine if breeding and insemination actually occurred.

The tag 20 can further confirm that a cow has been successfully impregnated either by natural or artificial insemination. For example, following a detected breeding event or an artificial insemination event, the tag 20 can determine that the cow is not showing signs of estrus according to its typical estrus cycle and can use that determination as confirmation that the cow has been successfully impregnated.

The tag 20 can also determine that a particular male livestock 12, e.g., a bull, has bred and impregnated a particular female livestock 12, e.g., a cow. In the case of natural breeding and insemination, the tags 20 attached to the cow and bull can share their data in the manner described herein and the tags 20 attached to either or both animals can accordingly maintain a record of the identity of each livestock 12 associated with the event. Alternatively, if a livestock 12 has been artificially inseminated, the straw used to inseminate the livestock 12 will include information identifying the particular male donor which can be scanned and verified or input into the system manually or in another way. In either case, the identities of both involved livestock 12 can be stored locally in the tags 20 and can be communicated to the management system platform 140 where they can be aggregated with similar determinations by the tags 20 attached to other livestock 12 of the herd under management.

From the above-described determinations, each tag 20 can automatically generate data to track the genetics and family lineage of each individual livestock 12 of the herd under management. Each tag 20 can store the genetic chain of the livestock 12 to which it is attached locally in its memory. As new livestock 12 are born the genetic chain of the newborn can be stored in a tag 20, along with other information identified and described herein, and the tag 20 is then attached to the newborn.

The genetics tracking data automatically generated by the tags 20 can be used to help improve the physical characteristics and health of the livestock 12 and to reduce the proliferation of hereditary conditions due to inbreeding. The automatic generation of the genetics tracking data by the tags 20 can also reduce the burden on ranchers and/or herd managers to manually track the numerous genetic chains of the livestock 12 of a herd under management and both enhance and ease the overall herd record-keeping of the livestock management system 10.

With a livestock's genetic chain being known, appropriate action can be taken to control the livestock 12 breeding. For example, action can be taken to prevent the livestock 12 from breeding with another livestock 12 in the same genetic chain. As one example, when it is determined that a particular female livestock 12, e.g., a cow, is in estrus as described above, the female livestock 12 can be moved or placed in a location of an area under management that is separate from or inaccessible to one or more male livestock 12, e.g., bull(s), that are in the same genetic chain as the female livestock 12. Alternatively, one or more bulls may be moved away from the cow. Also alternatively, the cow may be brought into proximity with a particular bull or bulls by which it is desired for the cow to be bred.

In addition to detecting, monitoring, and tracking the absolute location and the relative position and orientation of the livestock 12, the tag 20 also can detect, determine, and monitor certain physical parameters, activities, and behaviors of the livestock 12, and determine health-related and other physical conditions of the livestock 12 that are correlated thereto. As described above, such physical parameters that can be detected and monitored by the tag 20 can include, but are not limited to, the body temperature of the livestock 12. The tag 20 can acquire or receive instances or samples of the body temperature and/or other physical parameters from one or more implanted and/or attached sensors 32. Activities and behaviors that can be detected, determined and monitored by the tag 20 can include, but are not limited to, ambulation, eating, drinking, and rumination. Correlated health-related and other physical conditions that can be determined by the tag 20 can include, but are not limited to estrus, ovulation, pregnancy, and calving. The tag 20 can also be configured to make determinations such as optimal weaning time based on the detected activities and behaviors of the livestock 12.

Beneficially, by acquiring or receiving instances or samples of the internal body temperature of the livestock 12 over time, the tag 20 can use the relative change in the value of such temperature over time to make determinations about the existence of health-related and other physical conditions of the livestock 12 rather than comparing the internal temperature to another value, such as ambient temperature, which also varies over time and independent of the condition of the livestock 12. The determinations made by the tag 20 can thus be made more accurately. For example, the tag 20 can detect that the internal body temperature of the livestock 12 has risen by a certain amount over the last acquired internal temperature value or over a long-term average internal temperature value. From that data, the tag 20 can determine that the livestock 12 has an illness, injury, or other health-related issue, e.g., infection from a cut, viral infection, etc.

The tag 20 also can combine the detected rise in internal body temperature with other data to make determinations and/or to improve the accuracy of determinations. For example, the tag 20 can determine that the rise in temperature has occurred over a certain time period and distinguish between normal variations in temperature and those indicating a health-related issue. The tag 20 also can determine that the rise in temperature is in or not in conjunction with the livestock's normal estrus cycle or other normal cycles, for example, and determine whether the rise in temperature is due or not due to one of those normal recurring physical conditions.

In addition to physical parameters of the livestock 12, the tag 20 can also detect, determine, and monitor certain activities and behaviors of the livestock 12, and determine the existence of health-related and other physical conditions of the livestock 12 that are correlated thereto. For example, the tag 20 can detect and monitor certain physical activities and behaviors such as ambulation, eating, and rumination. The tag 20 can then determine from these activities and behaviors the existence of certain health-related and other physical conditions that are correlated thereto, e.g., estrus, ovulation, pregnancy, and calving.

By determining the existence of these conditions autonomously and automatically without the need for a rancher, herd manager, or other person to physically observe the livestock 12, the tag 20 is able to improve the overall health, well-being, and productivity of the herd. For example, calving is a critical time for the health and well-being of both the livestock 12 and the newborn. By autonomously and automatically determining when a livestock 12 is calving or about to calve, the tag 20 can enable action to be taken by the rancher, herd manager, or other person responsible for the livestock 12 to more closely observe the livestock 12 and newborn to ensure no complications occur and to reduce the risk of mortality. By autonomously and automatically determining when a livestock 12 is in estrus, the tag 20 can enable action to be taken to artificially inseminate the livestock 12 at an optimal time or to increase the likelihood of the livestock being naturally inseminated at an optimal time to improve herd productivity.

Ambulation, eating, and rumination are strong indicators of the health as well as the existence of various physical conditions of a livestock 12. On average, a healthy livestock 12 should ruminate approximately seven to nine hours per day, eat approximately four to five hours per day, and lie comfortably for approximately 12-14 hours per day. Most rumination occurs while a livestock 12 is lying down. Accordingly, from a detected decrease or change in normal activity, such as ambulation, rumination, or normal intake, such as eating and drinking, the tag 20 can determine the presence of a respiratory disease well in advance of the symptoms becoming visually noticeable. The tag 20 can then enable action to be taken to treat the illness early before it can be spread to other members of a group or herd and before the livestock 12 becomes seriously ill.

Similarly, livestock 12 typically get up and lay down frequently two to six hours before beginning calving. In addition, eating and rumination activity in livestock 12 about to calve is typically reduced from long-term baseline levels. Livestock 12 also often isolate themselves from other livestock of a group or herd when going into labor and many lie down to give birth, although some remain standing. The internal temperature of livestock 12 also typically drops within about 8-48 hours of calving. The tag 20 can automatically detect and monitor these physical activities, behaviors, and parameters of a livestock 12, can determine when they coincide, and can determine therefrom that the correlated physical condition of calving is underway or about to begin. The tag 20 can then enable appropriate action to be taken as described herein.

Figure 13:
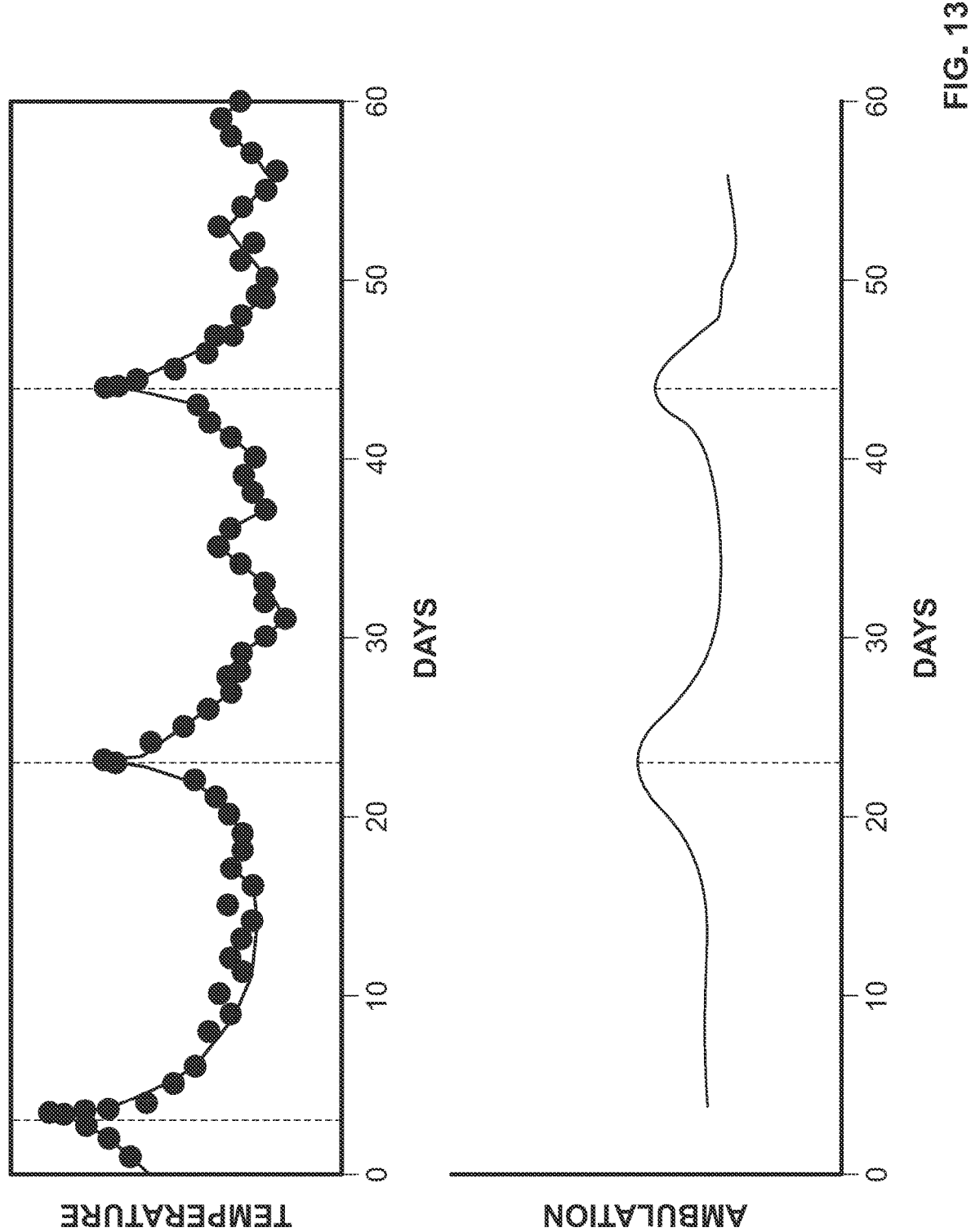
FIG. 13 is a graph illustrating a relationship between body temperature and an ambulation behavior of a livestock over time as detected by a tag component of a livestock management system and used to determine a condition of the livestock in accordance with an example embodiment.

Also similarly, prior to and upon entering estrus, livestock 12 typically exhibit restlessness, which is indicated by an increase in ambulation, and a substantial increase in internal body temperature relative to the normal internal temperature of the livestock 12 when it is not in estrus. FIG. 13 illustrates graphically how the ambulation and internal body temperature of a livestock 12 typically vary over time, and how an increase in ambulation and in internal body temperature coinciding in time with the normal estrus cycle of the livestock 12 provide an indication of the existence of the correlated physical condition of estrus. In addition, a livestock 12 in or entering estrus also often segregates and distances itself from other livestock 12 of a group or herd, and may bawl more than usual. By detecting and monitoring these physical activities, behaviors, and parameters of a livestock 12, the tag 20 can automatically determine when they coincide and from that determination can further determine that the livestock 12 is about to enter or has entered into the correlated physical condition of estrus. The tag 20 can then send a notification to enable appropriate action to be taken as described herein.

Figure 12A:
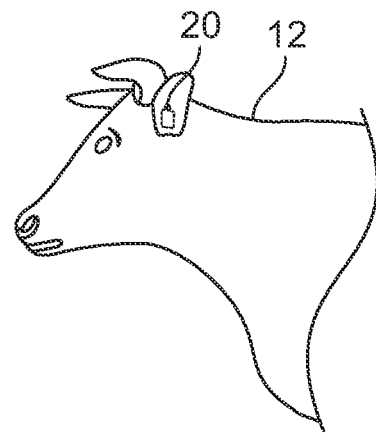
FIG. 12A is a partial graphical representation of a livestock illustrating a correlation between one orientation of a tag component of a livestock management system and livestock behavior usable by the system to determine a condition of the livestock in accordance with an example embodiment.
Figure 12B:
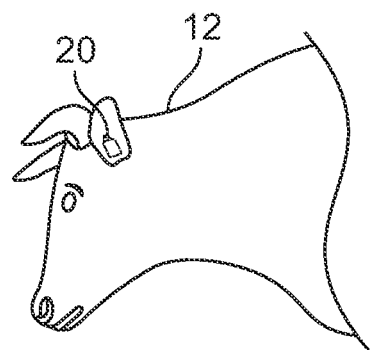
FIG. 12B is a partial graphical representation of a livestock illustrating a correlation between another orientation of a tag component of a livestock management system and livestock behavior usable by the system to determine a condition of the livestock in accordance with an example embodiment.
Figure 12C:
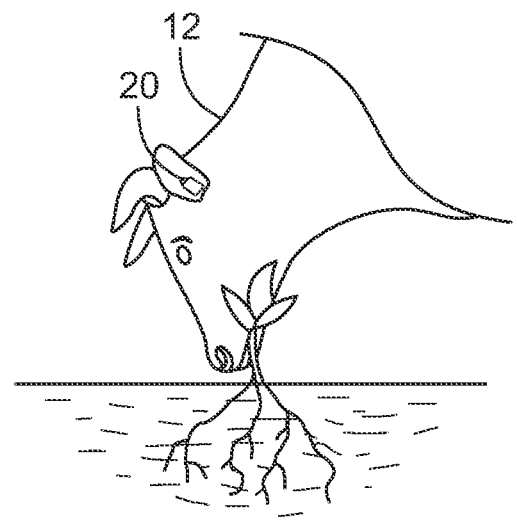
FIG. 12C is a partial graphical representation of a livestock illustrating a correlation between another orientation of a tag component of a livestock management system and livestock behavior usable by the system to determine a condition of the livestock in accordance with an example embodiment.

The tag 20 can autonomously and automatically determine the above-described physical parameters, activities and behaviors of the livestock 12 from data acquired from the sensor(s) 32, accelerometer 52, gyroscope 54, compass 56, altimeter 58, barometer 59, etc. For example, as illustrated in FIGS. 12A, 12B, and 12C, the tag 20 can determine when and whether a livestock 12 is ruminating, eating and/or ambulating at least in part from orientation data acquired from the gyroscope 54, alone or in combination with other sensors, such as the accelerometer 52 and barometer 59. Inputs from the gyroscope 54 and the accelerometer 52, in combination, may be referred to as inertial measurements. The Inertial Measurement Unit (IMU) 55 can measure the motion of a livestock 12, which may include measuring step count, high acceleration motion, reduction in motion, and average motion, for example.

As shown in FIG. 12A, a livestock 12 that is standing or ambulating will typically have a first orientation relative to three axes, e.g. pitch, roll, and yaw. A livestock 12 that is ruminating will typically have a second orientation wherein the pitch, roll, and yaw axes are rotated or pivoted somewhat downward in relation to the first orientation as shown in FIG. 12B. Rumination will also typically include detecting motion (i.e., inertial measurements from the IMU 55), and may also include detecting changes in altitude measured by the barometer 59, which can measure relative changes in height of the sensor. Similarly, a livestock 12 that is eating will typically have a third orientation wherein the pitch, roll, and yaw axes are rotated or pivoted even further downward in relation to the first and second orientations as shown in FIG. 12C. Further, the tag 20 can use data from the GNSS receiver 82 and inertial measurements from the accelerometer 52 and the gyroscope 54 (i.e., collectively, inertial measurement unit 55) to determine that the livestock 12 is eating, which is typically indicated by low GPS speed, and low acceleration and movement related to eating.

In addition to orientation data, the tag 20 can also use data from the accelerometer 52 in determining and distinguishing between the three activities. For example, the tag 20 can determine from the accelerometer 52 data and GNSS data from GNSS receiver 82, when and whether the livestock 12 is standing still or moving as well as the position and rate at which the livestock 12 is moving. From this data, the tag 20 can further distinguish when a livestock 12 is ambulating as compared to substantially standing still while eating or possibly ruminating. The tag 20 can also use data from the altimeter 58 and/or the barometer 59 to further distinguish between the three activities. As seen in FIGS. 12A-12C, the elevation of the head of a livestock 12 above ground typically will be different depending on whether the livestock 12 is standing or ambulating, ruminating, or eating. In addition, livestock 12 typically ruminate while lying on the ground. The tag 20 can thus use the altimeter 58 data or barometer 59 data to determine the elevation of the livestock's head (assuming the tag 20 is attached to the ear of the livestock 12) relative to the ground and to further determine and/or confirm whether and when the livestock 12 is engaged in one of the three activities. The barometer 59 can determine relative changes in height and provide the data to the processor/memory 50 of the tag 20.

The tag 20 can autonomously and automatically detect, determine, and monitor physical parameters, activities and behaviors of the livestock 12, and determine the existence of certain health-related and other physical conditions as described above by determining when one or more items of acquired livestock-related data coincide. However, preferably, the tag 20 has one or more artificial intelligence (AI) models and/or other detection algorithms embedded in its local memory and executes one or more of the AI models and/or other detection algorithms with respect to one or more of the acquired livestock-related data items to predict or determine the occurrence or existence of one or more physical activities or behaviors of the livestock 12, and to predict or determine one or more health-related or other physical conditions of the livestock 12 correlated thereto.

More specifically, the tag 20 preferably includes one or more AI models and/or other detection algorithms that can predict or determine the existence of one or more physical activities and/or behaviors of the livestock 12 including, but not limited to, ambulating, ruminating, and eating, from one or more livestock-related acquired data items including, but not limited to, movement over ground (from GNSS receiver 82 and/or accelerometer 52), orientation (from gyroscope 54), and elevation (from altimeter 58 or barometer 59). The tag 20 also preferably includes one or more AI models and/or other detection algorithms that can predict or determine from one or more of the determined physical activities and/or behaviors the existence of one or more health-related or other physical conditions of the livestock 12 including, but not limited to, illness, injury, estrus, ovulation, pregnancy, and calving. These AI models and/or other detection algorithms preferably also include one or more parameters that correspond to one or more external and physical parameters related to the livestock 12 including, but not limited to, body temperature (from implanted and/or attached sensor(s) 32 or a sensor 32 embedded in the tag 20), absolute location and relative position and angle (from GNSS receiver 82 and Bluetooth transceiver 84), heading (from compass 56), etc.

The AI models and/or other detection algorithms embedded in the tag 20 can be created using suitable machine learning and AI model and/or algorithm creation and development tools at the management system platform 140 and/or the remote computer system 220. The AI models and/or other detection algorithms can be generated, trained, and updated from time to time using data acquired and received by the tags 20. The data from the tags 20 attached to livestock 12 of a herd under management can be aggregated and the aggregated data can be used to create, develop, train, and update the AI models and/or other detection algorithms. In addition, the aggregated data can also be aggregated with the same data aggregated from tags 20 attached to livestock 12 of other herds under management by the same or different ranchers, herd managers, owners, etc.

It is contemplated and will be appreciated that the tag 20 can use one or more AI models and/or other detection algorithms to make the various determinations of physical activity and/or behavior of the livestock 12, and the various determinations of health-related and other physical conditions of the livestock 12 either alone or in combination with one or more of the various discrete methods described herein. For example, one or more of the discrete methods for determining estrus, e.g., based on relative position and angle of the livestock 12 to nearby livestock 12, can be incorporated as one or more parameters of an AI model or other detection algorithm that predicts or determines estrus, or can be used by the tag 20 separately from the AI model or other algorithm, for example as an additional confirmation of the model or algorithm prediction or determination. Alternatively, the tag 20 can use one or more of the discrete methods described herein alone or together to make the various determinations with or without also using an AI model and/or other detection algorithm.

The tag 20 is also adapted and configured to autonomously and automatically perform functions and operations that include detecting the presence of external conditions that may indicate a threat or risk to the well-being of the livestock 12 or that may affect the operation of the tag 20. Such functions may include, but are not limited to, detecting the presence of a loud noise, such as a gunshot or vehicle motor, detecting the presence of a potential predator, detecting the presence of other dangerous conditions, and detecting weather or meteorological-related conditions. By detecting such conditions, the tag 20 can send alerts and enable appropriate action to be taken to protect the livestock 12, for example driving off a shooter, predator, or potential thief, and/or relocating the livestock 12 to a safer location.

The tag 20 can detect the presence of a loud noise, such as a gunshot or vehicle motor, from audio data acquired or received from the microphone 66. In the same manner, the tag 20 can detect the presence of noise associated with another potentially dangerous condition, e.g., flowing water. The tag 20 can acquire, record, e.g., store, and analyze audio data from the microphone 66 periodically or on demand. The microphone 66 can also include circuitry that automatically responds to a loud sound and automatically provides a sample of the audio. The tag 20 can store the audio data without analysis for subsequent communication to the management system platform 140. Alternatively, the tag 20 and/or the management system platform 140 can analyze the audio by comparing it to stored samples or by executing an AI model or other algorithm to attempt to identify the nature of the noise. The tag 20 preferably stores or records audio data with the time and date it was acquired or received to assist a rancher or herd manager with any subsequent investigation or evaluation of the noise. The tag 20 can determine the absolute position of the livestock 12 from the data provided by the GNSS receiver 82 and enables the livestock 12 to be located and appropriate protective action to be taken. The tag 20 and/or the management system platform 140 also can approximate the location of the noise by triangulation techniques based on the time and/or direction of detection of the noise by several of the tags 20 attached to several livestock 12 of a group or herd. The tag 20 also can take action to acquire additional audio data from the microphone 66 and/or to acquire other data to assist determining the nature, source, and location of the noise. For example, the tag 20 can activate the camera 72 and acquire video data.

The tag 20 also can detect the presence of a potential predator, such as a wolf, based on unusual or anomalous activity of the livestock 12. For example, the tag 20 can detect abnormal movement of a livestock 12, e.g., movement in an unusual direction and/or at an unusual pace, and determine that it likely indicates a potential predator is in the area of the livestock 12. The tag 20 can acquire the movement, heading, and pace information of the livestock 12 from the accelerometer 52 and/or compass 56. The tag 20 can also acquire data indicating the absolute position of the livestock 12 and any unusual change in the location from the GNSS receiver 82 and can use that data in the determination. By communicating with other tags 20 in a dynamic local mesh network, the tag 20 can also acquire similar data regarding the activities of other nearby livestock 12 of a group or herd and include that data in the determination. For example, the tag 20 can determine that other nearby livestock 12 are reacting in the same way and in the same direction as the livestock 12 to which the tag 20 is attached and use that determination to confirm that a predator is likely nearby.

The tag 20 also can detect or confirm the presence of a potential predator or another dangerous condition from audio data acquired or received from the microphone 66 and/or from video information acquired or received from the camera 72 in the same manner described above. For example, the livestock 12 may bawl more than usual when a predator is nearby or when it encounters another dangerous condition. The predator itself may also make characteristic sounds, such as howling. The tag 20 can detect such unusual bawling, characteristic sounds, etc. from the audio data and determine therefrom that a predator or other dangerous condition is present. The tag 20 can also acquire the absolute location of the livestock 12 from the GNSS receiver 82 and data regarding motion of the livestock 12 from the accelerometer 52. From this additional information, the tag 20 can determine if the livestock 12 is stationary and can determine therefrom that the livestock 12 is injured or otherwise immobilized, e.g., tangled in wire or stuck in the mud, and in need of assistance.

The tag 20 also can detect the presence or imminent presence of weather or meteorological-related conditions that may pose a threat or risk of injury to the livestock 12. For example, the tag 20 can determine from data acquired from the barometer 59 (pressure), the ambient temperature sensor 74 (air temperature), and/or the humidity sensor 76 (air humidity) that a severe storm is approaching (e.g., rapid falling pressure), and/or that dangerous temperature, heat index, and/or wind-chill conditions exist (e.g., combination of high or low temperature and high or low humidity). The tag 20 can thus enable a rancher or herd manager to take appropriate actions to protect the livestock 12, for example by relocating it to shelter or otherwise providing additional protection against the conditions or autonomously urge the livestock 12 to move to a safer location.

Similarly, the tag 20 can detect the weather and meteorological conditions and determine therefrom if changes to its own operation are necessary to optimize and prolong its operation. For example, the tag 20 can determine that temperature and humidity conditions are such that its operations should be reduced, slowed, or suspended in order to avoid over-heating or unduly depleting its stored electrical power. Similarly, the tag 20 can determine that current conditions are not conducive to successful long range communications with the management system platform 140 and/or the remote computer system 220, for example due to heavy rain or fog, or a known poor coverage area, and thus delay such communications until conditions are more favorable to optimize the use of its stored electrical power. Also similarly, the tag 20 can determine that conditions are not suitable to sufficiently recharge its stored electrical power to support on-going operations, e.g., due to heavy overcast or night-time conditions, and can reduce, minimize, or slow down its operations until conditions improve for sufficient recharging.

Referring to block 102, the tag 20 is adapted and configured to generate and communicate or transmit alarms and alerts in response to certain conditions, events, and/or occurrences detected and/or determined by the tag 20. The tag 20 can communicate the alarms and alerts to the management system platform 140, the remote computer system 220, and/or to one or more mobile and/or stationary devices of a rancher, herd manager, owner, etc. The alarms and alerts also can comprise certain local actions by the tag 20, such as activating the LED 64, tone generator 68, and/or stimulator 70. The tag 20 can communicate the alarms and alerts in the form of email, text messages, or direct device to device communications. The content of the alarms and alerts can vary depending on the conditions, events, and/or occurrences that caused the tag 20 to generate them. The tag 20 can communicate the alarms and alerts via the cellular transceiver 86 over a cellular network, via the satellite data network transceiver over a satellite network, via a LAN or WAN network, via the LPWAN transceiver 88 with or without a gateway 89, or via the Bluetooth transceiver 84 and a suitable gateway 85.

The tag 20 also can determine if the determined condition, event, or occurrence is one that requires immediate attention and immediately communicate the alarm or alert if the operating conditions of the tag 20 and the communication conditions are suitable for immediate communication. If either condition is not met, then the tag 20 can delay communicating the alarm or alert until a next scheduled time for communication or until operating and/or communications conditions become suitable for the communication. Alarms or alerts that may require immediate attention include, but are not limited to, detections or determinations that livestock 12 have crossed a perimeter boundary, may have been stolen, may be seriously ill or injured, or are calving or about to calve. Other such alarms or alerts may include, but are not limited to, detection of a predator, gun shot, or vehicle nearby, or the detection or determination of any other condition or event that could cause immediate injury to the livestock 12. Conditions that may cause the tag 20 to delay communication of an alarm or alert include, but are not limited to, a low stored electrical energy in the tag 20, unavailability of a suitable communications channel or detection of no or a poor communications signal, poor weather conditions, etc.

More specifically, the tag 20 is preferably adapted and configured to generate and communicate an alarm or alert in response to determining that a livestock 12 has crossed the perimeter boundary or geo-fence of a designated area within an area under management or of the area under management as described above. The alarm or alert can contain information that the livestock 12 has crossed a perimeter boundary and alerting the recipient to take appropriate action. The alarm or alert can also include information about the most recent location and movement of the livestock 12, e.g., GPS coordinates, direction of movement, etc. The alarm or alert also can comprise a local action by the tag 20 including activating the tone generator 68 to generate a sound or noise and/or the stimulator 70 to generate a physical stimulus, e.g., a rumble or shock, to urge the livestock 12 to return to the designated area or the area under management. The alarm or alert can also comprise a local action by the tag 20 to activate the LED 64 to assist in locating and identifying the livestock 12.

The tag 20 preferably is also adapted and configured to generate and communicate an alarm or alert in response to determining that a livestock 12 may have been stolen as described above. The alarm or alert can contain information advising that the livestock 12 may have been stolen and to contact the appropriate authorities. The alarm or alert can also include information about the most recent detected location and movement of the livestock 12, e.g., GPS coordinates, speed, direction, etc. The alarm or alert can also comprise a local action by the tag 20 to activate the LED 64 and/or to play a message via the tone generator 68 and speaker to the effect that the livestock 12 is stolen property.

The tag 20 preferably is also adapted and configured to generate and communicate an alarm or alert in response to determining a health-related or other physical condition of the livestock 12 that may require attention. Such conditions include, but are not limited to, determinations that the livestock 12 may be ill or injured, is in estrus, is in the process of being bred, and/or is about to be or is in the process of calving. The alarm or alert can contain information identifying and describing the condition that resulted in the alarm or alert and the detected or determined data underlying the condition, e.g., internal temperature, lack of movement for a period of time, etc. The alarm or alert can also include information about the most recent detected location and movement of the livestock 12, e.g., GPS coordinates, speed, direction, etc. The alarm or alert can also comprise a local action by the tag 20 to activate the LED 64 and/or the tone generator 68 to visually and audibly identify the livestock 12 to facilitate locating it and/or to activate the tone generator 68 and/or the stimulator 70 to autonomously urge the livestock 12 to move to an area such as a sick pen if the detected condition is not too severe.

The tag 20 also can be adapted and configured to generate and communicate an alarm or alert in response to determinations of certain herd-related or herd-impacting conditions that may require attention. Such conditions may include, but are not limited to, determinations that a pasture area is being over-grazed, that a feed or water supply is low, that the time is optimal for weaning, etc. The tag 20 can determine the latter condition in particular by monitoring the relationship between a livestock 12 and its young. Typically, the optimal weaning time for dairy livestock 12 is 2-3 days after birth and substantially longer for meat livestock 12. Thus, the tag 20 can determine when the livestock 12 has given birth and use that determination to determine an optimal weaning time. The tag 20 also can make the optimal weaning determination from data regarding the relative position and orientation of the livestock 12 and its young from the GNSS receiver 82, the gyroscope 54, and the Bluetooth transceiver 84 or other RF link in the respective tags 20 of the livestock 12 and it's young. The tag 20 can determine from this data the intervals and amounts of time the young spends in close proximity to the livestock 12 and the intervals and amounts of time the young has an orientation relative to the livestock 12 indicating it is suckling. The tag 20 can determine that when the interval and amount of time spent in proximity and suckling decreases to a certain level, the optimal weaning time has been reached.

The alarm or alert can contain information identifying and describing the condition that resulted in the alarm or alert and the detected or determined data underlying the condition. The alarm or alert can also include information about the location of the condition, the most recent detected location and movement of the livestock 12, e.g., GPS coordinates, speed, direction, etc. The alarm or alert can also comprise a local action by the tag 20 to activate the LED 64 and/or the tone generator 68 and speaker to visually and audibly identify the livestock 12 to facilitate locating it, and/or to activate the tone generator 68 and/or the stimulator 70 for example to autonomously urge a calf to segregate from its mother in a different pen/pasture at an optimal weaning time or vice versa.

The tag 20 also can be adapted and configured to generate and communicate an alarm or alert in response to determining the presence or imminent presence of a predator, a gunshot or vehicle noise, severe weather, another dangerous condition, a sudden shock to the livestock 12, etc. The alarm or alert can contain information identifying and describing the condition that resulted in the alarm or alert, the detected or determined data underlying the condition, and alerting the recipient to take appropriate action. It can also include information about the location of the condition that resulted in the alarm or alert, and the most recent detected location and movement of the livestock 12, e.g., GPS coordinates, speed, direction, etc. The alarm or alert can also comprise a local action by the tag 20 to activate the LED 64 and/or the tone generator 68 to visually and audibly identify the livestock 12 to facilitate locating it, and/or to activate the tone generator 68 and/or the stimulator 70 to autonomously urge the livestock 12 to move to a safer location.

The tag 20 also can be adapted and configured to generate and communicate an alarm or alert in response to determining an operational, diagnostic, or other condition with the tag 20 itself. Such conditions may include, but are not limited to, low power level, hardware fault, self-test failure, etc. The alarm or alert can contain information identifying and describing the condition that resulted in the alarm or alert, and the detected or determined data underlying the condition. It can also include information about the most recent detected location and movement of the livestock 12 to which the tag 20 is attached, e.g., GPS coordinates, speed, direction, etc. The alarm or alert can also comprise a local action by the tag 20 to activate the LED 64 and/or the tone generator 68 and speaker to visually and audibly identify the livestock 12 to which the tag 20 is attached to facilitate locating it.

In block 104, the tag 20 can communicate some or all of its data to some or all of the other tags 20 in a dynamic local mesh network as described elsewhere herein. The tag 20 can also communicate some or all of its data and the aggregated data received from other tags 20 in the dynamic local mesh network to the management system platform 140 and/or the remote computer system 220 also as described elsewhere herein. As described above, the tag 20 can determine whether it is the tag in the dynamic local mesh network in the optimum condition to communicate its data and the aggregated data. If it determines that it is not the tag in the optimum condition to communicate it can forego communicating the data in favor of the tag determined to be in the optimum condition communicating the data. Even if it determines that it is in the optimum condition, the tag 20 can determine if conditions are suitable for immediate communication of the data and if not can store the data and delay communicating it until a next scheduled time for communication, until operating and/or communications conditions become suitable for the communication, or until it receives an input triggering it to communicate the data.

In block 106, the tag 20 can receive data from the other tags 20 in a dynamic local mesh network. The tag 20 also can receive data and updates from the management system platform 140 and/or from the remote computer system 220. The data from the other tags 20 comprises the data acquired and received by the other tags 20 in the dynamic local mesh network during operation and that is to be aggregated and communicated to the management system platform 140 and/or the remote computer system 220 by the tag 20 that is determined to be in the optimal condition to transmit the data. The data and updates from the management system platform 140 and/or the remote computer system 220 can include data and information to be stored in the local memory of the tag 20 and/or updates to data and information stored in the local memory. The data and updates can also include new or updated programs, algorithms, or applications to be stored and executed in the tag 20. The data and updates can also include new or updated AI models, model parameters, weights or other values, etc. to be executed in the tag 20. For example, as the tags 20 continue to communicate data to the management system platform 140 and/or the remote computer system 220, the AI models that were created can be refined, updated, and trained to make more accurate determinations and predictions. These updates can then be communicated back to the tags 20. Similar to other data communications described herein, the tag 20 can determine that conditions are not suitable to receive and store the data and updates and can decline and defer until it determines the conditions are more suitable. The tag 20 can either await a next scheduled communication or can request to receive the data and updates.

In blocks 108 and 110, the tag 20 can receive alarms and/or alerts from the management system platform 140 and/or from one or more mobile devices. For example, the tag 20 can receive alarms and/or alerts with a command to take an action such as activating the LED 64, the tone generator 68, and/or the stimulator 70 to identify and distinguish a livestock 12 from other livestock and/or to urge the livestock 12 to do something like return to a designated area. Such an alarm or alert can be received from a mobile device, for example as a rancher or herd manager is physically observing a group or herd and attempting to locate a particular livestock 12 for instance. The tag 20 also can receive alarms and/or alerts to take an action such as activating the microphone 66 and/or the camera 72 to acquire audio and or video data. Such an alarm or alert can be in response to an alarm or alert generated by the tag 20 in the first instance. For example, if the tag 20 generated and communicated an alarm or alert of a potential predator or other potentially dangerous condition, an alarm or alert with a command to obtain audio and/or video data could be communicated back to the tag 20 to try to confirm the presence of the predator or other dangerous condition. The tag 20 can also receive data, parameters, or other information related to an action commanded by an alarm or alert, for example to cause the LED 64 to blink on and off in a particular pattern, or to cause the tone generator to play a particular tone or sound sample. Similar to other data communications described herein, the tag 20 can determine that conditions are not suitable to receive and act upon an alarm or alert and can decline and defer until it determines the conditions are more suitable.

In connection with the communication of data, determinations, alarms, and alerts in blocks 102, 104, 106, and 108, the tag 20 can first try to communicate with the management system platform 140 and/or the remote computer system 220 via a local communications channel such as the Bluetooth transceiver 84 or the LPWAN transceiver 88 if it is within signal range of a corresponding transceiver. For example, a corresponding Bluetooth or LPWAN transceiver 84, 88 could be embedded in a mobile device hosting the management system platform 140 or in a local sensor and transceiver 34 that is within range of a livestock 12 with a tag 20 wanting to communicate. This situation can often occur for example when a relatively large number of livestock 12 are present within a relatively small area, e.g., a feedlot, or on a relatively small plot of land. The tags 20 can communicate data via the Bluetooth and LPWAN transceivers 84, 88 at relatively high rates and relatively inexpensively compared to using long range communications channels. However, if a tag 20 determines that a suitable Bluetooth or LPWAN connection is not available, for example when the livestock 12 to which the tag 20 is attached is on the open range and far removed from the management system platform 140 and any local sensors and transceivers 34, then the tag 20 has the option to communicate over a long range communications channel such as the cellular network via the cellular transceiver 86 or a satellite data network via the satellite data network transceiver at a lower data rate and at additional expense. The tag 20 thus is able to autonomously select the fastest and least expensive communications channel to communicate data depending on the conditions, e.g., location, signal strength, tag 20 power level, and other transmission conditions. Over time, this functionality can save a significant amount of money.

Also in connection with the communication of data, determinations, and alarms and alerts in blocks 102, 104, 106, and 108, the tag 20 preferably compresses the data to be communicated to reduce the volume of data to be communicated and to reduce data costs. In addition, each tag 20, the management system platform 140, the remote computer system 220, and each mobile or other device with which a tag 20 communicates includes a unique set of cryptographic keys. Each tag 20 and each platform, system, or device with which it communicates encrypts outgoing communications and decrypts incoming communications using the keys so that all communications are encrypted end to end.

In block 112, the tag 20 can be configured and adapted to enter a sleep state to reduce power consumption and/or conserve stored electrical energy. The tag 20 can alternate between an active state in which it performs some or all of the functions described in connection with blocks 94, 96, 98, 102, 104, 106, 108 and 110 and the sleep state of block 112. During a sleep state, the tag 20 can shut down some or all operations in order to reduce the consumption of power and to conserve the stored electrical energy in the power source 42. During an active state, the tag 20 can perform some or all of the functions described herein. The tag 20 can perform the same functions during each active state cycle or can perform different functions during different active state cycles. The interval between active and sleep states can be fixed or variable, and may also be varied based on the level of energy remaining in power source 42. For example, the sleep state can be longer during expected periods of herd inactivity, e.g., at night, and shorter during the day. The active state would vary conversely. Also for example, the tag 20 can dynamically determine and vary the time period of a sleep state and an active state based on the length of time it takes the tag 20 to perform certain functions, an evaluation of current or historical livestock activity, etc. Such functions could include, for example, how long it may take to charge the rechargeable energy storage 48. The tag 20 can be adapted to remain in the sleep state or active state for a variable time period based on the current charge level of the rechargeable energy storage 48, the current charging conditions, and the current weather conditions.

In block 114, the tag 20 can be adapted and configured to exit or wake from a sleep state. The tag 20 can exit or wake from a sleep state based on a time-out or time elapsed signal from a timer in the tag 20 or based on receiving a signal indicating an internal or external event, such as alarm or alert, a gunshot or vehicle noise, etc. The tag 20 can also exit a sleep state when it receives a signal or communication from another tag 20, from the management system platform 140, and/or from the remote computer system 220. When the tag 20 exits the sleep state, it can continue to acquire, store, and process data and information, make determinations, etc. as described herein and as shown in FIG. 8.

Figure 15:
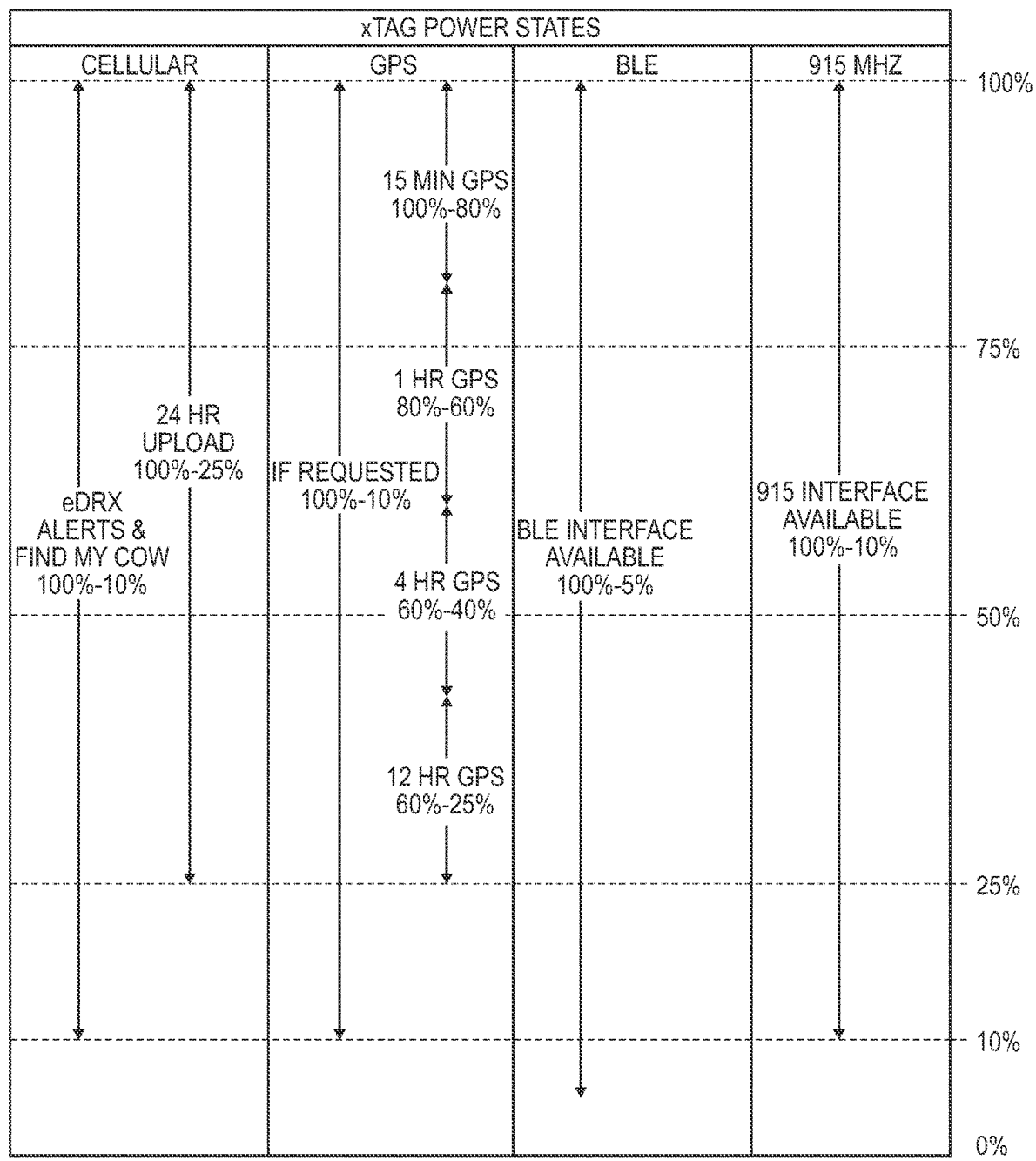
FIG. 15 is a chart illustrating power states for tags in accordance with an example embodiment.

In addition to an active or sleep state, any combination of features available for tag 20 to perform can be switched off, decreased or reduced based on the level of power in power source 42. A simplified chart showing possible thresholds is shown in FIG. 15. In operation, more important or time-critical features can remain available over a wider range of available power, while less important or less time-critical features can be reduced or disabled more readily when the power source 42 is more depleted. Examples include cellular communications relating to alerts or location of a livestock 12, (e.g., "find my cow") can be enabled for an available energy range between 10% to 100%. Energy for this functionality can be saved by the use of eDRX. Less urgent uses of cellular data, such as 24-hour uploads, can be enabled for an available energy range between 25% to 100%, and disabled when storage capacity falls below 25%.

GPS functionality can be controlled in a similar way. For example, if a GPS position is requested by the system, the GNSS receiver 82 can be enabled for an available energy range between 10% to 100%, while periodic locations can be taken based on other storage levels, and vary depending on the duration between measurements. Thus, 15-minute location determinations may be taken for an available energy range between 80% to 100% of the power source 42; 1-hour locations between 60% to 80%; 4-hour locations between 40% to 60%; and 12-hour locations between 25% to 60%. Low-energy Bluetooth functionality can be made available for an available energy range between 5% to 100%, and a 915 MHz wireless interface can also be available for an available energy range between 10% to 100%. Of course, these thresholds can also be different as necessary to conserve power, or if any particular functionality is deemed to be more important.

4. Logical Data Structures

The tag 20 can arrange the data and information it receives or acquires and the determinations it generates in one or more logical data structures wherein related data, information, and determinations are logically grouped for storage and access in its local physical memory. One potential logical data structure 120 is illustrated in FIG. 9 for example. However, it is contemplated and will be appreciated that numerous other and different data structures could be used to store and access the data and information in the local memory of the tag 20. Any and all such data structures that are consistent with carrying out the goals, functions, and operations of the tag 20 described herein are intended to be included within the scope of the descriptions of the example embodiments herein.

The logical data structure 120 can include a permanent or semi-permanent storage section 122. Data and information regarding the tag 20 and the livestock 12 to which it is attached that is intended to be retained permanently or semi-permanently can be stored together in the permanent or semi-permanent storage section 122. For example, such data and information can include, but is not limited to, unique tag ID data and other information that is unique to the tag 20, unique encryption key(s) for secure communications with the tag 20, and contact information for the owner of the tag 20 in case it becomes detached and is lost and found. Such data and information can also include, but is not limited to, data and information unique to the livestock 12 to which the tag 20 is attached, such as ownership information, contact information, genetic chain information, demographic information, and health and vaccine history of the livestock 12.

The logical data structure 120 also can include a tag data section 124 for records of data that the tag 20 periodically acquires or receives in operation. Such data can include, but is not limited to, movement data from the accelerometer 52, orientation data from the gyroscope 54, heading data from the compass 56, elevation data from the altimeter 58, absolute position from the GNSS receiver 82, relative position and angle data from the Bluetooth transceiver 84, body temperature and/or other physical parameter data from the sensor(s) 32, weather and meteorological data from the barometer 59, temperature 74, and/or humidity 76 sensors, audio and/or video data from the microphone 66 and/or camera 72 and/or links thereto, battery level from the power source 42, signal strength from the Bluetooth transceiver 84, cellular transceiver 86, and/or LPWAN 88 transceivers etc. Each time the tag 20 acquires or receives all or some such data, e.g., every 30 seconds, a record comprising the set of data acquired or received can be stored in the tag data section 124 together with the date and time the set of data was acquired or received. The stored data records can be over-written individually, in blocks, or entirely by subsequently acquired or received newer data records. As one example, after a set period of time has elapsed or a set amount of storage capacity has been used each subsequently acquired or received new data record can individually over-write the oldest stored data record still retained in the tag's memory. The tag data section 124 can thus operate like a circular buffer operating on a first in-first out basis. As another example, after some or all of the stored data records have been communicated from the tag 20 to the management system platform 140 and/or the remote computer system 220, all of the communicated records can be erased individually or as a block and can be subsequently overwritten.

The logical data structure 120 also can include a video data section 126 and/or an audio data section 128 that is separate from the tag data section 124. The video data section 126 can include records of video data, e.g., clips, acquired or received by the tag 20 in operation and the audio data section 128 can include records of audio data, e.g., clips, acquired or received by the tag 20 in operation as described herein. Each video and each audio record is stored with the time and date it was acquired or received. In embodiments with a video data section 126 and/or an audio data section 128 separate from the tag data section 124, data records of the tag data section 124 that would otherwise include video and/or audio data can include links or addresses to the respective video and audio data sections 126, 128 where the records reside instead. The video and audio records of the video and audio data sections 126, 128 can be erased and/or over-written by newer video and/or audio records according to the same criteria and in the same manner described above with respect to the records of the tag data section 124.

The logical data structure 120 also can include a detected tags/sensors data section 132 that is separate from the tag data section 124 for the data received from other tags 20 and sensors 34 in a dynamic local mesh network. The detected tags/sensors data section 132 can be arranged with the data received from each tag 20 and sensor 34 in a dynamic local mesh network comprising a separate record together with the date and time at which the data was received and an ID of the tag 20 or sensor 34 from which the data was received. Each record can also include the distance and angle between the tag 20 and the tag or sensor from which the data was received from the Bluetooth transceiver 84. The records of the detected tags/sensors data section 132 can be erased and/or over-written by newer data records according to the same criteria and in the same manner described above with respect to the records of the tag data section 124.

C. Livestock Sensors

The one or more sensors 32 can provide data about internal or external physical parameters of the livestock 12 and potentially about certain conditions and activities of the livestock 12 to the tag 20 attached to the livestock 12. The sensors 32 can communicate with the tag 20 over a wireless connection. The wireless connection can be, but is not limited to, an antenna-based RFID connection via the RFID transceiver 92 of the tag 20 and/or a low power Bluetooth (BLE) connection via the Bluetooth transceiver 84 of the tag 20. While the sensors 32 are sometimes referred to herein as "implanted" sensors 32, it is contemplated and will be appreciated that the sensors 32 can include one or more sensors that are implanted in the livestock 12 and/or one or more sensors 32 that are attached externally to the livestock 12.

The one or more sensors 32 can sense various physical parameters of the livestock 12 including, but not limited to, internal body temperature and/or relative body temperature. In an example embodiment, an implanted sensor 32 can comprise an internal body temperature sensor comprising a thermopile. The body temperature sensor is implanted in the livestock 12 at a location that is suitable to provide an accurate reading of the internal body temperature of the livestock 12. The location can be and likely is spaced apart from the ear location where the tag 20 is preferably attached, however in some embodiments the body temperature sensor can be implanted in or attached to the same ear of the livestock 12 to which the tag 20 is attached but at a location spaced apart from the tag 20. Similarly, a temperature sensor 32 attached externally to an ear of the livestock 12 or elsewhere spaced apart from the tag 20 can provide relative body temperature data of the livestock 12. Depending upon placement, such a sensor 32 can provide internal body temperature and/or relative body temperature readings of the livestock 12 that can be closely and accurately correlated with the health-related and other physical conditions of the livestock 12 that are to be determined, e.g., illness, estrus, etc.

The one or more sensors 32 can also potentially provide data concerning certain conditions and activities of the livestock 12. For example, a pressure sensor 32 can be externally attached to or implanted under the skin of the back of a breeding livestock 12, e.g., a cow. The pressure sensor 32 can provide data indicating that the livestock 12 has been mounted and can be used to determine the livestock 12 is in estrus and/or is breeding for example.

The sensors 32 can provide data continuously, periodically, or on demand by the tag 20. For example, an implanted body temperature sensor 32 can provide instances or samples of internal body temperature data over time from which the tag 20 can detect variations in the internal body temperature of the livestock 12 in relation to a baseline such as a long-term average of such temperature, and can determine from such variations health-related and other physical conditions of the livestock 12 as described herein.

It is contemplated and will be appreciated that in other embodiments, one or more sensors 32 can be embedded in the tag 20 and/or attached externally to and/or implanted in the livestock 12 at various locations. In all such embodiments the sensors 32 are preferably adapted and configured to measure one or more physical parameters, conditions, and/or activities of the livestock 12 to which they are attached.

D. Local Sensors and Transceivers

One or more of the local sensors and/or transceivers 34 can be in one or more fixed locations of an area under management or can be mobile within one or more designated areas of the area under management, preferably at one or more fixed locations or within one or more designated areas where livestock 12 also are present from time to time. The local sensors and/or transceivers 34 are adapted and configured to communicate with the tags 20 that are within range and to become a member of a dynamic local mesh network with such tags 20 as described above. Some or all of the local sensors and/or transceivers 34 can also be adapted and configured to communicate with the management system platform 140 and/or the remote computer system 220 separately from the tags 20.

Similar to the tags 20, the local sensors and/or transceivers 34 can include Bluetooth transceivers and RFID transceivers (which may be 915 MHz transceivers). The local sensors and/or transceivers 34 can be adapted and configured to communicate with the tags 20 within range locally using either or both of these transceivers. Also similar to the tags 20, the local sensors and/or transceivers 34 can include cellular, satellite, and/or LPWAN transceivers. The local sensors and/or transceivers 34 can be adapted and configured to communicate remotely with the management system platform 140 and/or the remote computer system 220 using any or all of these transceivers.

One or more local sensors and/or transceivers 34 in one or more fixed locations can be coupled to and adapted and configured to communicate data between various local devices described herein, the tags 20 that are within range, and the management system platform 140 and/or the remote computer system 220. As one example, a local sensor and transceiver 34 can be connected to, can be part of, or can be otherwise in communication with a scale that livestock 12 are herded to cross over, for example in a chute leading in or out of a corral or feedlot. The scale automatically weighs each livestock 12 as it crosses and the local sensor and transceiver 34 receives the weight data, read the ID of the tag 20 attached to the livestock 12, associates the weight data with the tag ID, and communicates the weight data and tag ID to the management system platform 140 and/or the remote computer system 220 to automatically track the weights of the livestock 12. The local sensor and transceiver 34 can also communicate the weight data of each livestock 12 locally to the attached tag 20 for local storage and weight tracking by the tag 20. Such data can be used to detect and monitor livestock 12 health since reduced weight can be an indication of illness. The data can also be used to detect and monitor the market value of the livestock 12 since value is based at least partly on weight.

As another example, local sensors and transceivers 34 can be located at or near one or more feed stations or sources and/or one or more water stations or sources. Such sensors can include photo-sensors and/or other types of location and/or proximity sensors. The local sensors and transceivers 34 can detect when a tag 20 is nearby indicating that the livestock 12 to which the tag 20 is attached is eating or drinking. The local sensors and transceivers 34 can read the ID of the tag 20, correspond the tag ID with data about the source, e.g., feed or water, location, ID of the source, the time the livestock 12 spends at the source, etc., and can communicate the data to the management system platform 140 and/or the remote computer system 220 to automatically track the eating and drinking behavior of the livestock 12. Such data can be used to automatically detect possible health-related conditions of the livestock 12, such as a respiratory illness that is indicated by fewer and/or shorter trips to feed and/or water stations/sources. The data can also be used to automatically track the usage and inventory of consumable resources, such as feed and water, and to provide alerts when replenishment is required. The local sensors and transceivers 34 also can communicate some or all of the data to the tags 20 attached to the livestock 12 for local storage and processing.

It is contemplated and will be appreciated that the data provided by the local sensors and transceivers 34 regarding livestock 12 proximity to feed and/or water stations or sources as an indication of eating and drinking behavior can be processed with other data acquired by the tag 20 attached to the livestock 12 to provide even more accurate determinations. Such data can include, for example, the location of the tag 20 (from the GNSS receiver 82), and the orientation and elevation of the tag 20 (from the gyroscope 54 and altimeter 58), which are indicative of eating and drinking behavior as described above and shown in FIG. 12.

As another example, a local sensor and transceiver 34 can be located at a chute structure leading to a plurality of corrals or other holding areas each having a separate entry gate. The local sensor and transceiver 34 can read the tag ID's from the tags 20 as the livestock 12 traverse the chute/alley and can communicate with one or more local controllers to automatically control the opening of the gate associated with a particular corral or holding area based on the tag ID. This capability enables the livestock 12 to be automatically sorted and segregated according to one or more selected characteristics. For example, cows, calves, bulls, breeders, heifers, sick animals, animals in estrus, and animals about to calve can be automatically sorted and segregated in one or more separate corrals or holding areas.

As still another example, a plurality of local sensors and transceivers 34 can be located at spaced apart fixed locations corresponding to boundaries of one or more designated areas within the area under management or the perimeter of the area under management as described above. As a livestock 12 approaches and/or crosses such a boundary or perimeter, one or more of the local sensors and transceivers 34 can detect and communicate with the tag 20 attached to the livestock 12. The local sensors and transceivers 34 can receive the tag ID, and communicate an alarm or alert to the management system platform 140 together with the tag ID and other data from the tag 20, for example the location, heading, and rate of speed of the livestock 12. The local sensors and transceivers 34 can also communicate an alarm or alert to the tag 20 to take an action such as activating the tone generator 68 and/or the stimulator 70 to urge the livestock 12 to stop and/or to return across the boundary or perimeter.

As yet another example, local sensors and transceivers 34 can be placed in one or more corrals, chutes, gates, or other designated areas livestock 12 must pass nearby to obtain selected information from the tags 20 and to communicate the data to the management system platform 140 to automatically track the status of the livestock 12. For example, the local sensors and transceivers 34 can read the tag ID and receive other selected tag data such as the vaccination status and/or history of the livestock 12. The local sensors and transceivers 34 can also receive the medicinal status and/or history of the livestock 12, such as whether and when it was administered a particular medicine or was sprayed with an insecticide against lice, parasite or grub infestation. The local sensors and transceivers 34 can also receive medical procedure status and/or history of the livestock 12. The local sensors and transceivers 34 can communicate this data to the management system platform 140 to automatically determine and track if the livestock 12 is up to date on vaccinations, needed medicines, and/or medical procedures, and to generate alarms or alerts to a rancher, herd manager, etc. to take appropriate action.

In addition to generating alarms or alerts to take action, the local sensors and transceivers 34 can be adapted and configured to respond to data communicated with the tags 20 to autonomously trigger action by associated equipment. As one example, a local sensor and transceiver 34 can receive data from a tag 20 that indicates the livestock 12 to which it is attached is not up to date on a vaccine, medicine, or topical treatment and can activate associated sprayer or injection equipment to autonomously administer the needed item. The tag 20 in communication with the local sensor and transceiver 34 can then update the data for the livestock 12 in the tag 20 and the tag 20 and/or the local sensor and transceiver 34 can communicate the updated data to the management system platform 140 in a manner described herein. As another example, the local sensor and transceiver 34 can implement an auto-sorting gate by responding to a tag ID received from a tag 20 to select and activate a pen/gate control to autonomously direct the livestock 12 to a selected area. This functionality is useful not only for farms but for sales rings.

Local sensors and/or transceivers 34 can also be placed in one or more mobile devices within one or more designated areas of an area under management. As one example, a local sensor and transceiver 34 can be present in a mobile phone or mobile computing device carried by a rancher, herd manager, ranch hand, etc. As another example, a local sensor and transceiver 34 can also be placed on or in a drone or vehicle remotely controlled by a rancher, herd manager, etc. The local sensor and transceiver 34 can read the ID's of nearby tags 20 and the mobile device can display or otherwise communicate them to the rancher, herd manager, etc. so that one or more can be selected. The local sensor and transceiver 34 can then communicate an alarm or alert to the selected tag(s) and cause them to take action to identify the livestock 12 to which they are attached, for example by activating the LED 64 and/or the tone generator 68. This is helpful for the rancher, herd manager, etc. to select and identify a particular livestock 12 out of a group or herd of livestock 12, for example to administer a vaccination or medicine, address a health-related issue, etc.

As described above, the local sensors and/or transceivers 34 can also be adapted and configured to communicate data between the tags 20 and the management system platform 140 and/or the remote computer system 220 when a tag 20 is within Bluetooth or LPWAN signal range of a corresponding Bluetooth or LPWAN transceiver of a local sensor and transceiver 34. The local sensor and transceiver 34 can in turn communicate with the management system platform 140 and/or the remote computer system 220 via the same or another wired or wireless communications channel and/or network interface as described herein. Similarly, if a tag 20 is within Bluetooth or LPWAN range of a local sensor and transceiver 34, the local sensor and transceiver 34 can receive data and/or updates from the management system platform 140 and/or the remote computer system 220 and can communicate them to the tag 20 via the corresponding Bluetooth or LPWAN transceivers.

E. Management System Platform

The management system platform 140 is adapted and configured to provide management of the livestock 12 to which tags 20 are attached and of the tags 20 themselves. The management system platform 140 is adapted and configured to perform various functions and operations related to management of the livestock 12 individually and as a herd. Such functions can include, but are not limited to: detecting, monitoring, tracking, and responding to various current health-related conditions of the livestock 12; monitoring, tracking, and maintaining data regarding various characteristics of the livestock 12; monitoring, tracking, and responding to location and movement of the livestock 12; detecting, monitoring, and responding to significant current physical conditions of the livestock 12; determining and maintaining genetics and family lineage data of the livestock 12; monitoring and managing the usage of grazing areas under management by the livestock 12; monitoring and maintaining health history of the livestock 12; generating, tracking, and maintaining demographic, history, and other data of the livestock 12; detecting, monitoring, and responding to external events; creating and managing system access for external users; monitoring and managing inventories of consumables; monitoring, tracking, and maintaining various financial data; detecting, monitoring, and responding to weather and meteorological conditions and/or events; tracking and maintaining historical ownership and location data of the livestock 12; and monitoring and responding to various tag 20 conditions.

The management system platform 140 can comprise and can be hosted on one or more computers, such as a desktop PC, workstation, or server at one or more fixed locations, including in the cloud, and/or on one or more mobile computing devices, such as a laptop PC or tablet computer, etc. A number of suitable host platforms are identified and described further below. In addition, all or a portion of the management system platform 140 can be duplicated and/or distributed across one or more host platform devices. The management system platform 140 can communicate with the tags 20 and the local sensors and transceivers 34 wirelessly either locally or remotely via cellular, satellite, or IP-based networks, LPWAN, and/or other communications channels as illustrated in FIGS. 5 and 10.

The management system platform 140 is adapted and configured to communicate with the tags 20, with the local sensors and transceivers 34 in the area under management, and with the remote computer system 220. The management system platform 140 can send and receive various information to and from the tags 20, local sensors and transceivers 34, and remote computer system 220 including, but not limited to, data, alerts and alarms, programs, applications, AI models, other detection algorithms, and updates. The management system platform 140 is adapted and configured to receive and store the data generated by each individual tag 20 and local sensor and transceiver 34 and to process and respond to such data to perform the various management functions described herein. The management system platform 140 is also adapted and configured to receive, aggregate, and store the data received from all of the individual tags 20 and the local sensors and transceivers 34 and to process, respond to, store, communicate, and provide access to such data to perform the various management functions described herein.

1. Elements and Architecture.

Figure 10:
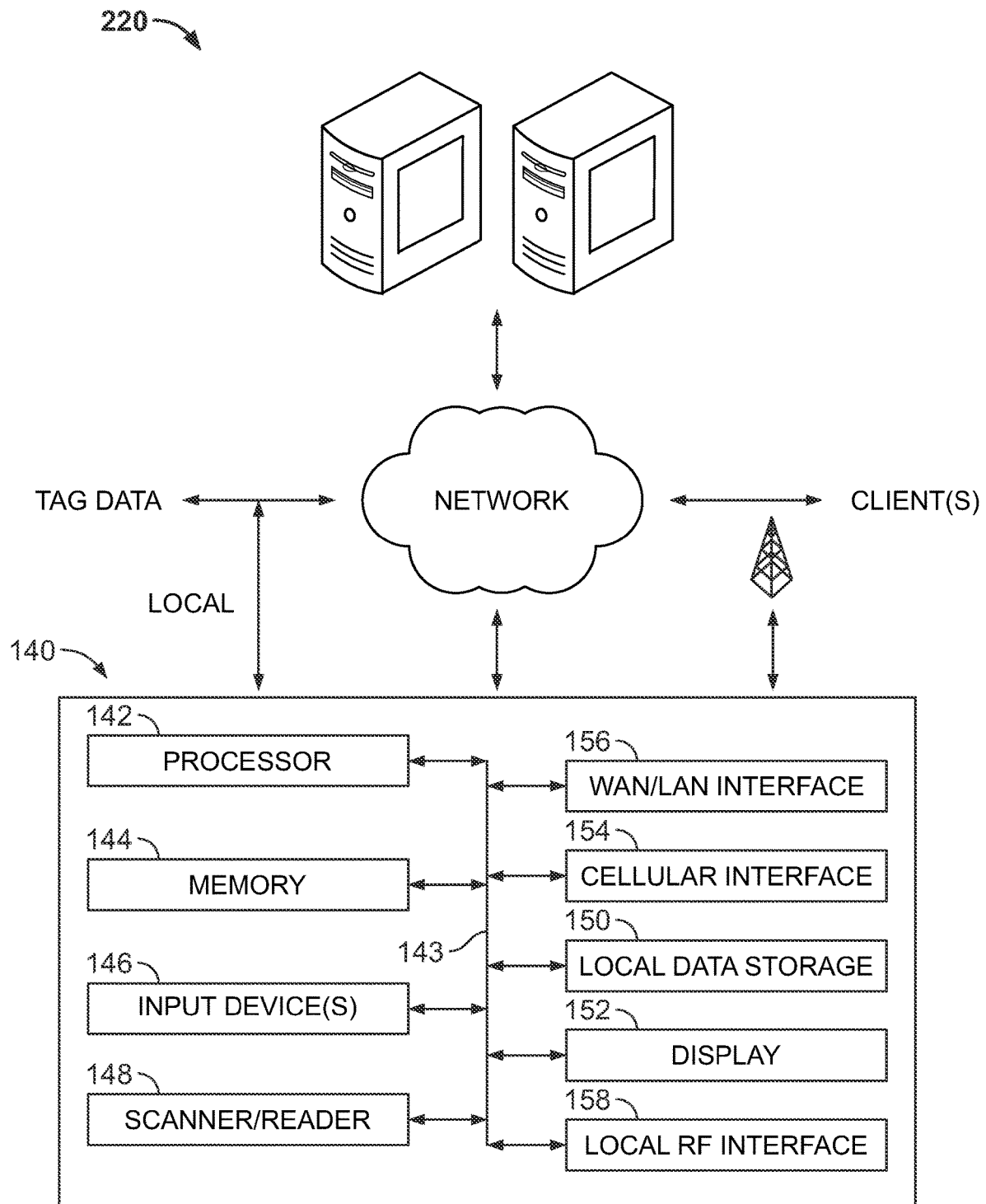
FIG. 10 is a combination block diagram illustrating the elements and architecture of a management system platform of a livestock management system and graphical representation illustrating communications relationships between the management platform and other elements of the system in accordance with an example embodiment.
Figure 11A:
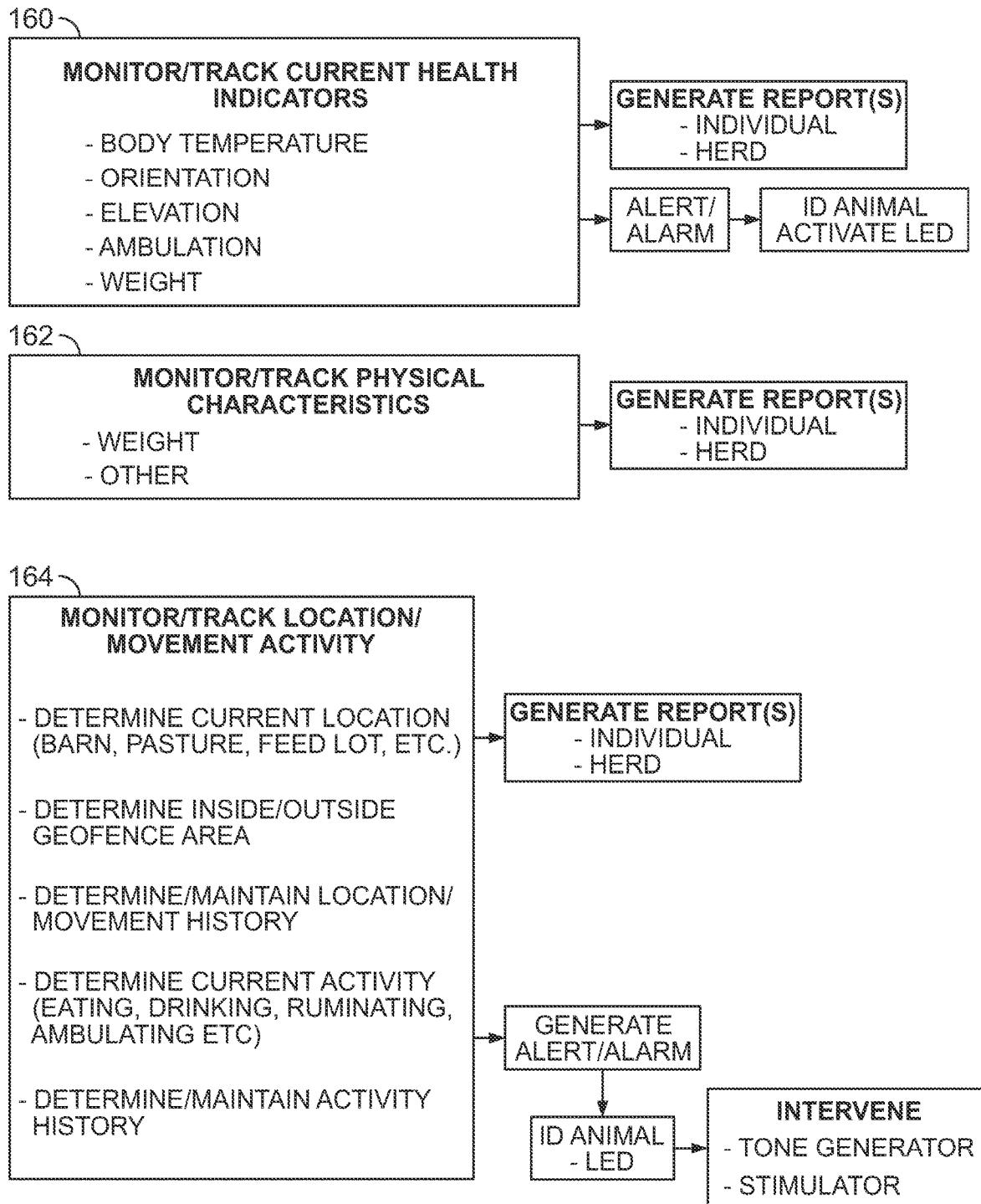
FIG. 11A is a block diagram illustrating some potential functions performed, one possible logical flow, and associated data received, processed, and maintained in a management system platform of a livestock management system in accordance with an example embodiment.
Figure 11B:
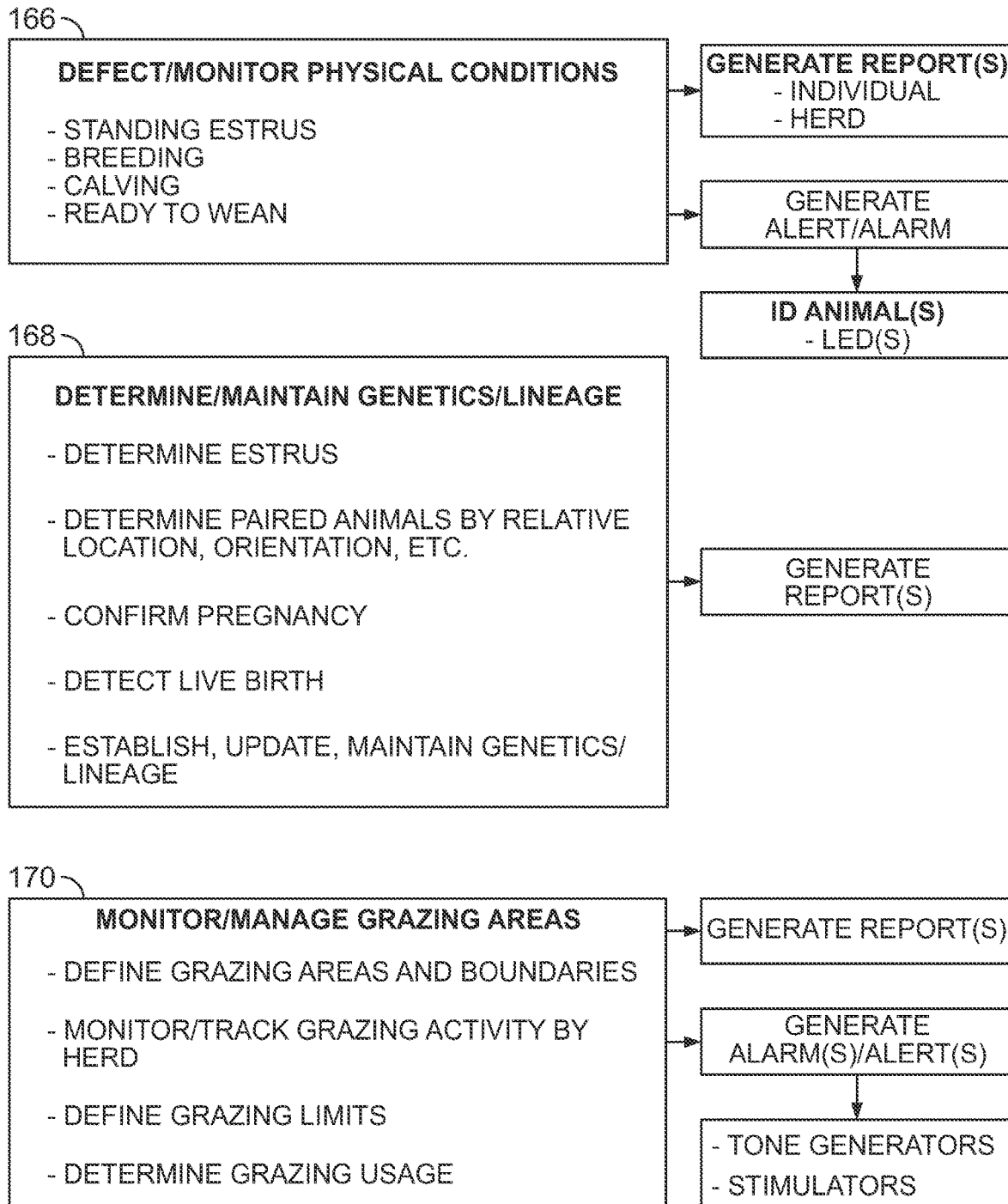
FIG. 11B is a block diagram illustrating some potential functions performed, one possible logical flow, and associated data received, processed, and maintained in a management system platform of a livestock management system in accordance with an example embodiment.
Figure 11C:
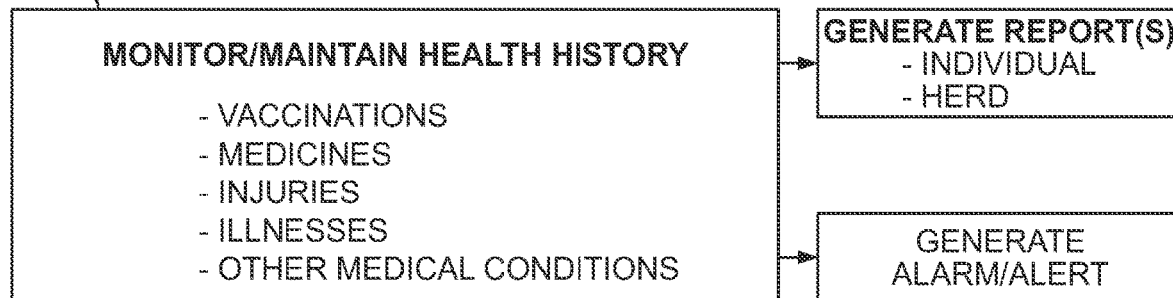
FIG. 11C is a block diagram illustrating some potential functions performed, one possible logical flow, and associated data received, processed, and maintained in a management system platform of a livestock management system in accordance with an example embodiment.
Figure 11C:
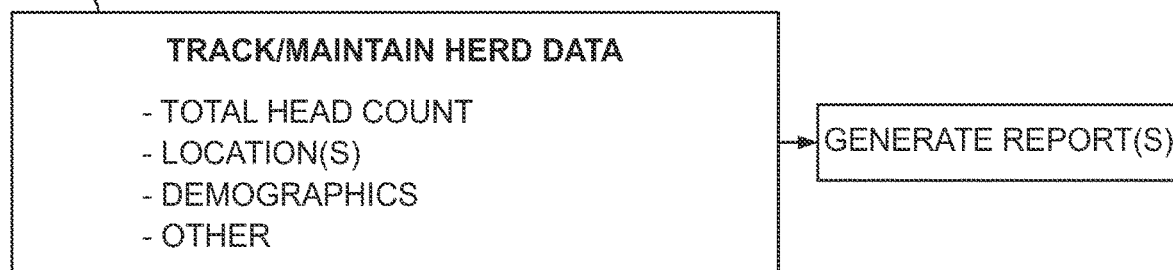
Figure 11C:
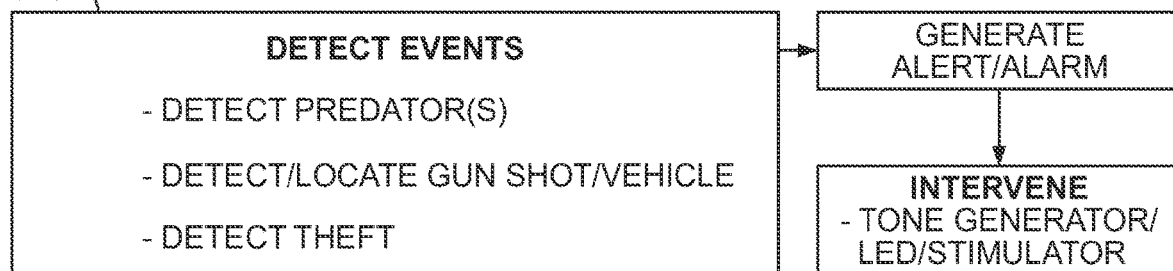
Figure 11C:
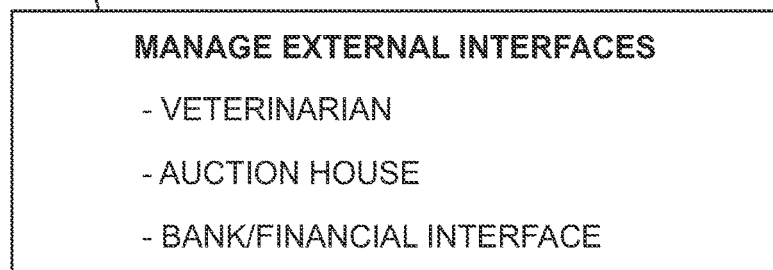
Figure 11E:
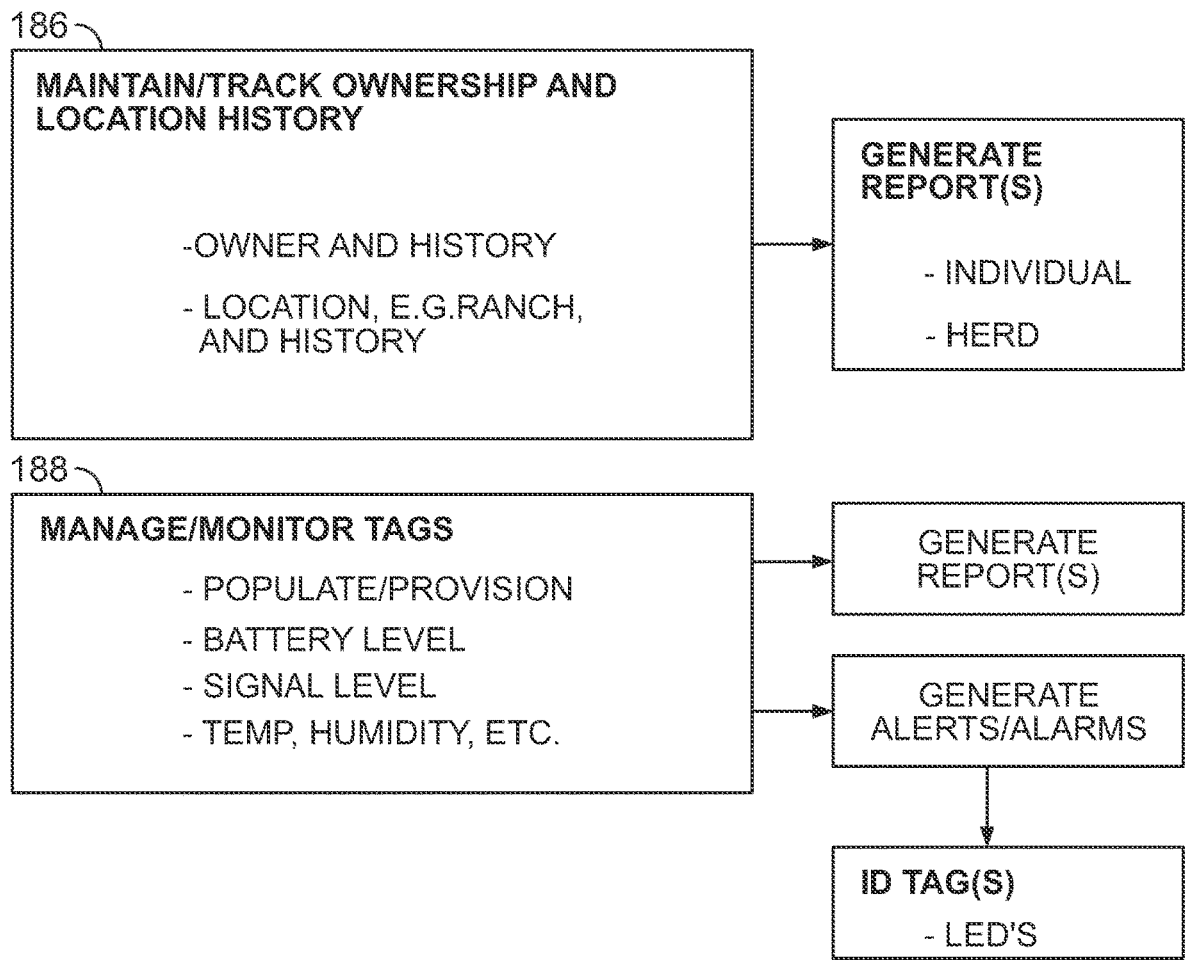
FIG. 11E is a block diagram illustrating some potential functions performed, one possible logical flow, and associated data received, processed, and maintained in a management system platform of a livestock management system in accordance with an example embodiment.

As illustrated in FIG. 10, the management system platform 140 can include a processor 142, a memory element 144, one or more input devices 146, a scanner/reader 148, local storage 150, and a display 152. The management system platform 140 can also include a communications interface comprising a cellular network interface 154, a WAN/LAN network interface 156, and a local RF interface 158. The communications interface can also include a satellite network interface and/or an LPWAN interface if desired.

The processor 142 can comprise one of the types of processors described herein below. For example, the processor 142 can include one or more commercially available general purpose processing unit(s) (GPU's) such as microprocessor(s), etc. The processor 142 is adapted to execute programs, applications, models, etc. stored in the memory 144 and to process the data received by the management system platform 140 in order to perform the livestock management functions and operations described herein.

The processor 142 is configured and programmed to communicate with, to control, and to manage the operation of the various other components and elements of the management system platform 140 identified above and illustrated in FIG. 10. The processor 142 is connected to and communicates with each of the elements and components via a bus 143. The bus 143 may comprise one or more physical and/or logical buses adapted to carry data, instructions, commands, requests, control words, etc. between the processor 142 and each of the other elements and components.

The memory element 144 is adapted to provide local storage for operating and applications data for use in connection with the operation and functioning of the management system platform 140. The memory element can include a memory controller, a volatile memory such as DDR DRAM, and a non-volatile memory such as Flash or another electrically erasable programmable read only memory (EEPROM), or an erasable programmable read only memory (EPROM). The memory element 144 can provide local storage for basic operating data necessary for the processor 142 to provide the basic operation of the management system platform 140 such as an operating system, BIOS, etc. The memory element 144 can also provide local storage for application data, programs, applications, models, parameters, settings, etc. for execution by the processor 142 for the management system platform 140 to perform the various livestock management functions described herein.

The input device(s) 146 are adapted and configured to enable a user to interact with the management system platform 140. The user can interact with the management system platform 140 using the input device(s) 146 in many ways including, but not limited to, inputting or entering data, selecting items of data or information presented by the system, selecting programs, applications, models, algorithms, functions, etc. presented by the system to be performed, making requests or giving commands to the system, etc. The input device(s) 146 can comprise one or more user-operable input devices including, but are not limited to, mice, track-balls, touch pads, touch screens, keyboards, etc. To the extent not identified here, the input device(s) also can include any of the types of user-operable input devices identified and described below.

The scanner/reader 148 is adapted and configured to scan and/or read data and/or information from a tag 20 when the scanner/reader 148 is in proximity to the tag 20. The scanner/reader 148 can include, but is not limited to, an RFID scanner/reader, a bar code scanner/reader, a QR code scanner/reader, etc. The data and/or information can include any data that can be encoded and included on or in a tag 20. Such data and/or information can include, but are not limited to, a unique tag ID, and corresponding data that is specific to the livestock 12 to which the tag 20 is attached or is to be attached, etc.

The scanner/reader 148 can be incorporated in a mobile element of the management system platform 140 such as a hand-held or other mobile device. Such a device can be carried by a rancher, herd manager, etc. and can be used to scan and/or read data and/or information from a tag 20 attached to a particular livestock 12 in the field. This can enable a rancher, herd manager, etc. to locate a particular livestock 12, confirm the identity of a particular livestock 12, and/or provide attention to a particular livestock 12 in the field. Similarly, the scanner/reader 148 can be used to scan or read data and/or information from a tag 20 that has become detached from a livestock 12 in the field and has subsequently been found. The data can help locate and identify the livestock 12 from which the tag 20 became detached and the tag 20 can then be re-attached to the correct livestock 12. Alternatively, the found tag 20 can be removed from the management system and its data transferred to a new tag 20 that is attached to the livestock 12.

The scanner/reader 148 also can be incorporated in a non-mobile element of the management system platform 140 such as a desktop PC or work station in an office. In that setting, the scanner/reader 148 can be used to enter new tags 20 into the management system that are to be attached to new livestock 12, e.g., recently born or recently acquired livestock 12 that are to be added to the herd under management.

The local storage 150 is adapted and configured to provide storage for the data and information received from the tags 20, from local sensors and transceivers 34, and from the remote computer system 220, and from other external sources, e.g., banks, veterinarians, markets, other ranches, etc. The local storage 150 is also adapted and configured to provide storage for data and information generated by the management system platform 140 and/or the remote computer system 220. The local storage 150 can comprise one or more suitable storage devices with sufficient capacity, including but not limited to disk drives, solid state drives (SSD's), and/or tape units, etc. To the extent not identified here, the local storage 150 also can include any of the types of storage devices identified and described below.

The display 152 is adapted and configured to visually present data and/or information for a user of the management system platform 140. Such data and/or information can include, but is not limited to, data or information entered by the user, data or information received from one or more tags 20 and/or local sensors and transceivers 34, data or information received from other external sources, data or information generated by the management system platform 140, representations of data, information, programs, applications, models, functions, etc. for selection by a user, and representations of user-selectable menus and menu items. The display 152 can include one or more of any suitable type of display including, but not limited to, computer displays, television displays, and mobile device displays. To the extent not identified here, the display 152 also can include any of the types of display devices identified and described below. As one example, the display 152 can display a visual representation of a surface map or a topographic map of an area under management and/or one or more designated areas within the area under management. The management system platform 140 can include mapping software and maps for this purpose and/or can receive this information from an external source. The display 152 can also display one or more user-defined geo-fence boundaries of the area under management and/or one or more designated areas within the area under management as an overlay on the map. The management system platform 140 can generate this information from known GPS coordinates of the physical bounds of the area under management and the designated areas within the area under management. The display 152 can also display representations of some or all of the livestock 12 under management as overlays on the map. The management system platform 140 can generate this information from the GPS location data of each of the livestock 12 received from the tags 20 attached to the livestock 12. The displayed information enables a user to visually determine the locations of each of the livestock 12 under management relative to the area under management, the designated areas within the area under management, and the geo-fence boundaries. The user can thus readily determine whether a livestock 12 is within or outside of the perimeter boundary of the area under management for example.

The management system platform 140 also can be adapted and configured to cause the display 152 to display the representations of the livestock 12 with different display attributes, e.g., colors, blinking, etc., based on various characteristics or conditions of the livestock 12, e.g., bulls, cows, calves, recently ill, recently vaccinated, etc. The management system platform 140 can also be adapted and configured to respond to a user selection of a representation of a livestock 12 on the display 152 to take an action with respect to the selected livestock 12. For example, a user can select a displayed representation of a livestock 12 using the input device 146, and one action taken can include displaying additional information about the selected livestock 12. Depending on how the management system platform 140 is configured, the information displayed can include any or all of the information from the tag 20 attached to the livestock 12, and any or all of the information about the livestock 12 maintained at the management system platform 140. Another action can be generating and sending an alarm or alert regarding the selected livestock 12. Any number of actions can be taken separately or in combination.

The management system platform 140 is adapted and configured to communicate with the tags 20, the local sensors and transceivers 34, and the remote computer system 220 via the communications interface. The communications interface provides interfaces to a number of different communication channels over which the management system platform 140 can communicate.

The cellular network interface 154 provides one communications channel over which the management system platform 140 can communicate remotely with the tags 20, the local sensors and transceivers 34, and the remote computer system 220. The cellular network interface 154 includes a cellular network transceiver that is operative to wirelessly transmit and receive data to and from corresponding cellular transceivers 86 of the tags 20, the local sensors and transceivers 34, and the remote computer system 220 via one or more cellular networks, including for example those previously identified herein. The cellular network transceiver of the management system platform 140 can be the same as or similar to the cellular network transceivers 86 of the tags 20 and the local sensors and transceivers 34 described above.

The cellular network transceiver of the management system platform 140 communicates data with one or more cell towers within cellular signal range. The cell towers communicate data in both directions between the management system platform 140, the individual tags 20 and local sensors and transceivers 34, and the remote computer system 220. The data can be communicated directly between the corresponding cellular transceivers over the cellular network, or can be communicated part of the way over the cellular network and part of the way over an intermediate WAN and/or LAN network, including but not limited to the Internet, as shown in FIG. 10. One or more cellular boosters, repeaters, and/or gateways may also form part of the cellular communications channel between the management system platform 140, the individual tags 20, the individual local sensors and transceivers 34, and the remote computer system 220.

If desired, the communications interface can also include a satellite data network interface. The satellite data network interface provides another communications channel over which the management system platform 140 can communicate remotely with the tags 20, the local sensors and transceivers 34, and the remote computer system 220. The satellite data network interface would include a satellite data network transceiver that communicates data in both directions between the management system platform 140, the individual tags 20 and local sensors and transceivers 34, and the remote computer system 220 via a network of satellites such as those previously identified herein. The individual tags 20 and local sensors and transceivers 34, and the remote computer system 220 would include corresponding satellite data network transceivers. The data can be communicated directly between the corresponding satellite data network transceivers over the satellite network, or can be communicated part of the way over the satellite network and part of the way over an intermediate WAN and/or LAN network, including but not limited to the Internet.

The WAN/LAN network interface 156 provides another communications channel over which the management system platform 140 can communicate data remotely or locally with the tags 20, with the local sensors and transceivers 34, and with the remote computer system 220. The WAN/LAN network interface 156 can include an LPWAN network transceiver that is operative to wirelessly transmit and receive data remotely to and from the corresponding LPWAN network transceivers 88 of the tags 20 and the local sensors and transceivers 34 including via one or more intermediate WAN and/or LAN networks, such as those previously identified herein, including the Internet. The LPWAN transceiver of the management system platform 140 can be the same as or similar to the LPWAN network transceivers 88 of the tags 20 and the local sensors and transceivers 34. One or more LPWAN gateways, signal boosters, and/or repeaters, etc. can also form part of the LPWAN communications channel between the management system platform 140 and the tags 20 and/or local sensors and transceivers 34.

The WAN/LAN network interface 156 can also include a conventional TCP/IP and/or HTTP type network interface that is operative to communicate data either remotely or locally with the tags 20, with the local sensors and transceivers 34, and with the remote computer system 220 at least when certain conditions are present. For example, the management system platform 140 can communicate data with tags 20, local sensors and transceivers 34, and the remote computer system 220 remotely via a WAN, e.g., the Internet, provided they have an Internet connection available. That often will not be the case with respect to tags 20 but the remote computer system 220 typically will have a wired or wireless WAN connection available. The management system platform 140 also can communicate data with tags 20, local sensors and transceivers 34, and the remote computer system 220 locally via a LAN provided they have a LAN connection available. In the case of the tags 20 in particular, that again depends on whether a wireless LAN connection such as Wi-Fi is available. In the case of the remote computer system 220, a wired or wireless LAN connection is typically available depending on the relative locations of the management system platform 140 and the remote computer system 220.

The local RF interface 158 provides another communications channel over which the management system platform 140 can wirelessly communicate data locally with the tags 20 and with the local sensors and transceivers 34 when the management system platform 140 is in relatively close proximity to a tag 20 or a local sensor and transceiver 34. The local RF interface 158 can include a Bluetooth transceiver and/or an RFID transceiver for that purpose. The Bluetooth and/or RFID transceivers of the management system platform 140 can be the same as or similar to the corresponding Bluetooth and/or RFID transceivers 84, 92 of the tags 20 and the local sensors and transceivers 34 as described above. Accordingly, when the management system platform 140 is within Bluetooth or RFID signal range of a tag 20 or local sensor and transceiver 34 it can communicate data wirelessly via the Bluetooth transceiver or the RFID transceiver with the tag 20 or local sensor and transceiver 34. While this range is quite limited, this mode of communication can be useful for a rancher, herd manager, etc. to communicate with tags 20 while in the field. For example, at least part of the management system platform 140 including the local RF interface 158 can be incorporated in a mobile device that the rancher, herd manager, etc. carries in the field. With this arrangement, the management system platform 140 can communicate data wirelessly with selected tags 20 to which it is in relatively close proximity. As described herein, the management system platform 140 can also communicate data wirelessly with tags 20 via Bluetooth or another local RF communications channel through the local sensors and transceivers 34 when the management system platform 140 and/or the livestock 12 to which the tags 20 are attached are within signal range of the local sensors and transceivers 34.

Similar to the tags 20 as described above, the management system platform 140 can first try to communicate with the tags 20 and/or the remote computer system 220 via a local communications channel such as the Bluetooth transceiver 84 or the LPWAN transceiver 88 if it is within signal range of corresponding transceivers of the tag 20 and/or local sensors and transceivers 34. As noted with respect to the tags 20, the management system platform 140 can communicate data with the tags 20 over these local communications channels at a relatively high data rate and relatively inexpensively compared to using long range communications channels. However, if the management system platform 140 determines that a suitable Bluetooth or LPWAN connection is not available for communication, for example when the livestock 12 to which the tags 20 are attached are on the open range and far removed from the management system platform 140 and any local sensors and transceivers 34, then the management system platform 140 has the option to communicate with the tags 20 over a long range communications channel such as a cellular network via the cellular transceiver 86 or a satellite data network via the satellite data network transceiver. Similar to the tags 20, the management system platform 140 autonomously selects the fastest and/or least expensive communications channel to communicate data depending on the conditions, e.g., location, signal strength, and other transmission conditions. As noted above, this functionality can result in significant savings over time.

Similarly, the management system platform 140 can first try to communicate with the remote computer system 220 over the TCP/IP-HTTP type network interface of the WAN/LAN network interface 156. This communication channel provides greater bandwidth and data rates and is less costly than a long range wireless communications channel such as cellular or satellite. The TCP/IP-HTTP type network interface can provide wired and/or wireless communications over a long range via a WAN such as the Internet and/or over a short range via a LAN. However, if a WAN and/or LAN connection is not available for some reason, then the management system platform 140 has the option to communicate with the remote computer system 220 over a long range wireless communications channel such as a cellular network via the cellular network transceiver 154 of the WAN/LAN network interface 156 or a satellite data network via a satellite data network transceiver albeit at lower bandwidth and data rate and at additional expense.

The management system platform 140 can also communicate data remotely with clients over a WAN/LAN network communications channel via the WAN/LAN network interface 156, a cellular communications channel via the cellular network interface 154, or a satellite communications channel via a satellite data network interface. Clients can include, but are not limited to, banks, insurers, government agencies, veterinarians, auction participants, other service subscribers, etc. as described further below.

2. Functions, Data and Operational Flow.

As illustrated graphically in FIGS. 11A-11E, the management system platform 140 is adapted and configured to perform a number of livestock management functions and operations. The management system platform 140 generally follows a logical flow in carrying out those functions and operations. It will be appreciated that the graphical representation in FIGS. 11A-11E comprises merely some of the functions and operations the management system platform 140 can be adapted and configured to carry out and provides merely an example of one possible logical flow for carrying out such functions and operations. In addition, it should be appreciated that the flow illustrated in FIGS. 11A-11E is intended to be logical in nature and is not intended to be interpreted as necessarily requiring a linear and sequential flow of all of the functions, operations, steps and/or activities of the management system platform 140. Rather, multiple functions, operations, steps and/or activities illustrated may be carried out in various orders and simultaneously or sequentially.

In block 160, the management system platform 140 can detect, monitor, track, maintain, and respond to various current health-related conditions of each individual livestock 12 under management. The management system platform 140 receives data on a periodic basis about one or more physical parameters of each livestock 12 and about determinations made about one or more activities and behaviors of each livestock 12 from the tags 20 attached to the livestock 12. The management system platform 140 can also periodically receive additional data about the livestock 12 directly from one or more local sensors and transceivers 34. The management system platform 140 stores the received data locally in the local data storage 150 and can also communicate the data to the remote computer system 220. The stored data provides a history of the various physical parameters, activities, and behaviors of the individual livestock 12 over time.

The management system platform 140 is adapted and configured to process the received and stored data to determine if a livestock 12 has a current health-related condition that may require attention. The management system platform 140 can process the data and make determinations in the same or a similar manner as the individual tags 20. For example, the management system platform 140 can periodically receive and store data regarding the relative body temperature, the orientation, elevation, ambulation, and the weight of the livestock 12. The management system platform 140 can be adapted and configured to determine that the livestock 12 is healthy if the relative body temperature is within a normal range, the orientation and elevation parameters indicate the livestock 12 is regularly eating, drinking, ruminating, etc., the ambulation determination indicates the livestock 12 is moving about normally, and/or the weight of the livestock 12 is stable or increasing. Conversely, the management system platform 140 can be adapted and configured to determine that the livestock 12 is not healthy, e.g., has an illness or is injured, if the relative body temperature is abnormally high or low, the orientation, elevation, and acceleration parameters indicate the livestock 12 is not eating, ruminating, and drinking normally, the ambulation determination indicates the livestock 12 is stationary or not moving about normally, and/or the weight of the livestock 12 is decreasing. For example, a decrease in water intake can indicate certain respiratory infections. Similarly, an abnormal increase in relative body temperature coupled with reduced ambulation can indicate certain other infections.

If the management system platform 140 determines the livestock 12 has a health-related condition that may require attention, the management system platform 140 can generate and communicate an alert or alarm in the same or a similar manner and with the same or similar information as the individual tags 20. For example, the management system platform 140 can communicate the alarms and alerts to one or more mobile and/or stationary devices of a rancher, herd manager, owner, etc. in the form of email, text messages, or direct device to device communications. The alarms or alerts can include information to help identify the livestock 12, information about the condition that requires attention, and information about action to be taken. The management system platform 140 can also communicate an alarm or alert to the tag 20 attached to the livestock 12 with the health-related condition to cause the tag 20 to activate the LED 64 and/or the tone generator 68 to help the rancher, herd manager, etc. locate the livestock 12 that requires attention, and/or to activate the stimulator 70 to urge the livestock 12 to move to a desired location such as a sick pen or chute. The content of the alarm or alert can vary depending on the condition that caused the management system platform 140 to generate it.

The management system platform 140 can also be adapted and configured to generate a report about the current health of the individual livestock 12 and/or about the health of a group of livestock 12 of the entire herd under management based on the data and determinations received from all of the tags 20 attached to the group or herd.

In block 162, the management system platform 140 can monitor, track, and maintain data regarding various characteristics of the livestock 12. The management system platform 140 can be adapted and configured to receive characteristic data for each individual livestock 12 as input data. For example, such input data can be input using one or more input devices 146 and can include, but is not limited to, birth date, age, sex, breed, coloring, etc. of the livestock 12. Such input data can also include characteristic data received from the tags 20 attached to individual livestock 12 and/or from local sensors and transceiver 34 that communicate with the tags 20. For example, the management system platform 140 can periodically receive data regarding certain variable physical characteristics of a livestock 12 such as weight from the tag 20 attached to the livestock 12 and/or from one or more local sensors and transceivers 34 in communication with the tag 20 and with one or more scales in the area under management. The management system platform 140 stores the input data locally in the memory 144 and/or local data storage 150 thus creating a record and a history of the characteristics of each individual livestock 12 over time. The management system platform 140 can also communicate some or all of the characteristic data to the tag 20 attached to each individual livestock 12 and/or to the remote computer system 220.

The management system platform 140 can be adapted and configured to process the characteristic data for a number of purposes. For example, the data can be processed to determine if a livestock 12 has a current health-related condition, as described above. The data also can be processed for various market, financial, and demographic purposes. For example, the management system platform 140 can determine that a livestock 12 is ready for slaughter when it reaches a certain age and/or weight. It can also determine that a young livestock 12 is ready to be weaned from its mother when it reaches a certain age and/or weight. It can also determine the current market value of an individual livestock 12 as well as a group or entire herd of livestock 12 based on total weight and current market prices.

The management system platform 140 can also be adapted and configured to generate reports containing characteristic information about an individual livestock 12 and/or a group or entire herd of livestock 12 under management. Such reports can be used by a rancher, herd manager, etc. to identify livestock 12 to be rounded up for slaughter, to identify herd demographics, and for many other livestock management purposes. For example, a report can include a slaughter/cull list that is compiled by the management system platform 140 based on performance of the livestock 12 determined from the data provided by the tags 20. If a bull gets no or few cows pregnant over a period of time, it can be placed in the cull list. Similarly, if a cow does not get pregnant or takes several heats and calves late, it can be placed in the cull list. The management system platform 140 can be adapted and configured to implement an automatic rating system based on such data that makes it easy for a producer to make such decisions.

In block 164, the management system platform 140 can monitor, track, and respond to the location, movement, and activity of the livestock 12 in the same or a similar manner as the individual tags 20. For example, the management system platform 140 can periodically receive and store data and determinations regarding the location, movement, activity, and behavior of each individual livestock 12 from the tags 20 attached to the livestock 12. The management system platform 140 stores each of the received data and determinations in the local data storage 150 thus creating a history of the location, movement, and activity of each livestock 12 over time. The management system platform 140 can also communicate the data and determinations to the remote computer system 220.

The management system platform 140 can process the current and historical data and determinations and determine the current and historical location of each livestock 12 relative to assets of the area under management, such as barns, pastures, feed lots, etc. having known location coordinates. It can also determine if a livestock 12 is currently or has historically been within or outside of a geo-fence boundary including the perimeter boundary of the area under management and/or the boundary of one or more designated areas within the area under management. It can also determine where the livestock 12 currently is located and what activity it is currently engaged in, as well as where the livestock 12 has been in the past at various points in time and what activity it was engaged in at each location and point in time. Such data provides complete location and activity traceability for the livestock 12 under management and can be used for numerous purposes including for example to determine if a livestock 12 was in an outbreak area during a certain period of time or if it is susceptible to a certain disease.

The management system platform 140 also can make further determinations from the foregoing. For example, from the movement and activity history of a livestock 12 it can determine whether the livestock 12 may have a health-related condition or other physical condition such as estrus or calving that may require attention. If a livestock 12 is determined to be ill, it can also track where the livestock 12 has been and what it was doing to pinpoint if the livestock 12 may have ingested something that caused the illness.

The management system platform 140 can also be adapted and configured to display the current and historical locations of each individual livestock 12 on the display 152 overlaid on a map relative to the area under management and one or more geo-fences as described above. This can provide a visual indication of where each livestock 12 was and what it was doing at various points in time.

The management system platform 140 can also be adapted and configured to generate and communicate alarms and/or alerts in response to determinations regarding the location, movement, and activity of the livestock 12. The alarms and/or alerts can be the same as described above. For example, an alarm or alert can be generated in response to determining that a livestock 12 is at a location outside of a geo-fence boundary, such as the perimeter boundary of the area under management. The alarm or alert can also be sent to the tag 20 attached to the livestock 12 to activate the tone generator 68 and/or the stimulator 70 for example to urge the livestock 12 to stop and/or return.

The management system platform 140 can also be adapted and configured to generate a report about the current and/or historical locations, movements, and activities of an individual livestock 12 and/or a group or the entire herd of livestock 12 under management based on the data and determinations received from all of the tags 20 attached to the herd.

In block 166, the management system platform 140 can detect, monitor, track, maintain, and respond to significant physical conditions of the livestock 12 in the same or a similar manner as the individual tags 20. Such conditions can include for example, estrus, breeding, calving, and the timing of weaning. The management system platform 140 can periodically receive and store data and determinations regarding the physical conditions from the tags 20 attached to the livestock 12. As described above, such data can include for example internal body temperature, movement, orientation, elevation, ambulation, etc. The management system platform can accept the determinations of the physical conditions by the tags 20 and can separately confirm such conditions by processing the underlying data relating to physical parameters, activities, and behaviors from which the determinations were made. The management system platform 140 stores each of the received data and determinations in the local data storage 150 thus creating a history of the determined physical conditions for each livestock 12 over time. The management system platform 140 can also communicate the data and determinations to the remote computer system 220.

The management system platform 140 can also be adapted and configured to generate and communicate alarms and/or alerts in response to determinations regarding the physical conditions of the livestock 12. The alarms and/or alerts can be the same as described above. For example, an alarm or alert can be generated in response to determining that a livestock 12 is in estrus or is calving. The alarm or alert can also be sent to the tag 20 attached to the livestock 12 to activate the LED 64 for example to help a rancher, herd manager, etc. locate the livestock 12 to provide needed attention.

The management system platform 140 can also be adapted and configured to generate a report about the significant physical conditions of an individual livestock 12 and/or a group or the entire herd of livestock 12 under management based on the data and determinations received from all of the tags 20 attached to the herd.

In block 168, the management system platform 140 can determine, update, and maintain genetics and family lineage data of the livestock 12. For example, the management system platform 140 can periodically receive data and determinations from the tag 20 attached to a livestock 12 including the estrus condition of the livestock 12, the distance and angle between the livestock 12 and other nearby livestock, the elevation and orientation of the livestock 12 compared to other nearby livestock, and the determination of breeding and insemination of the livestock 12. The management system platform 140 can accept the determinations of the physical condition, activity, and behavior by the tags 20 and can separately confirm the same by processing the underlying data. The management system platform 140 can determine the identity of the livestock 12 that bred from the unique ID's of the tags 20 attached to each of them. Subsequent pregnancy can be confirmed physically by a rancher, herd manager, etc. or can be determined by the tag 20 attached to the pregnant livestock 12 based on the physical parameters, activity, and behavior of the livestock 12 and reported to the management system platform 140. When the pregnant livestock 12 subsequently gives birth, a new tag 20 with a unique ID can be populated with information, attached to the newborn, and entered into the management system platform 140. The management system platform 140 stores the new tag data in the local data storage 150 with the newborn's tag ID and with the tag ID's of the father and mother. The tag ID of the newborn is also stored with the tag ID and data of both the father and the mother. This creates a linked chain or tree of the genetic and family lineage for each livestock 12. The management system platform 140 also stores the data and determinations received from the tags 20 in the local data storage 150 thus creating a history of the estrus, breeding, pregnancy, and calving events or occurrences of the livestock 12 over time. The management system platform 140 can also communicate any or all of the described data and determinations to the remote computer system 220.

The management system platform 140 also can be adapted and configured to generate reports for individual livestock 12 containing their history of estrus, breeding, pregnancy, and calving, and their genetic and family lineage. It can also aggregate such data for all of the livestock 12 in a herd under management and generate similar reports for the herd. Such reports enable a rancher, herd manager, owner, etc. to determine the breeding demographics and productivity of the herd as a whole, among other things.

In block 170, the management system platform 140 can monitor and manage the usage of designated grazing areas in an area under management by a group or entire herd of livestock 12 under management. For example, as described above the management system platform 140 can include mapping software or other means to define one or more designated areas, including one or more designated grazing areas, within the area under management and can bound them with one or more geo-fence boundaries. Also as described above, the management system platform 140 periodically receives and stores data and determinations regarding the location, movement, activity, and behavior of each individual livestock 12 from the tags 20 attached to the livestock 12.

The management system platform 140 can identify the livestock 12 having locations within the boundary coordinates of each designated grazing area at any given time, determine the amount of time they spent there engaged in eating activity, and apply a predetermined rate of consumption value to estimate the amount of grazing material consumed. The predetermined rate of consumption can be a value input to the management system platform 140 and stored in the memory 144 and/or local data storage 150. For example, a consumption rate of approximately 2-4% of the weight of the livestock 12 per day may be suitable for cattle.

A grazing capacity value and a grazing limit value also can be input to the management system platform 140 and stored in the memory 144 and/or local data storage 150 for each designated grazing area. For example, a grazing capacity value could be the number of tons of dry grazing material a designated grazing area is estimated to contain at 100% capacity. A grazing limit value could be a percentage of the full capacity value, such as 20% for example.

The management system platform 140 can be configured and adapted to periodically determine from the current and stored location and activity data of the livestock 12 the amount of grazing material that has been consumed in a designated grazing area and to deduct that amount to get a remaining grazing capacity value. The amount of grazing material consumed would be deducted from the value of grazing capacity if the designated grazing area is being newly grazed after being re-grown to capacity, and would be deduced from a previous value of remaining grazing capacity if the designated grazing area has been grazed previously.

When the management system platform 140 determines that the value of remaining grazing capacity is equal to or less than the grazing limit value, it can generate alarms or alerts substantially the same as described above to alert a rancher, herd manager, owner, etc. to relocate the livestock 12 to prevent over-grazing and potential damage to the designated area. The alarms or alerts can also direct the tags 20 attached to the livestock 12 within the designated area to activate the tone generators 68 and/or stimulators 70 to urge the livestock 12 to leave the designated area.

The management system platform 140 can also be adapted and configured to generate reports containing information about the capacity, remaining capacity, consumption rates, and grazing limits of the designated grazing areas. A rancher, herd manager, owner, etc. can use such information to create plans for locating, relocating, grazing, and providing other feed for the livestock 12.

As described above, the management system platform 140 can also be adapted and configured to display representations of the livestock 12 on the display 152 as an overlay on a map of the area under management, including the designated grazing areas. This can provide a visual indication of the concentration of livestock 12 in one or more designated grazing areas at various times which can also be helpful to a rancher, etc. in managing the livestock 12 and the designated grazing areas.

In block 172, the management system platform 140 can monitor and maintain a health and medical history for each livestock 12. The management system platform 140 is adapted and configured to receive as input health and medical-related data for each livestock 12 under management. The input data can include data from one or more external sources. Such external sources can include, but are not limited to, veterinarians, animal hospitals, pharmacies, medical supply sources, etc. The input data from external sources can include, but is not limited to, records of vaccinations and medicines administered; treatments given, e.g., deworming, de-infestation; examinations; diagnoses and prognoses; veterinarian visits, etc. The data can also include future scheduled or unscheduled vaccinations, medicines, treatments, appointments, etc. The input data can also include health-related and other physical conditions detected and/or determined by the tag 20 attached to the livestock 12. Health-related data from the tag 20 can include, but is not limited to, determinations of illness and injury. Physical condition data from the tag 20 can include, but is not limited to, determinations of estrus, breeding, calving, etc.

The management system platform 140 stores the input data in the memory 144 and/or local data storage 150. The management system platform 140 can also communicate some or all of the input data for an individual livestock 12 to the tag 20 attached to the livestock 12 for storage and/or use by the tag 20 locally to the livestock 12.

The management system platform 140 can also be adapted and configured to generate and communicate alarms and alerts. The alarms and alerts can be the same as described above, e.g., in the form of a text message or email to one or more mobile and/or stationary devices of a rancher, herd manager, etc. For example, the management system platform 140 can be configured to send an alarm or alert when a time has elapsed since a vaccination or medicine was administered and it is time for the next dose. Similarly, an alarm or alert can be sent when the management system platform 140 detects that a date has been reached or is being approached when a vaccine or medicine is scheduled or due to be administered. The alarm or alert can also include information identifying the livestock 12 and information about the vaccine or medicine to be administered. The alarm or alert can also include a command to the tag 20 attached to the livestock 12 to activate the LED 64 and/or tone generator 68 to help a rancher, herd manager, etc. locate the livestock 12.

The management system platform 140 can also be adapted and configured to generate reports containing some or all of the data and information about the health and medical history of an individual livestock 12. Such reports can be used by a rancher, herd manager, etc. to readily determine the number of times a livestock 12 has been in estrus, has been bred, has calved, has been aborted, has been ill, etc. as well as when. They also can be used to readily determine all vaccinations, medicines, treatments, etc. that have been administered or are to be administered to an individual livestock 12 in the future.

The management system platform 140 can also aggregate the data and information for a group of livestock 12 or for the entire herd under management and generate reports for the group or herd. For example, a herd-level report can include data about which livestock 12 have received a particular vaccination or medicine and which have not. Such information can be used by a rancher, herd manager, etc. to schedule needed medical attention, estimate and schedule costs of medical care, manage inventory of medical supplies, etc.

In block 174, the management system platform 140 can monitor, track, update, and maintain data about a selected group of livestock 12 or the entire herd under management. Such herd data can include for example, but is not limited to, location(s), head count, demographics, etc. The management system platform 140 is adapted and configured to aggregate and process the data and information regarding individual livestock 12 received as input data from one or more input devices 146, from one or more external sources, from the tags 20 attached to individual livestock 12, and from the local sensors and transceivers 34 as described herein to produce the herd data.

For example, the management system platform 140 can aggregate and process the location data for all of the livestock 12 of a group or the entire herd that is received periodically from the tags 20 attached to the livestock 12 and determine movement and location of the group or herd within the area under management currently and historically over time. This information can be used for a variety of purposes including but not limited to controlling the spread of disease, managing the use of consumable resources, such as pasturage, etc.

The management system platform 140 can also aggregate and process the characteristic and other data for individual livestock 12 and determine herd level demographics data. Such data can include for example, but is not limited to, age, sex, breed, weight, etc. Herd level demographics data can include for example, but is not limited to the current and historical (a) total number of livestock 12 under management, (b) number of livestock 12 in various age and weight ranges, (c) number of male and female livestock 12 including the number of each in breeding age, (d) the number of new livestock 12 born over time, (e) the number of each breed of livestock 12 within the herd under management, etc. This information can be used for a variety of purposes including but not limited to determining and managing the productivity of the herd under management, determining the current value and the historical value trend of the herd under management, and estimating current and future costs and historical cost trends of the herd under management.

The management system platform 140 can store the herd data in the memory 144 and/or local data storage 150 and can communicate some or all of the data to the remote computer system 220. The management system platform 140 can also generate reports containing some or all of the herd data.

In blocks 176 and 184, the management platform system can detect, monitor, and respond to external events and/or conditions that could affect the health or well-being of the livestock 12 under management. As described above and as seen in block 176, the management system platform 140 periodically receives from the tags 20 attached to each livestock 12 data and determinations regarding certain detected or determined external conditions that could pose a risk to the livestock 12 such as a nearby predator, gunshot, vehicle motor, and/or theft. Also as described above and as seen in block 184, the management system platform 184 periodically receives from the tags 20 data and determinations regarding weather and/or meteorological conditions that could pose a risk. The management system platform 140 stores the data and determinations in the memory 144 and/or local data storage 150. The management system platform 140 can accept the risk determinations by the tags 20 and can separately determine and/or confirm the same by processing the underlying data.

The management system platform 140 is adapted and configured to generate and communicate alarms and/or alerts in response to the detection or determination of such conditions or events. The alarms and/or alerts can be substantially the same as described above when an individual tag 20 detects or determines such a condition or event, e.g., emails, text messages, etc. to one or more mobile and/or stationary devices to alert a rancher, herd manager, etc. to take appropriate action, such as intervening to remove the threat condition or moving the livestock 12 to another location. The alarms or alerts can also include commands to the tag 20 attached to the livestock 12 at risk to activate the microphone 66 and/or the camera 72 to obtain additional audio and/or video information to confirm the risk, to activate the tone generator 68 and/or stimulator 70 to attempt to urge the livestock 12 to move or to scare off the source of the risk, and/or to activate the LED 64 to help a rancher, herd manager, etc. locate the livestock 12 and provide needed attention.

In block 178, the management system platform 140 can create and manage an external access interface and can control access to the livestock management system 10 by one or more external users. For example, the management system platform 140 can be adapted and configured to provide external access to a rancher or herd manager, ranch hand, owner, veterinarian, on-line auction and/or veterinary services participants, banks or other financial services user(s), insurer(s), government agencies, and other users who a system manager elects to grant access to some or all of the data and functionality of the system.

The external access interface can include login/password access security and the management system platform 140 can be configured to limit access to only designated data, information, and functionality of the management system platform 140 depending on the user. For example, a rancher and/or owner may have access to the complete data, information, and functionality of the management system platform 140 with regard to livestock 12 belonging to the rancher or owner but not with regard to livestock 12 belonging to other ranchers or owners. In contrast, a herd manager may be given access to most information and functionality only with regard to livestock 12 for which the herd manager is responsible, but not to certain financial information, and a ranch hand may be given more limited access only to certain data, information and functionality related to livestock 12 and consumable assets, e.g., grazing or pasture usage and limits, feed and water usage and levels, etc. for which the hand is responsible. Similarly, a veterinarian can be limited to accessing health and medical-related data and information, a bank can be limited to accessing livestock characteristic and demographic information related to financial value, and auction participants can be limited to accessing health and physical characteristic data and information for specific livestock 12 being auctioned.

The management system platform 140 also can be configured to allow different users to edit or update different data. A rancher or owner may be permitted to edit or update any information in the system regarding its own livestock 12. A herd manager may be permitted to update most information in the system relating to the livestock 12 for which it is responsible, but not financial or ownership data. A ranch hand may be limited to updating only certain data and information for aspects of the management for which the hand is directly responsible, for example the levels of consumable assets as they are replenished, vaccination and medicine records as they are administered, etc. Similarly, a veterinarian may be limited to updating only health and medical-related data and information, and a bank or auction participant may not be allowed to edit or update any information.

The management system platform 140 also can be configured to operate as a remote or cloud-based service provider platform for users. For example, the management system platform 140 can provide a remote on-line auction service. Users wishing to participate in an auction either to buy or to sell livestock 12 can register and be charged a one time or continuing subscription fee. The management system platform 140 can allow participant sellers to identify livestock 12 for sale and terms and conditions of sale. The management system platform 140 can allow auction participant to view certain health and physical characteristic data, ownership and location information, etc. concerning the livestock 12 offered for sale. The management system platform 140 can allow participant buyers to submit bids and participant sellers to accept or decline bids.

Upon completion of a sale, the management system platform 140 can provide or transfer some or all of the data and information in the system for the sold livestock 12 to the buyer. For example, current and historical physical characteristics, and current and historical health and physical conditions and data can be transferred. Such data can include, for example vaccination history, distress/disease alerts and reports, age, calving count, abortions, etc. Chain of ownership and current and historical location data also can be transferred, e.g., identity and location of ranches where the livestock 12 was present. Genetic chain and/or lineage information also can be transferred. The transfer of some or all such data to a buyer can be contingent on the seller approving the release of the information and/or on payment of an additional fee since such information may have additional value to the buyer and to subsequent end consumers, i.e., knowing the ranch(es), lineage(s), and location(s) from which a consumers retail beef came may have value to some consumers.

The management system platform 140 also can be configured to provide a remote on-line veterinary service for users to contact and communicate with a veterinarian, and/or for veterinarians to access data and information about livestock 12 owned by their clients. For example, a veterinarian may be on the staff of the ranch or other organization operating the management system platform 140, or may be independently contracted by the organization, and is made available to communicate with users of the management system platform 140 who pay a one time or continuing subscription fee. A user that observes an anomaly in the health-related or other physical condition of a livestock 12 or that receives a health-related alert or alarm can log in to the management system platform 140 and be connected with the veterinarian to ask questions, and to identify the issues and potential solutions. Alternatively, veterinarians may pay a continuing subscription fee to log in as users and access certain health-related data, physical parameter data, activity and behavioral data, location data and/or other data of livestock 12 owned by their clients to help diagnose conditions in the livestock 12 and recommend treatments.

In block 180, the management system platform 140 can track, monitor and manage inventories of consumables (in addition to managing designated grazing areas described above). For example, the management system platform 140 can manage consumables that include, but are not limited to, feed, hay, water, vaccination doses, medicine doses, deworming and de-infestation medications, artificial insemination straws, etc.

With respect to feed, hay, water, and similar consumable resources, the management system platform 140 can periodically receive and store data and determinations from the tags 20 attached to each individual livestock 12 regarding the location and activity of the livestock 12, e.g., eating and drinking. The management system platform 140 can also receive data and information from local sensors and transceivers 34 located at or near feed, water, hay and similar consumable resources regarding visits by livestock 12 to those sources. The management system platform 140 can process this data and information in a manner similar to that described above with respect to the management of grazing areas to monitor and manage the inventory of the consumable resources.

For example, for each separate and/or different consumable resource a predetermined capacity value and a predetermined limit value can be entered into the management system platform 140 via an input device 146 and stored in memory 144 and/or local data storage 150. A predetermined rate of consumption value can similarly be input and stored. For example, a capacity value could be a number of pounds or tons of feed, hay, etc. or a number of gallons of water when the consumable resource is at 100% capacity. A limit value could be a percentage of the capacity value, such as 20% of full capacity for example. The rate of consumption value could be the same for all livestock 12 or different for each livestock 12 and could be determined for example as a percentage of the body weight of a livestock 12 over a daily, hourly, or other time period, e.g., 2% of body weight per day.

The management system platform 140 can determine from the location and activity data periodically received for each tag 20 when a livestock 12 is present at a consumable resource, whether it is consuming the consumable resource, and for how long. The management system platform 140 can determine the amount of the consumable resource the individual livestock 12 has consumed from the consumption time and predetermined rate of consumption value. The management system platform 140 can aggregate the consumption of the consumable resource by all livestock 12 determined to be consuming the source to get a total consumption value. The management system platform 140 can deduct the total consumption value from the capacity value to get a remaining capacity value and store the remaining capacity value in the memory 144 and/or local data storage 150. The total consumption value is deducted from the capacity value if the consumable resource is at full capacity, and is deducted from a previous value of remaining capacity if the consumable resource was previously consumed in part.

When the management system platform 140 determines that the value of remaining capacity is equal to or less than the limit value, it can generate an alarm or alert substantially the same as described above to alert a rancher, herd manager, owner, etc. to replenish the consumable. The alarm or alert can also provide information to restock inventory of the consumable if necessary.

Alternatively, in some embodiments, a local sensor and transceiver 34 can be arranged with respect to a consumable resource to directly determine that the consumable resource has reached the limit value and to generate and communicate an alarm or alert. For example, a water resource can be fitted with a water level sensor, e.g., float switch, capacitive sensor, etc. set to detect when the water level reaches the limit value. When the water reaches the limit value, the sensor and transceiver 34 can automatically generate an alarm alert. It can also automatically replenish the consumable resource if desired, for example by opening a fill valve or the like.

With respect to other types of consumables, such as vaccination doses, medicine doses, deworming and de-infestation medications, artificial insemination straws, etc., as described above the management system platform 140 can receive as input data via one or more input devices 146 a starting inventory value and a predetermined limit value for each separate and/or different consumable and can store the values in memory 144 and/or local data storage 150. As described above, the input device(s) 146 can include one or more bar code and/or QR scanners or readers, for example. The local sensors and transceivers 34 also can include RFID scanners or readers or the like. Each consumable item in inventory can be labelled or marked with a bar code, QR code, or RFID chip indicating the type and number of units of the consumable item. When a consumable item is taken from inventory, the person taking it can scan it with a bar code, QR code, or RFID scanner or reader. The management system platform 140 can be configured to receive the scanner data as input, deduct the appropriate number of units from the starting inventory value or from a remaining inventory value if consumable items of the same type were previously removed from inventory, and store a new remaining inventory value in memory 144 and/or local data storage 150. Alternatively, the person taking the consumable item from inventory can manually enter the withdrawal using a keyboard, or other type of input device 146.

In either case, the management system platform 140 can determine when the remaining inventory value has reached the limit value and can generate and communicate an alert or alarm. The alert or alarm can be the same as described above, e.g., sent as a text message, email message, etc. to a mobile and/or stationary device of a rancher, herd manager, etc. The alert or alarm can also include information to re-order and replenish the inventory of the particular consumable item.

The management system platform 140 can also be adapted and configured to generate reports containing information about the inventories of consumable resources. A rancher, herd manager, owner, etc. can use the information in the reports to manage the inventories, re-order and replenish the inventories as necessary, track usage of the consumables, schedule and budget costs for consumables, etc.

In block 182, the management system platform 140 monitors, tracks, updates, and maintains various financial data and information regarding individual livestock 12, groups of livestock 12, and/or the entire herd under management. Financial data and information can include for example, but is not limited to, current and historical individual and herd market values, current and historical market prices, and cost data. Cost data can include but is not limited to current, historical, and projected future costs. Cost data can also include costs regarding consumable supplies and resources such as feed, hay, medicines, etc., medical costs, machine and equipment costs, labor costs, debt service and interest costs, etc.

The management system platform 140 can receive the financial data as input data via one or more of the input devices 146 and store it in the memory 144 and/or the local data storage 150. The management system platform can be configured to receive updates from time to time to some items of financial data manually via an input device 146 and can automatically update other items of financial data in response. For example, a new market price for beef can be manually entered via an input device 146 to update the previous market price. In response, the management system platform 140 can automatically recalculate and update the market value of an individual livestock 12 and/or a group or herd under management based on the current weights of the livestock 12 stored in the system and the updated current market value for beef. The management system platform 140 can store both the original values and the updated values so that the system maintains a history of such financial data and values.

Similarly, the management system platform 140 can receive manual updates to various cost items from time to time, for example to the costs of various consumable resources, labor, debt service, etc. The management system platform 140 can be configured to apportion the total costs associated with the herd under management to each individual livestock 12 whether on an annual basis, a time to slaughter basis, or some other basis. In response to individual cost items being updated, the management system platform 140 can automatically recalculate the cost attributable to each individual livestock 12 and can store the original and updated individual cost items and the original and updated per livestock 12 cost values to maintain a history. Alternatively, all items of financial data and updates thereto can be input and/or recalculated manually.

The management system platform 140 can be configured to generate reports about the financial data and information. The reports can include financial data and information about individual livestock 12 and about groups of livestock 12 or the entire herd under management. The reports can include historical, current, and projected market value data and historical, current, and projected cost data on a per livestock 12 basis and on a herd basis. From such information an owner, rancher, herd manager, etc. can determine the actual and expected profitability of individual livestock 12 and of the herd. The owner, etc. can thus make informed management decisions including but not limited to whether to maintain or sell certain livestock 12, whether to make or hold off on certain purchases and investments, and whether to make other changes to the herd portfolio.

The management system platform 140 also can be configured to generate alarms and alerts in response to financial data or conditions. The alarms and alerts can be the same as described above. For example, the management system platform 140 can generate an alarm or alert advising an owner, rancher, etc. to buy or sell certain livestock 12 when a current market price has hit a predetermined level.

In block 186, the management system platform 140 tracks and maintains historical ownership and location data for each individual livestock 12. The management system platform 140 can receive the ownership and location data as input data via an input device 146 and can store it in the memory 144 and/or local data storage 150. The historical ownership data can include for each owner, but is not limited to, the name(s), address(es), location(s), and dates of ownership, and the ownership interest. The historical location data can include, but is not limited to, the name, address, and location of each ranch or other facility at which the livestock 12 was present, and the dates the livestock 12 was present there.

The management system platform 140 can communicate some or all of the historical ownership and location data for each livestock 12 to the tag 20 attached to the livestock 12 for local storage and use. The data can be communicated to a tag 20, for example, when the tag 20 is first populated with data and added to the system. Thereafter, updates can be remotely communicated to the tag 20 from time to time as described herein.

The management system platform 140 can also generate reports including some or all of the historical ownership and location data for an individual livestock 12 and for groups of livestock 12 or an entire herd under management. As described above, some or all such data can be transferred to a buyer and new owner of a livestock 12 under certain conditions. Such data can also be used to identify, separate, segregate and/or quarantine livestock 12 in the event of an outbreak of a contagious disease at a location to which the livestock 12 were present or exposed.

In block 188, the management system platform 140 manages the tags 20 and monitors, tracks, and responds to conditions of the tags 20. With regard to managing the tags 20, the management system platform 140 can, among other things, add new tags 20 to the system, remove tags 20 from the system, and populate tags 20 with some or all of the livestock-related data described herein, and provision tags 20 for operation. A tag 20 can be added to the system when a new livestock 12 is born or otherwise is added to the herd under management. A tag 20 can be added to the system for example by assigning a unique tag ID, associating the unique tag ID with a unique asset number of the livestock 12 to which the tag 20 is to be attached, and storing the tag ID and asset number in the local data storage 150 together with some or all of the livestock data. For example, as described herein the livestock data can include characteristic data (e.g., sex, species, breed, date of birth, age), ownership and location history data, health and medical history data, physical conditions history data, genetic chain and lineage data, and any other data about the livestock 12. A tag 20 can be deleted from the system when a livestock 12 dies, is sold, or otherwise leaves the herd under management. A tag 20 can be deleted from the system by deleting its information from the local data storage 150 and detaching the tag 20 from the livestock 12.

A tag 20 can be populated with its unique tag ID, associated unique asset number, and livestock data prior to being attached to a livestock 12 by bringing it into proximity with the management system platform 140, which as described herein can be hosted in whole or in part on a mobile device, and pairing via Bluetooth or other RF link. Once paired, the data is transferred to the tag 20 and stored in the memory 50 and/or 60 of the tag 20. The tag 20 is provisioned to operate in the livestock management system 10 in the same manner with all of the data, settings, and parameters necessary to configure the various communications interfaces (e.g., cellular, LPWAN) and for operation of the tag 20 in the field as described herein being transferred to and stored in the tag 20.

In similar fashion, a tag 20 once associated with and attached to a livestock 12 can be detached, re-associated with and attached to another livestock 12. The management system platform 140 can delete the old livestock asset number and old livestock data stored with the unique ID of the tag 20 from the memory and local data storage of the management system platform 140 and overwrite it with the livestock asset number and livestock data of the new livestock 12 to which the tag 20 is to be associated. The tag 20 is paired with the management system platform 140 via Bluetooth or other RF link and re-populated and re-provisioned with the asset number, data, settings, parameters, etc. associated with the new livestock 12 over-writing the asset number, data, settings, etc. associated with the old livestock 12. The tag 20 can then be attached to the new livestock 12.

With regard to monitoring, tracking, and responding to conditions of the tags 20, the management system platform 140 can be configured to monitor and track the operational, diagnostic, external, and other conditions for each tag 20 and to generate and communicate an alert or alarm in response to a monitored condition. The management system platform 140 can monitor tag conditions by examining condition-related data received periodically from the tags 20 and/or by communicating with the tags 20 and requesting certain condition-related data on demand. The conditions monitored can include for example, but are not limited to, energy level (e.g., solar energy level), power level (e.g., battery level or supercapacitor charge level), signal strength level, diagnostic results, self-test results, ambient temperature, humidity, etc.

The management system platform 140 can be configured to generate and communicate an alarm or alert when it determines that a monitored condition indicates a need for attention, e.g., service, repair, replacement, etc. For example, the management system platform can be configured to generate an alarm or alert when it determines a battery-related or energy storage related operating condition indicates that the battery or energy storage has low remaining life. Similarly, it can generate an alarm or alert when it determines a diagnostic or self-test result identifies a fault in a communications interface or in embedded memory. The alarm or alert can be the same as described above, e.g., a text message or email to one or more mobile devices of a rancher etc., and can identify the tag 20, its location, and the condition that triggered the alarm or alert, as well as information regarding one or more potential solutions. For example, the alarm or alert can include a recommendation to detach and replace or repair the tag 20. The alarm or alert can also include a command to the tag 20 to take an action such as activating the LED 64 and/or the tone generator 68 to assist a rancher, herd manager, etc. in locating the tag 20.

3. Logical Data Structures.

Figure 14A:
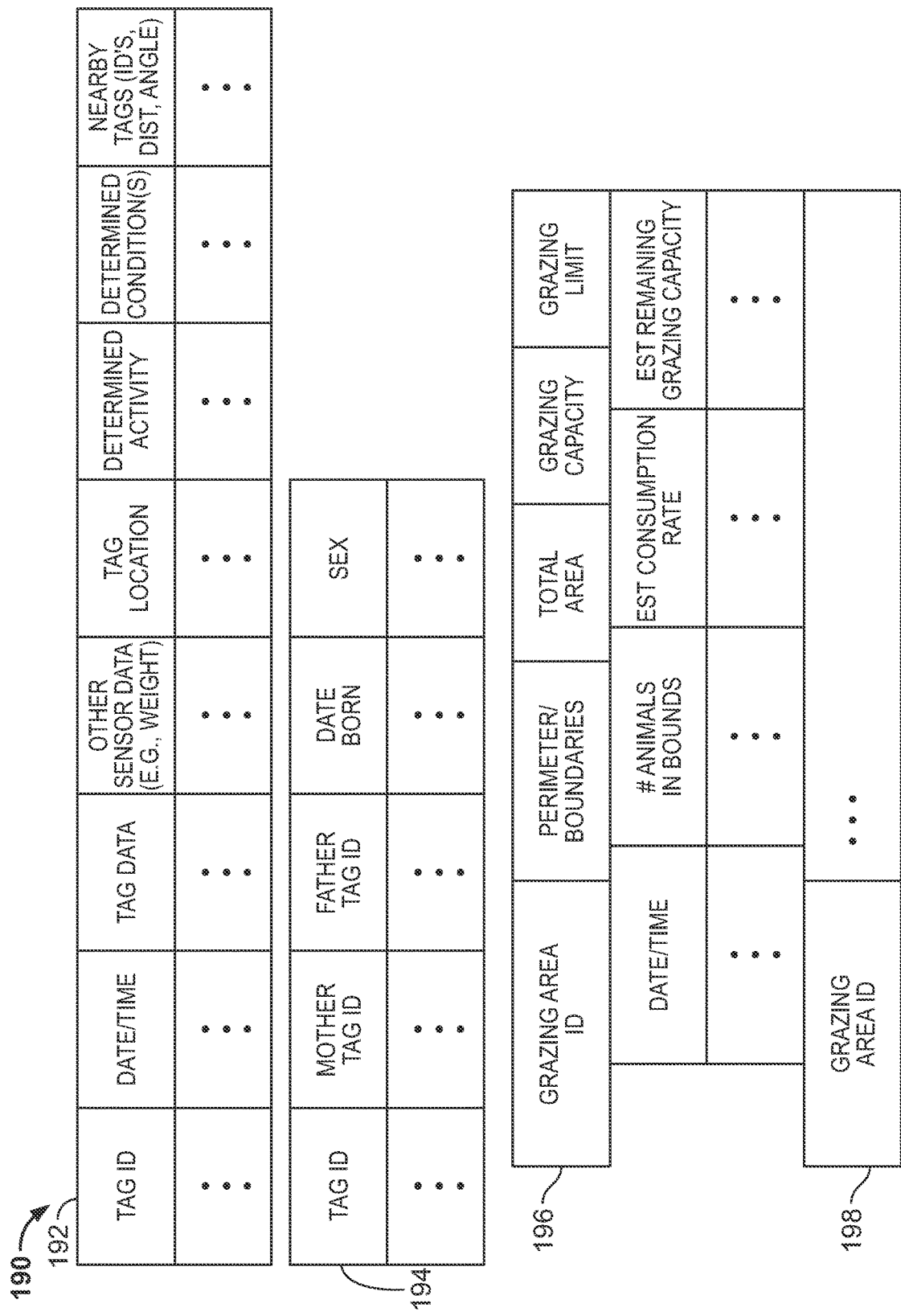
FIG. 14A is a block diagram illustrating one potential logical data structure for potential data received, processed, and maintained in a management system platform of a livestock management system in accordance with an example embodiment.

The management system platform 140 can arrange the data, information, and determinations it receives and/or generates as described in the foregoing sections in one or more logical data structures wherein related data, information, and determinations are logically grouped for storage and access from the memory 144 and/or local data storage 150. One potential logical data structure 190 is illustrated in FIGS. 14A-14C for example. However, it is contemplated and will be appreciated that numerous other and different data structures could be used and that any and all such data structures that are consistent with carrying out the goals, functions, and operations of the management system platform 140 as described herein are intended to be included within the scope of the descriptions of the example embodiments.

The logical data structure 190 can include a permanent or semi-permanent section similar to the section 122 of the logical data structure 120 of the tags 20 but for data and information about the management system platform 140. As described above, the management system platform 140 can be duplicated and/or distributed in whole or in part and hosted on a number of different devices, including one or more mobile devices. Accordingly, the permanent or semi-permanent section can include data and information for a particular instance of the management system platform 140 that is intended to be maintained permanently or semi-permanently. Such data and information can include for example, but is not limited to, a unique platform ID and encryption key(s) for encrypted communications with the particular instance of the platform.

The logical data structure 190 can also include a tag data section 192 with a plurality of records of data, information, and determinations received by the management system platform 140 periodically over time from the tags 20 and/or local sensors and transceivers 34. Each set of data, information, and/or determinations received at a given time can be thought of as a logical record of tag data. Each logical tag data record can include any or all of the data, information, and/or determinations a tag 20 and/or local sensor/transceiver 34 can generate and communicate to the management system platform 140 as described herein. Each logical record can include a plurality of fields.

For example, a field labeled "tag ID" can include identifying data about the tag 20 and/or the local sensor/transceiver 34 that generated the data, information, and determinations included in the record. The identifying data can include but is not limited to the unique ID and location of the tag 20 and/or sensor/transceiver 34. A field labeled "date/time" can have the date and time the data, information and/or determinations were generated by the tag 20 and/or the local sensor/transceiver 34.

A field labeled "tag data" in FIG. 14A can include data regarding livestock location, orientation, heading, movement, elevation, and body temperature; external data such as weather and meteorological data; audio and video data; tag operational data and conditions; and any other data a tag 20 can receive or acquire and communicate. The field labeled ""other sensor data" can include any data a local sensor/transceiver 34 can communicate, including but not limited to weight of a livestock 12. A field labeled "determined activity" can include determinations of eating, drinking, ruminating, resting, breeding and any other determinations a tag can make and communicate. A field labeled "determined conditions" can include determinations of illness, injury, estrus, pregnancy, calving, and any other physical conditions of a livestock 12 a tag 20 can make and communicate. A field labeled "nearby tags" can include data regarding the relative position and angle of the tag 20 that generated the data, information, and/or determinations when they were generated. Alternatively, this data could also be included in the "tag data" field.

The logical data structure 190 can also include a genetic/lineage data section 194 that includes a plurality of records with each record containing data regarding the genetic chain and family lineage of each livestock 12. Each record can include a plurality of fields. For example, the record can include a field for the tag ID and associated asset number of the livestock 12, fields for the tag ID and livestock asset number of the mother and father of the livestock 12, a field for date of birth, and fields for sex and any other livestock characteristic data that may be desired. A genetic chain and family lineage of a livestock 12 can be determined by following the tag ID's of the mother and father to their associated records, determining each of their mother and father tag ID's, following those ID's to their associated records, and so on.

The logical data structure 190 can also include a grazing area management section 196, 198 that includes a plurality of records regarding one or more designated grazing areas, and for each designated grazing area, a plurality of records regarding usage of the grazing area by livestock 12 as described in sections above. Each designated grazing area record can include a plurality of fields. The fields can include, but are not limited to, a field for data identifying the grazing area (e.g., "grazing area #1") and a field for data identifying and/or defining the boundaries of the designated grazing area. Each such record can also have fields that include predetermined values for determining the usage of the designated grazing area such as total area, grazing capacity, and grazing limit, which were described in the sections above.

Each grazing area usage record is related to a designated grazing area record. The grazing area usage records are generated at various times by the management system platform 140 from the livestock location and activity data generated and communicated by the tags 20 as described in the sections above. Each grazing area usage record can include a plurality of fields including, for example, a field for the data and time the record was made, a field for the number of livestock 12 detected within the designated grazing area, a field for the estimated consumption rate of the livestock 12, and a field for the remaining grazing capacity calculated, which can be calculated in the manner also described in the sections above.

The logical data structure 190 can also include a medical/physical conditions data section 200 that includes a plurality of records regarding medical and health-related data and physical conditions of the livestock 12. Each record can include any of the health-related and other physical conditions and data determined and/or received by the tags 20 and/or the management system platform 140 as described in the sections above. Each record can include a plurality of fields, including for example a field for a tag ID and livestock asset number to identify the livestock 12 to which the remaining data of the record belongs. Each record can also include a field for an indicator or description of a medical data or physical condition. For example, indicators of medical and health-related data can include vaccinations, medicines, etc. Indicators of physical conditions can include illness, injury, estrus, pregnancy, abortion, calving, etc. Additional fields can include more detailed information, for example a field including additional description of the medical and health-related data and physical conditions, and fields for dosage, duration, start and stop dates, additional information, etc. The collection of records for each tag ID and/or livestock asset number can provide a medical, health, and physical condition history for each livestock 12.

The logical data structure 190 can also include an event and external events section 202 that includes a plurality of records including information about events and conditions external to the livestock 12. Each record can include any of the event and/or external conditions data and determinations received or determined and communicated by the tags 20 and/or the management system platform 140 as described in the sections above. Each record can include a plurality of fields, including for example a field for a tag ID and livestock asset number to identify the livestock 12 to which the remaining data of the record belongs. Each record can also include a field for an indicator or description of an event or external condition detected or determined by the tag 20. Indicators and descriptions can include, for example, a predator, gunshot, vehicle, theft, etc. Additional fields can include additional information, for example fields for the date and time and location of the event or external condition. A field for additional information can also be included.

Additional information could include, for example, disposition information such as recovered, lost, injured, and/or additional descriptive information such as wolf, red truck, etc. The collection of records for each tag ID and/or livestock asset number can provide a history of the events and external conditions for each livestock 12.

The logical data structure 190 can also include a consumable supplies section 204 that includes a plurality of records and fields including information about the usage and inventory of consumable supplies and/or assets such as feed, hay, medical supplies, medicines, vaccines, artificial insemination straws, and any other consumables to be monitored, tracked, and managed. For example, a plurality of first level records can each include a field labeled "feed/supply ID" for data identifying and/or describing a consumable asset. A plurality of second level records can be related to each first level record. Each second level record can include a plurality of fields, for example fields for the location, predetermined capacity and predetermined usage limit of the identified consumable asset. A plurality of third level records can be related to each second level record. Each third level record can include a plurality of fields, for example, a field for the data and time when the record was made, a field for the measured or determined consumption rate of the consumable, and a field for the remaining capacity or inventory for the consumable, both of which can be determined in the manner described in the sections above. The third level record can also include if desired a field for an estimate of when the limit of the consumable will be reached, which can be determined from the consumption rate and remaining capacity values.

The logical data structure 190 can also include an ownership/location data section 206 that includes a plurality of records with each record including information about the ownership and location history of the livestock 12.

Each record can include a plurality of fields. For example, the record can include a field for the tag ID and associated asset number of the livestock 12, a field for the date of the record, and fields for current owner data, transfer date to the current owner, previous owner data, current location data, previous location data, and transfer date to the current location. As described in the sections above, current and previous owner data can include names, addresses, locations, ownership interest, and any other data desired. Similarly, current and previous location data can include names of locations (e.g., ranch name), global positioning coordinates, and any other data desired. The collection of records with common tag ID fields provides a history and chain of ownership and location of a livestock 12.

The logical data structure 190 can also include a tag conditions section 208 that includes a plurality of records including data and information about the conditions of each tag 20. Each time a tag 20 communicates condition data to the management system platform 140 can be thought of as a logical record of tag data. Each record can include a plurality of fields with any or all of the data and information about internal and external conditions of a tag 20 described in the sections above including operating, diagnostic, self-test, and external ambient conditions. For example, the record can include a field for the tag ID and associated asset number of the livestock 12, a field for the date and time of the record, a field for the location of the tag 20 at the time the condition data was communicated, and a plurality of fields for various conditions. Such fields can include for example, a field for battery level, a field for communications signal strength or level, a field for ambient temperature, a field for ambient humidity, and fields for any other conditions desired.

F. Remote Computer System

The remote computer system 220 may be comprised of any computing and/or storage site capable of communicating (e.g., receiving and/or transmitting), processing, and/or storing data. The remote computer system 220 may be comprised of one or more server computers, cloud based computers, mainframe computers, personal computers, virtual computers, or other computer systems. The remote computer system 220 may be capable of communicating data and information via one or more of the IP and/or telecommunication networks identified herein. As can be appreciated, one or more modems, transceivers, or other communication devices, including devices similar to those described in the sections above with respect to the tags 20 and the management system platform 140, may be required between the remote computer system 220, the management system platform 140, and the tags 20 for such communication.

The remote computer system 220 can and preferably does also include one or more displays (e.g., screens or monitors), one or more fixed or portable hard disk drives or solid state drives, one or more communications interfaces (e.g., network or telecommunications), and one or more keyboards. The remote computer system 220 may also include an integral or separate portable printer and/or scanner.

The remote computer system 220 will include one or more central processing units (CPU's), such as one or more microprocessors, a memory bus, random access memory (RAM), read only memory (ROM), a peripheral bus, and a keyboard controller. The buses may be integrated as a single bus or may be separate buses. The central processing unit can be a general-purpose digital processor that controls the operation of the computer. The central processing unit can be a single-chip processor or implemented with multiple components. Using instructions retrieved from memory, the central processing unit controls the reception and manipulations of input data and the output and display of data on output devices. The memory bus is utilized by the central processing unit to access the RAM and the ROM. RAM is used by central processing unit as a general storage area and as scratch-pad memory, and can also be used to store input data and processed data. ROM can be used to store instructions or program code for execution by the central processing unit as well as other data intended to be maintained permanently or semi-permanently. The peripheral bus is used to access the input, output and storage devices used by the remote computer system 220. In the described embodiments, these devices can include one or more displays (e.g., screen or monitor), printer devices, hard disk drives or solid state drives, and communications interfaces (e.g., IP network, cellular network, LPWAN). A keyboard controller is used to receive input from the keyboard and send decoded symbols for each pressed key to the central processing unit over a bus. The keyboard is used by a user to input commands and other instructions to the remote computer system 220. The remote computer system 220 can also include other types of user input devices. For example, pointing devices such as a computer mouse, a track ball, a stylus, or a tablet are operable by a user to manipulate a pointer on a display of the remote computer system 220 to make user selections. The display can be an output device that displays images of data provided by the central processing unit via the peripheral bus or provided by other components in the remote computer system 220. The display can also be an input device such as a touch sensitive screen that receives selection information from a user and communicates it to the central processing unit. The printer device when operating as a printer provides an image on a sheet of paper or a surface of another non-transient medium. The one or more hard disk drives and/or solid state drives can be utilized to store various types of data including the masses of data and determinations generated and communicated by the tags 20 and the management system platform 140. The central processing unit, together with an operating system, operates to execute computer code and to produce and use data. The computer code and data may reside on RAM, ROM, or hard disk drive or solid state drive. The computer code and data can also reside on a removable and/or portable program medium and can be loaded or installed onto the remote computer system 220 when needed. Removable program mediums include, for example, CD-ROM, PC-CARD, USB drives, floppy disk and magnetic tape. The communications interfaces are utilized to send and receive data over one or more networks that can be connected to other devices and/or computer systems, e.g., the tags 20, local sensors and transceivers 34, and the management system platform 140. The communications interfaces can include an interface card or similar device and appropriate software implemented by the central processing unit or a separate communications processor to connect the remote computer system 220 to an existing network and transfer data according to standard data communication and network protocols.

The remote computer system 220 can be a separate computer system or can be a part of the management system platform 140. The remote computer system 220 can also be located in whole or in part in the same location as or in relative proximity to the management system platform 140, and can be located in whole or in part at a location relatively distant from the management system platform 140. For example, to the extent it is not incorporated as part of the management system platform 140, the remote computer system 220 can be located in the same room or a room adjacent to the management system platform and can be connected to the management system platform 140 via a LAN network connection as described herein. Alternatively, the remote computer system 220 can be located in a location many yards or miles away from the management system platform 140 and the tags 20 and can be connected to the management system platform 140 and the tags 20 via a WAN, cellular, satellite, LPWAN, and/or other communications connection as described herein. Accordingly, "remote" in connection with the remote computer system is meant to distinguish it and its functionality from the management system platform 140 at least to the extent it is not incorporated as part of the management system platform 140, and is not necessarily meant to refer to its physical distance from the management system platform 140.

The remote computer system 220 preferably is capable of receiving, storing, and processing any and all of the masses of aggregated data received and acquired by the plurality of tags 20 attached to a plurality of livestock 12 under management. Such data can include, but is not limited to, location, orientation, movement over ground, heading, elevation, and internal body temperature of the livestock 12, the position and angle of the livestock 12 relative to other nearby livestock 12, and any other livestock-related data described herein. The remote computer system 220 preferably is also capable of receiving, storing and processing any and all of the masses of aggregated determinations of livestock activity, behavior, health-related and other physical conditions made by the tags 20. Such determinations can include, but are not limited to, eating, drinking, ruminating, resting, ambulating, estrus, ovulating, breeding, pregnancy, calving, illness, injury, various external events and conditions, and any other determinations described herein. In addition, the remote computer system 220 is preferably capable of receiving, storing, and processing the aggregated data and determinations not only tags 20 attached to the livestock 12 of one herd of under management, but also of tags 20 attached to the livestock 12 of a plurality of different herds under management at the same or different locations and by the same or different ranchers, herd managers, owners, etc.

The remote computer system 220 preferably includes suitable machine learning, AI model(s), and/or other detection algorithm(s) creation and development tools to create, develop, train, and update one or more AI models and/or other detection algorithms using the stored masses of aggregated data and determinations received from all of the tags 20. Various programs, applications, coding, and other tools are known for this purpose. Preferably, the remote computer system 220 is capable of and is used to create, develop, train, and update one or more machine learning and/or AI models and/or other detection algorithms to predict and/or determine an activity of a livestock 12 from selected data about the livestock 12. As one example, one or more models or detection algorithms can be created to predict and/or determine from data including location, orientation, elevation, and movement data that the livestock 12 is eating, drinking, ruminating, resting, or ambulating. Similarly, the remote computer system 220 is preferably capable of and is used to create, develop, train, and update one or more machine learning, AI models, and/or other detection algorithms to predict and/or determine a health related or other physical condition of a livestock 12 from selected data and selected determinations of activity about the livestock 12. As one example, one or more models or other detection algorithms can be created to predict and/or determine from selected data (e.g., internal body temperature over time, weight, location, relative position and angle to nearby herd members, orientation, elevation, and movement) and from selected activity determinations (e.g., eating, drinking, ambulation) that the livestock 12 is ill, injured, in estrus, ovulating, breeding, pregnant, or calving.

Once one or more models and/or other detection algorithms are created, developed, and trained at and by the remote computer system 220, they can be communicated to each of the tags 20 either directly or via the management system platform 140, embedded in the tags 20, and applied to data and determinations during operation of the tags 20 in the manner described in the sections above. As the tags 20 receive and acquire additional data and make additional determinations using the models and/or other detection algorithms, the additional data and determinations can be communicated to the remote computer system 220 either directly or via the management system platform 140 as described in the sections above. Known machine learning, modeling, and/or other tools can be applied at the remote computer system 220 to the historical and new additional data and determinations to create new models or other detection algorithms and/or to update existing models and/or other detection algorithms. For example, the values of certain weighting or other parameters of an existing model and/or other detection algorithm can be adjusted to provide predictions and/or determinations that are more statistically accurate based on the existing and added data. The new and/or updated models and/or other detection algorithms and/or parameters are then communicated to the tags 20 as described herein to supplement, replace, or update the existing models and/or other detection algorithms embedded therein. In this way, the predictions and determinations made by the tags 20 can become more accurate over time.

G. Exemplary Telecommunications Networks

In addition to the various communications channels and networks identified above in connection with the livestock management system 10, the livestock management system 10 may be utilized upon any telecommunications network capable of transmitting data including voice data and other types of electronic data. Examples of suitable telecommunications networks for the livestock management system 10 include but are not limited to global computer networks (e.g. Internet), wireless networks, cellular networks, satellite communications networks, cable communication networks (via a cable modem), microwave communications network, local area networks (LAN), wide area networks (WAN), low power wide area networks (LPWAN), campus area networks (CAN), metropolitan-area networks (MAN), and home area networks (HAN). The livestock management system 10 may communicate via a single telecommunications network or multiple telecommunications networks concurrently. Various protocols may be utilized by the electronic devices for communications such as but not limited to HTTP, SMTP, FTP and WAP (wireless Application Protocol). The livestock management system 10 may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The livestock management system 10 may also be utilized with online services and internet service providers.

The Internet is an exemplary telecommunications network for the livestock management system 10. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

H. Mobile Device(s)

As described above, all or a portion of the management system platform 140 can be hosted on one or more mobile devices. The mobile devices may be comprised of any type of computer for practicing the various aspects of the livestock management system 10. For example, in addition to the types of mobile devices described in the sections above, the mobile devices may be comprised of any conventional computer system provided it is portable. Also for example, the mobile devices can be portable personal computers (e.g. APPLE® based computer, an IBM based computer, or compatible thereof) or tablet computers (e.g. IPAD®). The mobile devices may also be comprised of various other electronic devices capable of sending, receiving, and processing electronic data including but not limited to smart phones, mobile phones, personal digital assistants (PDAs), mobile electronic devices, handheld wireless devices, two-way radios, communicators, video viewing units, portable television units, portable television receivers, portable cable television receivers, pagers, communication devices, and digital satellite receiver units.

I. Operation of Preferred Embodiment

In describing an example of use of the embodiments of the livestock management system 10 described herein, it is assumed that any programs, applications, algorithms, models, etc. necessary to carry out the operations and functions of the system as described herein have first been created in conventional fashion and using conventional coding and development tools known to persons of ordinary skill in the art. In addition, it is assumed that certain necessary permanent or semi-permanent data and information have been created and/or is in existence. Such data can include, for example, designations and definitions of the area under management, designated grazing and other areas within the area under management, and geo-fence boundaries of the perimeter of the area under management and designated areas within the area under management. Such data can also include, for example, unique asset numbers for each of the livestock 12 under management; configuration data for the various communications interfaces described; predetermined capacity and limit data for grazing areas and consumables; report format data; pre-existing data about livestock health related and physical conditions, ownership and location history, etc.; pre-existing data about current consumable inventories; pre-existing data about future scheduled or unscheduled vaccine and/or medicine administrations, veterinarian visits and/or appointments, etc.; and configuration data for external system access interfaces etc. It will be appreciated that the foregoing lists of data and information are not exclusive or limiting.

In use, the pre-existing or created data and information can be stored in the local data storage 150 of the management system platform 140 for example in accordance with one or more of the logical data structures 190 described herein. Any pre-existing or created data pertaining to an individual livestock 12 is stored with a corresponding unique tag ID and unique asset number for the livestock 12 as described herein. Each tag 20 to be attached to a livestock 12 is then populated and provisioned for use in the system. Each tag 20 is brought into proximity with the management system platform 140 and paired via Bluetooth or other RF link. The tag 20 is populated with all of the necessary data and information by transferring such data and information from the management system platform 140 to the tag 20 and storing it in the memory 50, 60 of the tag 20. Similarly, each tag 20 is provisioned for operation in the system by transferring all necessary programs, applications, algorithms, models, etc. and all necessary configuration data to the tag 20 and storing it in the memory 50, 60.

Once populated and provisioned, the tag 20 is physically attached to the livestock 12 to which it corresponds for example in the manner described herein. In addition, any sensors 32 to be implanted in and/or attached to the livestock 12 to provide physical parameters or other data are implanted in and/or attached to the livestock 12 in known manner and spaced from the tag 20 as described herein.

Thereafter, the tags 20, the management system platform 140, and the remote computer system 220 operate to carry out the various functions and operations described herein with respect to each of them and to communicate with each other as described herein. Over time, new tags 20 can be added to the system and attached to livestock 12 newly added to the herd under management in a manner described herein. Similarly, tags 20 attached to livestock 12 of the herd under management can be detached from the livestock 12 and deleted from the system, or replaced with another tag 20, also as described herein.

As the tags 20 communicate additional data, information, and determinations to the management system platform 140 and/or the remote computer system 220 over time, the models for determining livestock activity, behavior, and health and other physical conditions are updated. The models are communicated to the tags 20 as described herein so that over time the tags 20 can make more accurate determinations of livestock activities, behaviors and conditions.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. Any publications, patent applications, patents, and other references that may be mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment of the livestock management system 10 is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the livestock management system 10 will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the livestock management system 10, suitable methods and materials are described above. Thus, the livestock management system 10 is not intended to be limited to the embodiments shown, but is to be accorded the widest scope consistent with the principles and features disclosed herein.

What is claimed is:

1. A system for monitoring livestock, comprising:
    at least two tags, each tag attachable to an animal in a group of animals, each tag comprising:
        a sensor that senses a physical parameter regarding the animal to which the tag is attached;
        a processor configured to receive or process information from the sensor regarding the animal to which the tag is attached;
        a memory adapted to store data regarding the animal to which the tag is attached and data received from other tags; and
        a communications interface adapted for wireless communications between tags and other devices;
    wherein one of the at least two tags comprises an optimum tag that is in an optimum condition to communicate data, wherein the optimum tag generates and stores a set of aggregated data regarding the animal to which it is attached, and also data regarding other animals in the group of animals, wherein data from other animals in the group of animals is communicated to the optimum tag via the communications interfaces of tags attached to animals in the group of animals; and
    a remote computer system configured to communicate with the at least two tags via the communications interface of each tag;
    wherein the remote computer system is adapted to receive the set of aggregated data transmitted by the optimum tag.

2. The system of claim 1, wherein the set of aggregated data comprises location data and time data corresponding to the location data for a plurality of individual animals.

3. The system of claim 2, wherein each tag further includes a GNSS receiver, and wherein the location data comprises a location of each tag as determined by the GNSS receiver.

4. The system of claim 1, wherein the at least two tags comprise a plurality of tags that are within wireless communication range of each other, the plurality of tags adapted to communicate with each other.

5. The system of claim 4, wherein the optimum tag is within wireless communication range of a transceiver configured for two-way communications with the remote computer system.

6. The system of claim 4, wherein a determination of which tags are within wireless communication range of each other is determined by signal strength between the tags.

7. The system of claim 4, wherein each tag further includes a GNSS receiver, and wherein a determination of which tags are within wireless communication range of each other is determined by location data for the plurality of tags as determined by the GNSS receiver.

8. The system of claim 1, wherein the at least two tags comprise a plurality of tags that are within wireless communication range of each other and wherein at least one of the tags in the plurality of tags is within wireless range of a local sensor, the plurality of tags comprising a dynamic local mesh network;
    wherein the local sensor is adapted to wirelessly transfer data between one or more tags and the remote computer system.

9. The system of claim 8, wherein the local sensor is located in a geographical area under management.

10. The system of claim 8, wherein the local sensor comprises a transceiver adapted to receive the set of aggregated data from the optimum tag and to transmit the set of aggregated data to the remote computer system.

11. The system of claim 1, wherein the at least two tags are adapted to determine when to communicate the set of aggregated data to the remote computer system.

12. The system of claim 11, wherein a determination of when to communicate the set of aggregated data is made based on time and date.

13. The system of claim 11, wherein a determination of when to communicate the set of aggregated data is made based on atmospheric conditions.

14. The system of claim 11, wherein a determination of when to communicate the set of aggregated data is made based on signal conditions.

15. The system of claim 11, wherein a determination of when to communicate the set of aggregated data is made based on a livestock condition.

16. The system of claim 1, wherein the set of aggregated data comprises data relating to the health of each animal in the group.

17. A system for monitoring livestock, comprising:
    at least two tags, each tag attachable to an animal in a group of animals, each tag comprising:
        a sensor that senses a physical parameter regarding the animal to which the tag is attached;
        a processor configured to receive or process information from the sensor regarding the animal to which the tag is attached;

a GNSS receiver operatively connected to the processor;

a memory adapted to store data regarding the animal to which the tag is attached and data received from other tags; and a communications interface adapted for wireless communications between tags and other devices;

wherein one of the at least two tags comprises an optimum tag that is in an optimum condition to communicate data, wherein the optimum tag generates and stores a set of aggregated data regarding the animal to which it is attached, and also data regarding other animals in the group of animals, wherein data from other animals in the group of animals is communicated to the optimum tag via the communications interfaces of tags attached to animals in the group of animals; and a transceiver configured for two-way communication with the at least two tags via the communications interface of each tag;

wherein the transceiver wirelessly receives the set of aggregated data from the optimum tag.

18. The system of claim 17, wherein the transceiver is adapted for two-way communications with a remote computer system.

19. The system of claim 17, wherein the transceiver is adapted for two-way communications with a management system platform.

20. The system of claim 17, wherein the set of aggregated data comprises location data and time data corresponding to the location data for a plurality of individual animals in the group of animals, and wherein the location data comprises a location of each tag as determined by the GNSS receiver.

21. A system for monitoring livestock, comprising:
at least two tags, each tag attachable to an animal in a group of animals, each tag comprising:
a sensor that senses a physical parameter regarding the animal to which the tag is attached;
a processor configured to receive or process information from the sensor regarding the animal to which the tag is attached;
a GNSS receiver operatively coupled to the processor,
a memory adapted to store data regarding the animal to which the tag is attached and data received from other tags; and
a communications interface adapted for wireless communications between tags and other devices;

wherein the at least two tags comprise a plurality of tags that are within wireless communication range of each other, the plurality of tags comprising a dynamic mesh network;

wherein a location of each animal is determined by the GNSS receiver;

wherein one of the at least two tags comprises an optimum tag that is in an optimum condition to communicate data, wherein the optimum tag generates and stores in the memory a set of aggregated data regarding the health and location of an animal to which it is attached, and also data regarding the health and location of other animals in the group of animals;

wherein data from animals in the group of animals is communicated on a conditional basis to the optimum tag via the communications interfaces of tags attached to animals in the group of animals;

wherein a determination of when to communicate the set of aggregated data is made based on signal conditions; and a transceiver configured for two-way communication with the communications interface of each tag, wherein the transceiver wirelessly receives the set of aggregated data from the optimum tag;

wherein the transceiver is adapted for two-way communications with a management system platform; and wherein the transceiver is adapted for two-way communications with a remote computer system.

* * * * *